United States Patent
Shimura

(10) Patent No.: US 12,362,605 B2
(45) Date of Patent: Jul. 15, 2025

(54) POWER TRANSMISSION APPARATUS, POWER RECEIVING APPARATUS, CONTROL METHOD, AND STORAGE MEDIUM

(71) Applicant: CANON KABUSHIKI KAISHA, Tokyo (JP)

(72) Inventor: Hajime Shimura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/539,100

(22) Filed: Dec. 13, 2023

(65) Prior Publication Data
US 2024/0120778 A1    Apr. 11, 2024

Related U.S. Application Data

(63) Continuation of application No. PCT/JP2022/021250, filed on May 24, 2022.

(30) Foreign Application Priority Data

Jun. 15, 2021  (JP) ................................. 2021-099456
Apr. 14, 2022  (JP) ................................. 2022-067159

(51) Int. Cl.
*H02J 50/80*    (2016.01)
*H02J 50/20*    (2016.01)
(Continued)

(52) U.S. Cl.
CPC .............. *H02J 50/80* (2016.02); *H02J 50/20* (2016.02); *H04W 24/10* (2013.01); *H04W 72/0473* (2013.01)

(58) Field of Classification Search
CPC ........ H02J 50/80; H02J 50/20; H02J 7/00034; H02J 50/12; H02J 50/60; H02J 50/10; H04W 24/10; H04W 72/0473
See application file for complete search history.

(56) References Cited

U.S. PATENT DOCUMENTS 10,110,066 B2   10/2018  Watanabe et al.
11,329,519 B2*   5/2022  Chen ....................... H02J 50/12
(Continued)

FOREIGN PATENT DOCUMENTS

EP      1751834 B1     12/2009
JP    2007537688 A     12/2007
(Continued)

*Primary Examiner* — Jared Fureman
*Assistant Examiner* — Michael J Warmflash
(74) *Attorney, Agent, or Firm* — Canon U.S.A., Inc. IP Division

(57) ABSTRACT

A power transmission apparatus wirelessly transmits power to a power receiving apparatus via a power transmission antenna, measures at least either of a voltage and a current in the power transmission antenna at least two or more time points of a power transmission restriction period in which power to be transmitted to a power receiving apparatus is restricted, and performs measurement processing, including first measurement processing and second measurement processing, plurality of times. In this process, a processing period related to the first measurement processing and a processing period related to the second measurement processing are controlled to have different lengths.

20 Claims, 18 Drawing Sheets

(51) Int. Cl.
*H04W 24/10* (2009.01)
*H04W 72/044* (2023.01)

(56) References Cited

U.S. PATENT DOCUMENTS

| | | | | |
|---|---|---|---|---|
| 12,230,978 | B2* | 2/2025 | Hiramatsu | H02J 50/80 |
| 2007/0216392 | A1* | 9/2007 | Stevens | H04B 5/79 |
| | | | | 323/355 |
| 2007/0228833 | A1* | 10/2007 | Stevens | G05F 1/66 |
| | | | | 307/45 |
| 2013/0162054 | A1* | 6/2013 | Komiyama | G01V 3/10 |
| | | | | 702/60 |
| 2013/0176023 | A1 | 7/2013 | Komiyama | |
| 2014/0312709 | A1* | 10/2014 | Nakano | H04B 5/79 |
| | | | | 307/104 |
| 2015/0171633 | A1* | 6/2015 | Nakano | H04B 5/26 |
| | | | | 307/104 |
| 2017/0093214 | A1* | 3/2017 | Watanabe | H02J 50/60 |
| 2019/0181693 | A1* | 6/2019 | Kato | H02J 50/12 |
| 2020/0280220 | A1 | 9/2020 | Ettes | |
| 2023/0015212 | A1* | 1/2023 | Hiramatsu | H02J 50/60 |

FOREIGN PATENT DOCUMENTS

| | | | | |
|---|---|---|---|---|
| JP | 2013132133 | A | 7/2013 | |
| JP | 2013135518 | A * | 7/2013 | ......... G01R 27/2688 |
| JP | 2014007838 | A | 1/2014 | |
| JP | 2015154159 | A | 8/2015 | |
| JP | 2017070074 | A | 4/2017 | |
| JP | 2018512036 | A | 4/2018 | |
| JP | 2020188634 | A * | 11/2020 | |

* cited by examiner

FIG.17

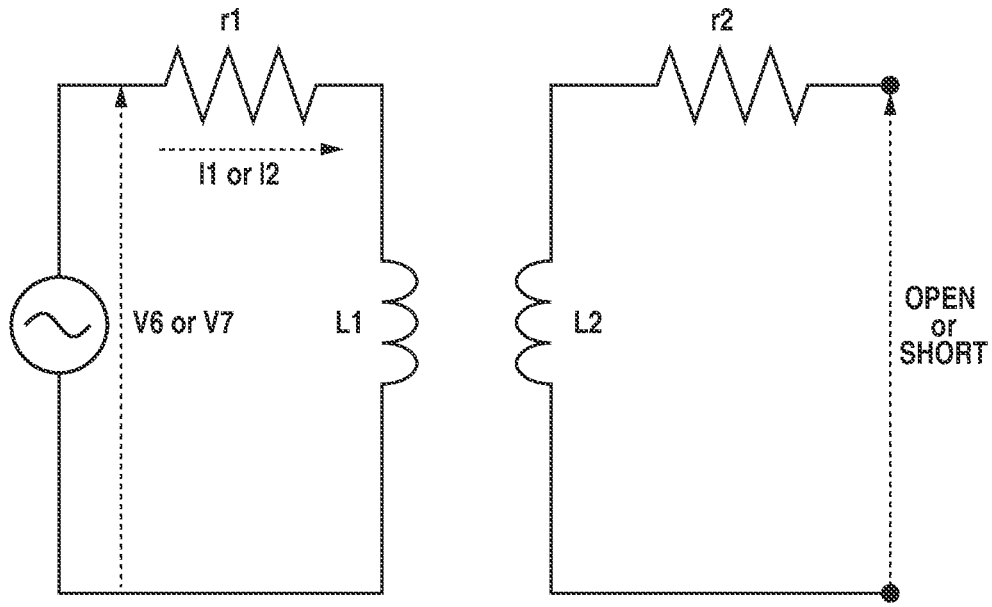

r1: POWER TRANSMISSION ANTENNA (COIL) WINDING RESISTANCE
L1: POWER TRANSMISSION ANTENNA (COIL) SELF-INDUCTANCE
V1: POWER TRANSMISSION ANTENNA (COIL) INPUT VOLTAGE INPUT WHEN POWER RECEIVING ANTENNA SIDE IS IN SHORT STATE
V2: POWER TRANSMISSION ANTENNA (COIL) INPUT VOLTAGE INPUT WHEN POWER RECEIVING ANTENNA SIDE IS IN OPEN STATE
I1: CURRENT FLOWING TO POWER TRANSMISSION ANTENNA (COIL) WHEN POWER RECEIVING ANTENNA SIDE IS IN SHORT STATE
I2: CURRENT FLOWING TO POWER TRANSMISSION ANTENNA (COIL) WHEN POWER RECEIVING ANTENNA SIDE IS IN OPEN STATE r2: POWER RECEIVING ANTENNA (COIL) WINDING RESISTANCE
L2: POWER RECEIVING ANTENNA (COIL) SELF-INDUCTANCE

POWER TRANSMISSION APPARATUS, POWER RECEIVING APPARATUS, CONTROL METHOD, AND STORAGE MEDIUM

CROSS-REFERENCE TO RELATED APPLICATIONS

This application is a Continuation of International Patent Application No. PCT/JP2022/021250, filed May 24, 2022, which claims the benefit of Japanese Patent Applications No. 2021-099456, filed Jun. 15, 2021, and No. 2022-067159, filed Apr. 14, 2022, all of which are hereby incorporated by reference herein in their entirety.

BACKGROUND OF THE INVENTION

Field of the Invention

The present disclosure relates to a wireless power transmission technique.

Background Art

In recent years, the technical development of wireless power transmission systems has been widely conducted. Patent Literature (PTL) 1 discusses a method of foreign object detection in conformity with the Wireless Power Consortium (WPC) standard. In addition, PTL 2 discusses a method of determining existence or non-existence of an object in the proximity of a power transmission device in accordance with an attenuation amount that is of a voltage value of the power transmission device obtained during a period in which a voltage of the power transmission device gradually drops after power transmission has stopped.

CITATION LIST

Patent Literature

PTL 1: Japanese Patent Laid-Open No. 2017-70074
PTL 2: Japanese Patent Laid-Open No. 2018-512036

In determination of existence or non-existence of an object by using the method discussed in PTL 2, a measurement result obtained by processing of measuring a voltage or a current during a period in which a power transmission apparatus restricts power transmission may be determined as data inappropriate for the determination. It can be considered that data appropriate for the determination may be obtained by performing the processing of measuring the voltage or the current a plurality of times during the period in which the power transmission apparatus restricts power transmission, whereby more reliable determination may be performed. However, PTL 1 and 2 have little discussion about control for a case where the processing of measuring the voltage or the current is performed a plurality of times during a power transmission period in which the power transmission apparatus restricts power transmission.

SUMMARY OF THE INVENTION

The present disclosure has been devised in view of the above-described issue and is directed to enabling appropriate control in a case where processing of measuring a voltage or a current is performed a plurality of times during a period in which a power transmission apparatus restricts power transmission.

As one means for solving the above problem, a power transmission device of the present disclosure has the following configuration. A power transmission apparatus includes a power transmission unit configured to wirelessly transmit power to a power receiving apparatus via an antenna, a measurement unit configured to perform measurement processing of measuring at least either of a voltage and a current in the antenna at at least two or more time points of a power transmission-restricted period in which power to be transmitted by the power transmission unit to the power receiving apparatus is restricted, and a control unit configured to perform, in a case where first measurement processing and second measurement processing are performed by the measurement unit, control in such a manner that a processing period related to the first measurement processing and a processing period related to the second measurement processing have lengths different from each other.

Further features of the present invention will become apparent from the following description of exemplary embodiments with reference to the attached drawings.

BRIEF DESCRIPTION OF THE DRAWINGS

FIG. 17 is a diagram illustrating a measurement method of an index indicating a second coupled state between the power transmission antenna and the power receiving antenna according to the first exemplary embodiment.

DESCRIPTION OF THE EMBODIMENTS

First Exemplary Embodiment

Figure 4:
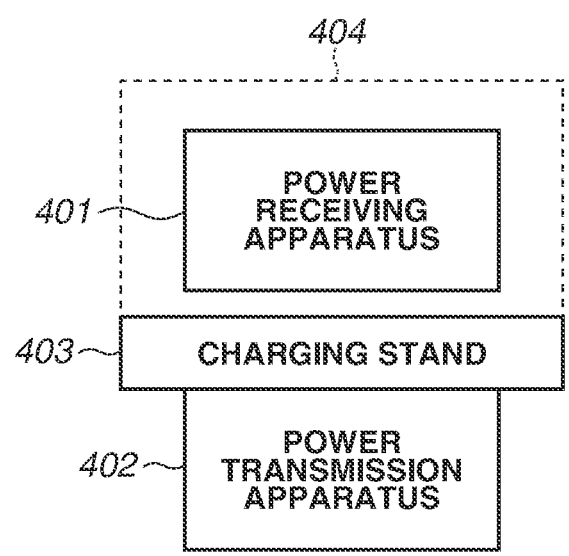
FIG. 4 is a diagram illustrating a configuration example of a wireless power transmission system.

Hereinafter, exemplary embodiments will be described in detail with reference to the accompanying drawings. A plurality of features is described in the exemplary embodiments, but not all of the plurality of features are always essential to the exemplary embodiment. In addition, the plurality of features may be arbitrarily combined. Furthermore, the same or similar configurations in the accompanying drawings are assigned the same reference numerals.
Configuration of Wireless Power Transmission System FIG. 4 illustrates a configuration example of a wireless power transmission system according to the present exemplary embodiment. As an example, this system includes a power receiving apparatus 401 and a power transmission apparatus 402. Detailed configurations of the power receiving apparatus 401 and the power transmission apparatus 402 will be described below with reference to FIGS. 2 and 1. In the below description, a power receiving apparatus will be referred to as an RX and a power transmission apparatus will be referred to as a TX. The RX 401 is an electronic device that receives power from the TX 402 and charges an internal battery.

The TX 402 is an electronic device that wirelessly transmits power to the RX 401 placed on a charging stand 403 which is a part of the TX 402. Hereinafter, since the charging stand 403 is a part of the TX 402, "the RX 401 being placed on the charging stand 403" will be sometimes described as "the RX 401 being placed on the TX 402". A range 404 surrounded by a dotted line is a range within which the RX 401 is able to receive power from the TX 402. That is, the range 404 coincides with a range within which the TX 402 is able to transmit power to the RX 401. In a state in which the RX 401 is placed on the TX 402, the RX 401 and the TX 402 or the charging stand 403 need not be in contact with each other. For example, a state in which the RX 401 is in the range 404 without being in contact with the TX 402 (the charging stand 403) is also be regarded as a state in which "the RX 401 is placed on the TX 402".

The RX 401 and the TX 402 may have a function of executing an application other than wireless power transmission. As an example, the RX 401 is a smartphone. As an example, the TX 402 is an accessory device for charging the smartphone. The RX 401 and the TX 402 may each be a tablet, a storage device, such as a hard disc device or a memory device, or an information processing apparatus, such as a personal computer (PC). In addition, the RX 401 and the TX 402 may each be an imaging apparatus (camera, video camera, etc.), for example. In addition, the RX 401 may be an image input device, such as a scanner, or may be an image output device, such as a printer, a copying machine, or a projector. Also, the TX 402 may be a smartphone. In this case, the RX 401 may be another smartphone, or may be wireless earphones. Also, the RX 401 may be a vehicle. Alternatively, the TX 402 may be a charger installed in an in-vehicle console.

In this system, the RX 401 and the TX 402 perform wireless power transmission that uses an electromagnetic induction method for wireless power transmission, based on the Wireless Power Consortium (WPC) standard. That is, the RX 401 and the TX 402 perform wireless power transmission in conformity with the WPC standard, between a power receiving antenna (power receiving coil) included in the RX 401 and a power transmission antenna (power transmission coil) included in the TX 402. The wireless power transmission method applied to this system is not limited to methods defined by the WPC standard and may be another electromagnetic induction method, a magnetic field method, an electric field resonance method, a microwave method, or a method that uses laser or the like. While, in the present exemplary embodiment, wireless power transmission is used for wireless charging, wireless power transmission may be performed for purposes other than wireless charging.

Here, processing that is performed by a power receiving apparatus and a power transmission apparatus in conformity with the WPC standard will be described. The WPC standard defines the magnitude of power that is guaranteed to be able to be output by the power receiving apparatus to a load (for example, circuit for charging, battery, etc.). Specifically, the defined power is a value called Guaranteed Power or Guaranteed Load Power (hereinafter, will be referred to as "GP"). The GP indicates a value of power that is guaranteed to be output to the load of the power receiving apparatus even in a case where power transmission efficiency between a power receiving antenna and a power transmission antenna degrades due to a change in a positional relationship between the power receiving apparatus and the power transmission apparatus, for example. More specifically, in a case where the GP is 5 watts, even when power transmission efficiency degrades due to a change in a positional relationship between the power receiving antenna and the power transmission antenna, the power transmission apparatus performs control of power transmission in such a manner that 5-watt power is to be output to the load from the inside of the power receiving apparatus. The GP is determined by a negotiation between the power transmission apparatus and the power receiving apparatus in a Negotiation phase to be described below. The WPC standard also defines the magnitude of maximum power that is able to be output by a power receiving apparatus to a load (for example, circuit for charging, battery, etc.) in a Power Transfer phase. Specifically, the power is a value called Maximum Power or Reference Power (hereinafter, will be referred to as "MP").

The WPC standard also defines the magnitude of power that serves as an appropriate reference and is able to be transmitted by a power transmission apparatus in the Power Transfer phase to a power receiving apparatus. Specifically, the power is a value called Potential Power or Potential Load Power (hereinafter, will be referred to as "PP"). In other words, the PP indicates the maximum GP that is negotiable by the power transmission apparatus with the power receiving apparatus. The negotiation item is not limited to GP, MP, and PP, and the present exemplary embodiment is applicable to a configuration in which power transmission and reception are performed based on power determined in a negotiation between the power transmission apparatus and the power receiving apparatus.

In a case where power transmission is performed from a power transmission apparatus to a power receiving apparatus, there is a chance that an object (hereinafter, will be referred to as "foreign object") different from the power receiving apparatus exists in the proximity of the power transmission apparatus. In this case, for example, if the foreign object is a metal strip or the like, electromagnetic waves for power transmission affect the foreign object which leads to an increase in the temperature of the foreign object or a failure of the foreign object. In view of this issue, the WPC standard defines a method of detecting that a foreign object exists or a foreign object may exist within a range in which the power transmission apparatus is able to transmit power. Specifically, a Power Loss (Power Loss) method of detecting a foreign object based on a difference between transmission power of a power transmission apparatus and receiving power of a power receiving apparatus. A Q value measurement method is also defined to detect a foreign object by using a change in quality coefficient (Q value) of a power transmission antenna (power transmission coil) in a power transmission apparatus. Detecting a foreign object using these methods causes, in a case where a foreign object exists, the power transmission apparatus to stop power transmission, which prevents the temperature of the foreign object to be increased and a failure of the foreign object.

Examples of a foreign object in the present disclosure include a metal strip, a clip, an integrated circuit (IC) card, and the like. Among products into which power receiving apparatuses and power receiving apparatuses are incorporated, or among objects of parts essential to products into which power receiving apparatuses and power receiving apparatuses are incorporated, an object that may unintentionally produce heat when being exposed to wireless power transmitted by a power transmission antenna is not regarded as a foreign object.

The RX 401 and the TX 402 according to the present exemplary embodiment perform the above-described processing of detecting a foreign object (hereinafter, will be referred to as "foreign object detection processing"). A foreign object to be detected by the TX 402 according to the present exemplary embodiment is not limited to an object existing on the charging stand 403. The TX 402 is required to detect a foreign object exiting in the proximity of the TX 402 and may detect a foreign object within the range 404 in which the TX 402 is able to transmit power, for example.

Figure 10:
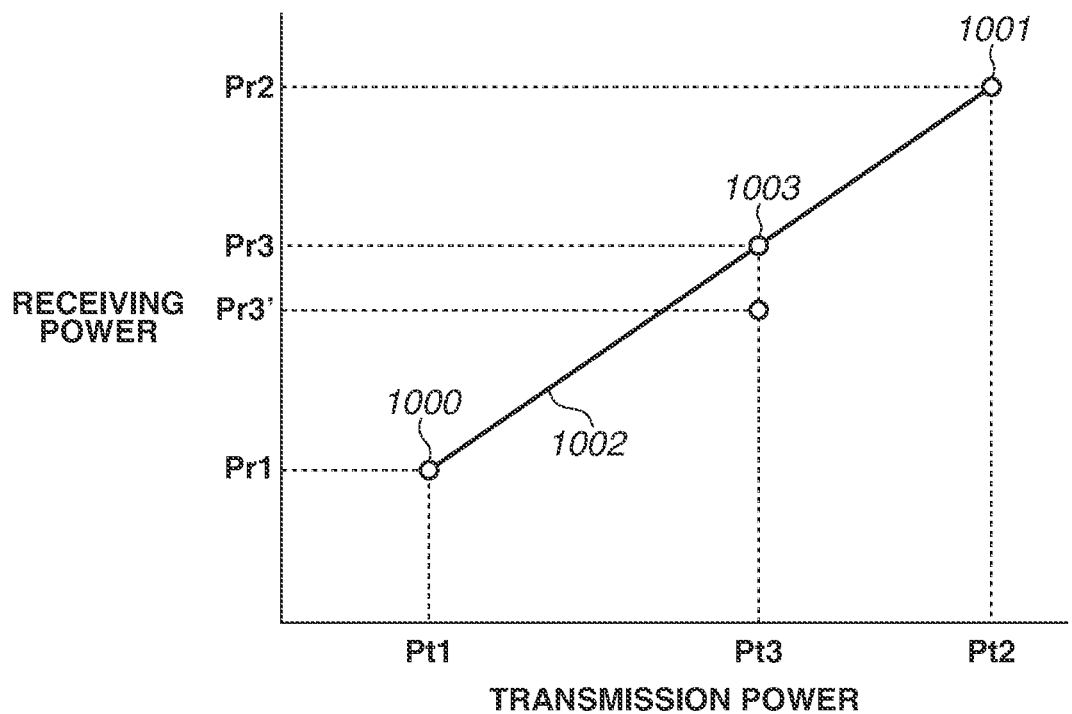
FIG. 10 is a diagram illustrating a setting method of a threshold value in foreign object detection to be executed by a Power Loss method.

The foreign object detection based on the Power Loss method defined in the WPC standard will be described with reference to FIG. 10. In FIG. 10, a horizontal axis indicates transmitted power of the TX 402 and a vertical axis indicates received power of the RX 401. A graph illustrated in FIG. 10 is acquired by Calibration processing (Calibration processing (CAL processing)). Hereinafter, the Calibration processing will be described.

First, the TX 402 performs power transmission to the RX 401 at a first transmission power value Pt1. In this power transmission, the RX 401 receives power at a first receiving power value Pr1 (this state will be referred to as a state with a Light Load (Light Load state)). Then, the TX 402 stores the first transmission power value Pt1. The first transmission power value Pt1 and the first receiving power value Pr1 are the minimum transmission power and the minimum receiving power, respectively, predefined between the RX 401 and the TX 402. In this process, the RX 401 controls the load in such a manner that power to be received is the minimum power. For example, the RX 401 may disconnect connection between the power receiving antenna and the load to avoid supplying of the received power to the load (charging circuit, battery, etc.).

Subsequently, the RX 401 notifies the TX 402 of the power value Pr1 of the first receiving power. The TX 402 that has received the notification indicating the power value Pr1 from the RX 401 calculates Pt1−Pr1 (=Ploss1) to obtain power loss between the TX 402 and the RX 401 and obtain a calibration point 1000 indicating correspondence between the values Pt1 and Pr1.

Subsequently, the TX 402 changes the transmission power value to a second transmission power value Pt2 and performs power transmission to the RX 401. In this power transmission, the RX 401 receives power at a second receiving power value Pr2 (this state will be referred to as a state with a Connected Load (load connected state)). Then, the TX 402 stores the second transmission power value Pt2. The second transmission power value Pt2 and the second receiving power value Pr2 are the maximum predefined transmission power and the predefined maximum received power, respectively. In this process, the RX 401 controls the load in such a manner that power to be received by the road is the maximum power. Alternatively, the RX 401 controls the load in such a manner that the load is brought to be in a state in which power at a value equal to or larger than a predetermined threshold value is supplied. For example, the RX 401 connects the power receiving antenna and the load to allow received power to be supplied to the load. Subsequently, the RX 401 notifies the TX 402 of the second receiving power value Pr2. The TX 402 that has received the notification indicating the power value Pr2 from the RX 401 calculates Pt2−Pr2 (=Ploss2) to obtain power loss between the TX 402 and the RX 401, to obtain a calibration point 1001 indicating correspondence between the values Pt2 and Pr2.

Then, the TX 402 generates a straight line 1002 linearly interpolating between the calibration point 1000 and the calibration point 1001. The straight line 1002 indicates a relationship between transmission power and receiving power in a state in which a foreign object does not exist in the proximity of the TX 402 and the RX 401. Based on the straight line 1002, the TX 402 is able to predict a value of power to be received by the RX 401 in a case where power transmission is performed at predetermined transmission power in a state in which a foreign object does not exist. For example, in a case where the TX 402 transmits power at a third transmission power value Pt3, it is estimated based on a point 1003 on the straight line 1002 that a value of power to be received by the RX 401 is a third receiving power value Pr3 that corresponds to the third transmission power value Pt3.

As described above, based on a plurality of combinations of transmission power values of the TX 402 and receiving power values of the RX 401 that have been measured while varying the load, a relationship of power loss between the TX 402 and the RX 401 in accordance with the load is obtained. Further, interpolation using a plurality of the combinations allows estimation of power loss between the TX 402 and the RX 401 in any load.

A method of foreign object detection using the Power Loss method will be described with reference to the graph illustrated in FIG. 10. The description will be given of a case where the TX 402 has performed power transmission to the RX 401 at the Pt3 after Calibration processing, and the TX 402 has been notified from the RX 401 of a notification indicating a value of a receiving power value Pr3'.

The TX 402 calculates a value Pr3−Pr3' (=Ploss_FO) obtained by subtracting the receiving power value Pr3', which has been actually notified from the RX 401, from the third receiving power value Pr3 of a state in which a foreign object does not exist. The Ploss_FO is considered to be power loss that is due to a foreign object existing in the proximity of the TX 402 and the RX 401 and power consumed by the foreign object.

Thus, in a case where the power Ploss_FO considered to be consumed by the foreign object is larger than a predetermined threshold value, it can be determined that a foreign object exists. Alternatively, the TX 402 preliminarily obtains power loss Pt3−Pr3 (=Ploss3) between the TX 402 and the RX 401, by using the receiving power value Pr3 of a state in which a foreign object does not exist. Then, the TX 402 obtains power loss Pt3−Pr3' (=Ploss3') between the TX 402 and the RX 401 in a state in which a foreign object exists, by using the receiving power value Pr3' notified from the RX 401 in a state in which a foreign object exists. The power Ploss_FO considered to be consumed by the foreign object may be estimated using Ploss3'−Ploss3 (=Ploss_FO).

As described above, as a method of obtaining the power Ploss_FO considered to be consumed by the foreign object, the power Ploss_FO may be obtained by Pr3−Pr3' (=Ploss_FO) or may be obtained by Ploss3'−Ploss3 (=Ploss_FO). While, in the following description of the present disclosure, the method of obtaining power loss by Ploss3'−Ploss3 (=Ploss_FO) will be basically described, the present exemplary embodiment is also applicable to the method of obtaining power loss by Pr3−Pr3' (=Ploss_FO). The foreign object detection that is based on the Power Loss method has been described.

After acquisition of the straight line 1002 by the Calibration processing, a foreign object detection unit 305 of the TX 402 periodically receives current receiving power value (for example, the above-described receiving power value Pr3') from the RX 401 via a communication unit 104. The current receiving power value that is periodically transmitted by the RX 401 is transmitted to the TX 402 as Received Power Packet (mode0). The foreign object detection unit 305 of the TX 402 performs the foreign object detection, based on the receiving power value stored in the Received Power Packet (mode0) and the straight line 1002.

The foreign object detection using the Power Loss method is executed during power transmission (power transmission) (Power Transfer phase to be described below), based on data obtained by the Calibration phase to be described below. The foreign object detection using the Q value measurement method is executed before power transmission (before Digital Ping transmission to be described below, Negotiation phase or ReNegotiation phase).

Next, communication between a power receiving apparatus and a power transmission apparatus in conformity with the WPC standard will be described. The RX 401 and the TX 402 according to the present exemplary embodiment perform control communication for power transmission and reception control in conformity with the WPC standard. The WPC standard defines a plurality of phases including the Power Transfer phase in which power transmission is executed, and one or more phases before actual power transmission, and communication for power transmission and reception control required in each phase is performed. The phases before power transmission can include a Selection phase, a Ping phase, an Identification and Configuration phase, the Negotiation phase, and the Calibration phase. The Identification and Configuration phase will be hereinafter referred to as an I & C phase. Processing to be executed in each phase will be described.

In the Selection phase, the TX 402 intermittently transmits an Analog Ping to detect that an object has been placed on a charging stand of the TX 402 (for example, detect that the RX 401, a conductor strip, or the like has been placed on the charging stand). The TX 402 detects at least either one of a voltage value and a current value of the power transmission antenna in the transmission of the analog ping, and in a case where the voltage value falls below a certain threshold value or in a case where the current value exceeds a certain threshold value, the TX 402 determines that an object exists and transitions to the Ping phase.

In the Ping phase, the TX 402 transmits a Digital Ping with power larger than the Analog Ping. The magnitude of power of the Digital Ping is sufficient for activating a control unit of the RX 401 placed on the TX 402. The RX 401 notifies the TX 402 of the magnitude of a power receiving voltage. In this manner, by receiving a response from the RX 401 that has received the Digital Ping, the TX 402 recognizes that an object detected in the Selection phase is the RX 401. In response to receipt of a notification indicating the power receiving voltage value, the TX 402 transitions to the I & C phase. Before transmitting a digital ping, the TX 402 measures a Q value (Q-Factor) of the power transmission antenna. This measurement result is to be used when foreign object detection processing using the Q value measurement method is executed.

In the I & C phase, the TX 402 identifies the RX 401 and acquires device configuration information (capability information) from the RX 401. The RX 401 transmits an ID Packet and a Configuration Packet. The ID Packet contains identifier information on the RX 401, and the Configuration Packet contains device configuration information (capability information) on the RX 401. The TX 402 that has received the ID Packet and the Configuration Packet transmits a response indicating acknowledge (ACK, positive response). Then, the I & C phase ends.

In the Negotiation phase, a value of GP is determined based on a value of GP requested by the RX 401, power transmission capability of the TX 402, and the like. Values of MP and PP are also determined in the Negotiation phase. The TX 402 receives, from the RX 401, a foreign object detection (FOD) status packet containing information regarding a Reference Quality Factor Value, adjusts a threshold value to be used in the Q value measurement method, and determines the threshold value. Then, in accordance with a request from the RX 401, the TX 402 executes foreign object detection processing using the Q value measurement method. The WPC standard defines a method of performing processing similar to the Negotiation phase again in response to a request from the RX 401 after the phase once shifts to the Power Transfer phase. A phase, in which processing similar to the Negotiation phase is performed again, shifted from the Power Transfer phase to be described below will be referred to as the Renegotiation phase.

In the Calibration phase, the above-described Calibration processing is executed in conformity with the WPC standard. The RX 401 notifies the TX 402 of a predetermined receiving power value (receiving power value in the Light Load state/receiving power value in the maximum load state), and the TX 402 performs adjustment to efficiently perform power transmission. The receiving power value contained in the notification transmitted to the TX 402 can be used for the foreign object detection processing using the Power Loss method.

In the Power Transfer phase, control for starting or continuing power transmission, and for stopping power transmission due to an error or full charge is performed. To perform the power transmission and reception control, the TX 402 and the RX 401 perform communication by using the power transmission antenna and the power receiving antenna in wireless power transmission in conformity with the WPC standard to superimpose a signal onto electromagnetic waves to be transmitted from the power transmission antenna or the power receiving antenna. A range in which communication in conformity with the WPC standard is able to be performed between the TX 402 and the RX 401 is almost similar to a power transmission executable range of the TX 402.

Configurations of Power Transmission Apparatus 402 and Power Receiving Apparatus 401

Subsequently, configurations of the power transmission apparatus 402 (the TX 402) and the power receiving apparatus 401 (the RX 401) according to the present exemplary embodiment will be described. A configuration to be described below is merely an example, and a part (all in some cases) of configurations to be described may be omitted or replaced with another configuration having another similar function, and an additional configuration may be added to the configurations to be described. Furthermore, one block to be described below may be divided into a plurality of blocks, or a plurality of blocks may be integrated into one block. A function of each functional block to be described below is executed as a software program, but a part or all of the function included in this functional block may be implemented as hardware.

Figure 1:
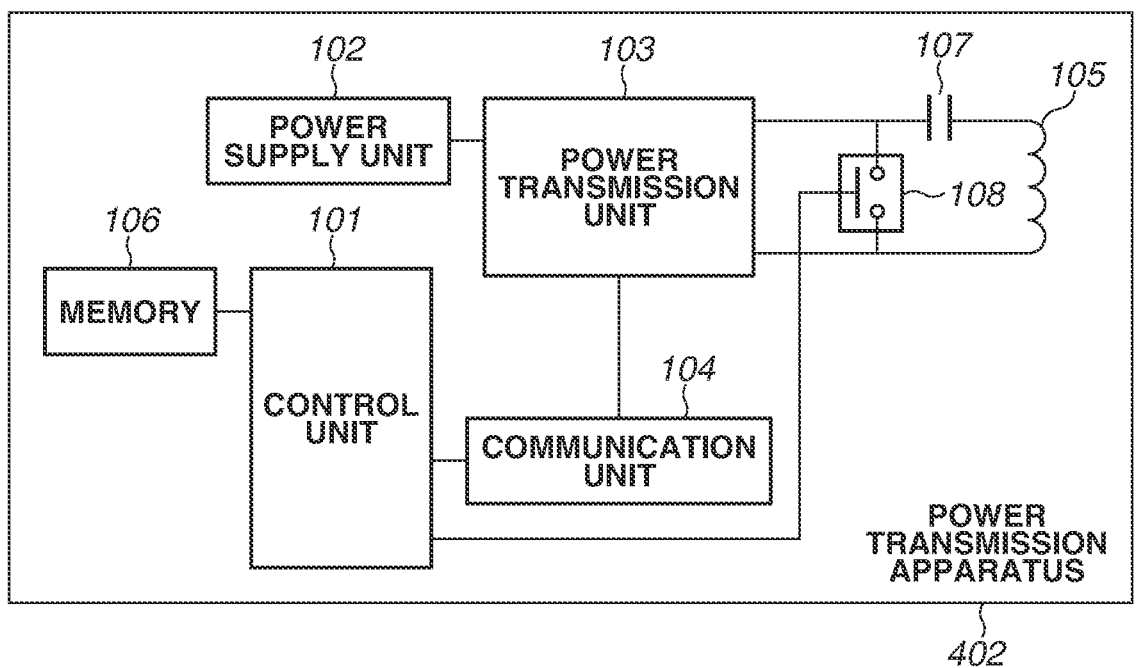
FIG. 1 is a diagram illustrating a configuration example of a power transmission apparatus.

FIG. 1 is a functional block diagram illustrating a configuration example of the TX 402 according to the present exemplary embodiment. The TX 402 includes a control unit 101, a power supply unit 102, a power transmission unit 103, the communication unit 104, a power transmission antenna 105, a memory 106, a resonance capacitor 107, and a switch unit 108. While, in FIG. 1, the control unit 101, the power supply unit 102, the power transmission unit 103, the communication unit 104, and the memory 106 are illustrated as separate members, any functional blocks of these may be mounted on the same chip.

The control unit 101 executes control programs stored in the memory 106, for example, to control the entire TX 402. Further, the control unit 101 performs control related to power transmission control including communication for device authentication in the TX 402. Furthermore, the control unit 101 may perform control to execute an application other than wireless power transmission. The control unit 101 includes one or more processors, such as a central processing unit (CPU) or a microprocessor unit (MPU). The control unit 101 may include hardware, such as an application specific integrated circuit (ASIC). The control unit 101 may include an array circuit, such as a Field Programmable Gate Array (FPGA) compiled to execute predetermined processing. The control unit 101 stores information that is to be stored during execution of various types of processing, into the memory 106. In addition, the control unit 101 is able to measure a time using a timer (not illustrated).

The power supply unit 102 supplies power to each functional block. Examples of the power supply unit 102 include a commercial power supply and a battery. Power supplied from a commercial power supply is stored into the battery.

The power transmission unit 103 wirelessly performs power transmission to the RX 401 by using the power transmission antenna 105. The power transmission unit 103 converts direct-current or alternating-current power input from the power supply unit 102 into alternating-current frequency power in a frequency band to be used for wireless power transmission and inputs the alternating current frequency power to the power transmission antenna 105 to produce electromagnetic waves for causing the RX 401 to receive power. For example, the power transmission unit 103 converts a direct-current voltage supplied by the power supply unit 102 into an alternating-current voltage via a switching circuit having a half-bridge or full-bridge configuration using a field-effect transistor (FET). In this case, the power transmission unit 103 includes a gate driver that controls ON/OFF of the FET.

The power transmission unit 103 adjusts a voltage (power transmission voltage) or a current (power transmission current), or both of these, to be input to the power transmission antenna 105 to control the intensity of electromagnetic waves to be output. With increase in a power transmission voltage or a power transmission current, the intensity of electromagnetic waves increases, and with decrease in a power transmission voltage or a power transmission current, the intensity of electromagnetic waves becomes decreases. Based on an instruction of the control unit 101, the power transmission unit 103 performs output control of the alternating-current frequency power in such a manner that power transmission from the power transmission antenna 105 is started or stopped. The power transmission unit 103 has capability of supplying power enough for outputting 15-watt (W) power to a charging unit 206 of the RX 401 that complies with the WPC standard.

The communication unit 104 performs communication for the above-described power transmission control in conformity with the WPC standard with the RX 401. The communication unit 104 performs communication by performing frequency shift modulation on electromagnetic waves to be output from the power transmission antenna 105 and transmitting information to the RX 401. Further, the communication unit 104 demodulates electromagnetic waves that have been amplitude-modulated or load-modulated by the RX 401 and transmitted via the power transmission antenna 105, to acquire information transmitted by the RX 401. That is, communication that is performed by the communication unit 104 is performed in such a manner that a signal is superimposed onto electromagnetic waves transmitted from the power transmission antenna 105. The communication unit 104 may communicate with the RX 401 via communication based on a standard different from the WPC standard and use an antenna different from the power transmission antenna 105, or may communicate with the RX 401 by selectively using a plurality of types of communication. Examples of the communication standard include Bluetooth (registered trademark) Low Energy (Bluetooth LE), and Near Field Communication (NFC).

In addition to storing control programs, the memory 106 stores states (transmitted power value, received power value, etc.) of the TX 402 and the RX 401, and the like. For example, the state of the TX 402 is acquired by the control unit 101, and the state of the RX 401 is acquired by a control unit 201 of the RX 401 and received via the communication unit 104.

The switch unit 108 is controlled by the control unit 101. The power transmission antenna 105 is connected with the resonance capacitor 107, and in a case where a short circuit is established with the switch unit 108 entering an ON state, the power transmission antenna 105 and the resonance capacitor 107 form a serial resonance circuit and resonate with each other at a specific frequency f1. In this process, a current flows through a closed circuit formed by the power transmission antenna 105, the resonance capacitor 107, and the switch unit 108. In a case where the switch unit 108 enters an OFF state, and the circuit is opened, power is supplied to the power transmission antenna 105 and the resonance capacitor 107 from the power transmission unit 103.

Figure 2:
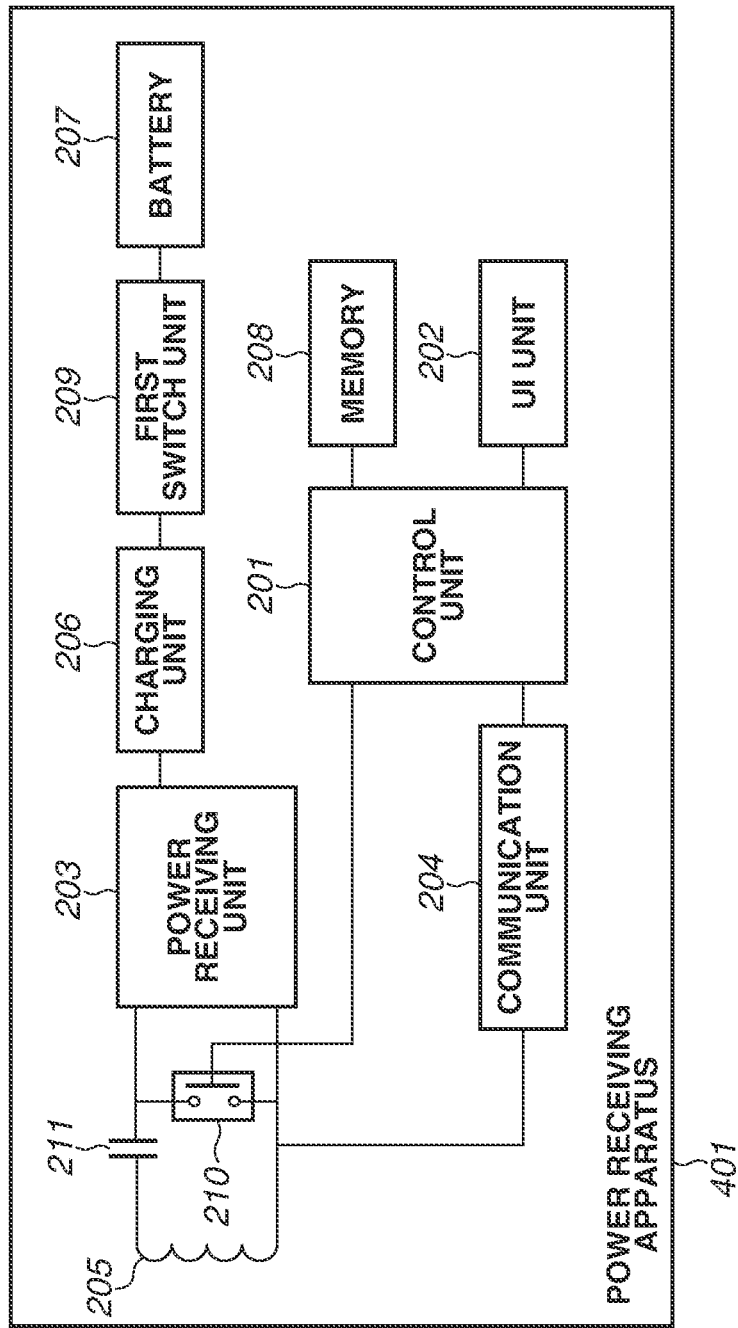
FIG. 2 is a diagram illustrating a configuration example of a power receiving apparatus.

FIG. 2 is a block diagram illustrating a configuration example of the RX 401 according to the present exemplary embodiment. The RX 401 includes the control unit 201, a user interface (UI) unit 202, a power receiving unit 203, a communication unit 204, a power receiving antenna 205, the charging unit 206, a battery 207, a memory 208, a first switch unit 209, a second switch unit 210, and a resonance capacitor 211. A plurality of functional blocks illustrated in FIG. 2 may be implemented as one hardware module.

The control unit 201 executes control programs stored in the memory 208, for example, to control the entire RX 401. That is, the control unit 201 controls each functional unit illustrated in FIG. 2. The control unit 201 may perform control for executing an application other than wireless power transmission. As an example, the control unit 201 includes one or more processors, such as a CPU or an MPU. In cooperation with an operating system (OS) executed by the control unit 201, the control unit 201 may control the entire RX 401 (in a case where the RX 401 is a smartphone, the entire smartphone).

The control unit 201 may include hardware, such as an ASIC. The control unit 201 may include an array circuit, such as an FPGA, compiled to execute predetermined processing. The control unit 201 stores information to be stored during execution of various types of processing into the memory 208. Further, the control unit 201 is able to measure a time using a timer (not illustrated).

The UI unit 202 performs various types of output to users. The various types of output include operations, such as screen display, blinking and color change of a light emitting diode (LED), voice output by a speaker, and the vibration of the RX 401 main body. The UI unit 202 is implemented by a liquid crystal panel, a speaker, a vibration motor, or the like.

The power receiving unit 203 wirelessly receives power from the TX 402 by using the power receiving antenna 205. Via the power receiving antenna 205, the power receiving unit 203 acquires alternating-current power (alternating-current voltage and alternating-current) generated by electromagnetic induction based on electromagnetic waves radiated from the power transmission antenna 105 of the TX 402. Then, the power receiving unit 203 converts the alternating-current power into direct-current power or alternating-current power at a predetermined frequency and outputs the converted power to the charging unit 206 that performs processing for charging the battery 207. That is, the power receiving unit 203 includes a rectifying unit and a voltage control unit that are used for supplying power to the load in the RX 401. The above-described GP is an amount of power that is guaranteed to be output from the power receiving unit 203. The power receiving unit 203 supplies power for the charging unit 206 charging the battery 207 and has capability of supplying power enough for outputting 15-watt power to the charging unit 206.

The communication unit 204 performs communication for the above-described power transmission control in conformity with the WPC standard with the communication unit 104 included in the TX 402. The communication unit 204 acquires information transmitted from the TX 402 by demodulating electromagnetic waves input via the power receiving antenna 205. The communication unit 204 superimposes a signal related to information to be transmitted to the TX 402 onto electromagnetic waves by performing amplitude-modulating or load-modulating the input electromagnetic waves, to communicate with the TX 402. The communication unit 204 may communicate with the TX 402 by communication based on a standard different from the WPC standard and use an antenna different from the power receiving antenna 205, or may communicate with the TX 402 by selectively using a plurality of types of communication. Examples of the communication standard include Bluetooth (registered trademark) Low Energy (Bluetooth LE), and Near Field Communication (NFC).

In addition to storing control programs, the memory 208 stores states of the TX 402 and the RX 401, and the like. For example, the state of the RX 401 can be acquired by the control unit 201, and the state of the TX 402 can be acquired by the control unit 101 of the TX 402 and received via the communication unit 204.

The first switch unit 209 and the second switch unit 210 are controlled by the control unit 201. The power receiving antenna 205 is connected with the resonance capacitor 211, and in a case where a short circuit is established with the second switch unit 210 entering the ON state, the power receiving antenna 205 and the resonance capacitor 211 forma serial resonance circuit and resonate with each other at a specific frequency f2. In this state, a current flows to a closed circuit formed by the power receiving antenna 205, the resonance capacitor 211, and the second switch unit 210, and a current does not flow to the power receiving unit. In a case where the second switch unit 210 enters the OFF state, and the circuit is opened, power received by the power receiving antenna 205 and the resonance capacitor 211 is supplied to the power receiving unit 203.

The first switch unit 209 is a switch unit to control determination of whether received power is supplied to the battery serving as a load. The first switch unit 209 also has a function of controlling a value of the load. In a case where the charging unit 206 and the battery 207 are connected by the first switch unit 209, received power is supplied to the battery 207. In a case where the connection between the charging unit 206 and the battery 207 is disconnected by the first switch unit 209, received power is not supplied to the battery 207.

While the first switch unit 209 is disposed between the charging unit 206 and the battery 207 in FIG. 2, the first switch unit 209 may be disposed between the power receiving unit 203 and the charging unit 206. Alternatively, the first switch unit 209 may be disposed between a closed circuit, which is formed by the power receiving antenna 205, the resonance capacitor 211, and the second switch unit 210, and the power receiving unit 203. In other words, the first switch unit 209 may be a unit to control determination of whether received power is supplied to the power receiving unit 203. While, in FIG. 2, the first switch unit 209 is indicated as one block, the first switch unit 209 may be implemented as a part of the charging unit 206 or a part of the power receiving unit 203.

Figure 3:
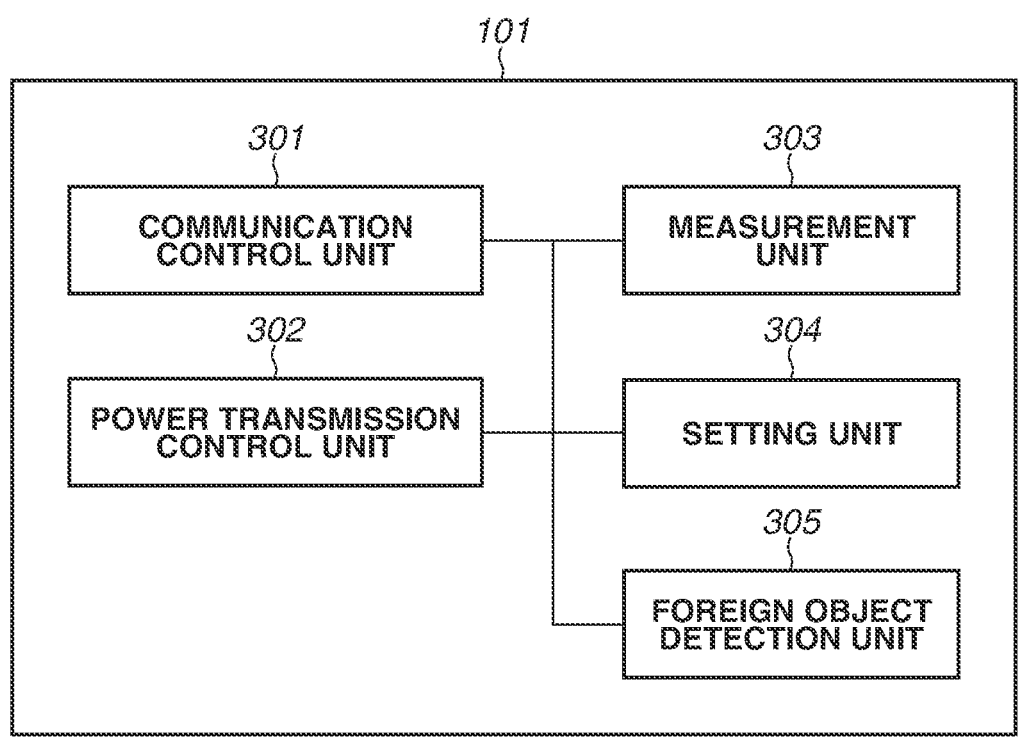
FIG. 3 is a block diagram illustrating a functional configuration example of a control unit of the power transmission apparatus.

Functions of the control unit 101 of the TX 402 will be described with reference to FIG. 3. FIG. 3 is a block diagram illustrating a functional configuration example of the control unit 101 of the TX 402. The control unit 101 includes a communication control unit 301, a power transmission control unit 302, a measurement unit 303, a setting unit 304, and the foreign object detection unit 305. The communication control unit 301 performs control communication with the RX 401 in conformity with the WPC standard via the communication unit 104. The power transmission control unit 302 controls the power transmission unit 103 and controls power transmission to the RX 401. The measurement unit 303 measures a waveform decay index to be used in a waveform decay method to be described below. The measurement unit 303 measures power to be transmitted to the RX 401 via the power transmission unit 103 and measures average transmission power per unit time. In addition, the measurement unit 303 measures a Q value of the power transmission antenna 105.

Based on the waveform decay index measured by the measurement unit 303, the setting unit 304 sets a threshold value to be used for foreign object detection by, for example, calculation processing.

The foreign object detection unit 305 is able to implement a foreign object detection function using the Power Loss method, a foreign object detection function using the Q value measurement method, and a foreign object detection function using the waveform decay method. The foreign object detection unit 305 may have a function for performing foreign object detection processing using another method. For example, in a case where the TX 402 has a Near Field Communication (NFC) communication function, the foreign object detection unit 305 may perform foreign object detection processing using a counterpart device detection function in conformity with an NFC standard. As a function other than a function of detecting a foreign object, the foreign object detection unit 305 is also able to detect a change occurred in the state on the TX 402. For example, the TX 402 is also able to detect increase and decrease in the number of RXs 401 on the TX 402. The setting unit 304 sets a threshold value serving as a reference for determination of the existence or non-existence of a foreign object in a case where the TX 402 performs foreign object detection using the Power Loss method, the Q value measurement method, or the waveform decay method to be described below. The setting unit 304 may have a function of setting a threshold value that serves as a reference for determination of the existence or non-existence of a foreign object and is used in foreign object detection processing using another method. The foreign object detection unit 305 is able to perform foreign object detection processing based on the threshold value set by the setting unit 304, and a waveform decay index, transmitted power, and a Q value measured by the measurement unit 303.

Functions of the communication control unit 301, the power transmission control unit 302, the measurement unit 303, the setting unit 304, and the foreign object detection unit 305 are implemented as programs operating in the control unit 101. The processing units are formed as independent programs and can concurrently operate while performing synchronization between programs by event processing or the like. Two or more of these processing units may be incorporated into one program.

Procedure of Processing for Power Transmission in conformity with WPC Standard

Figure 5:
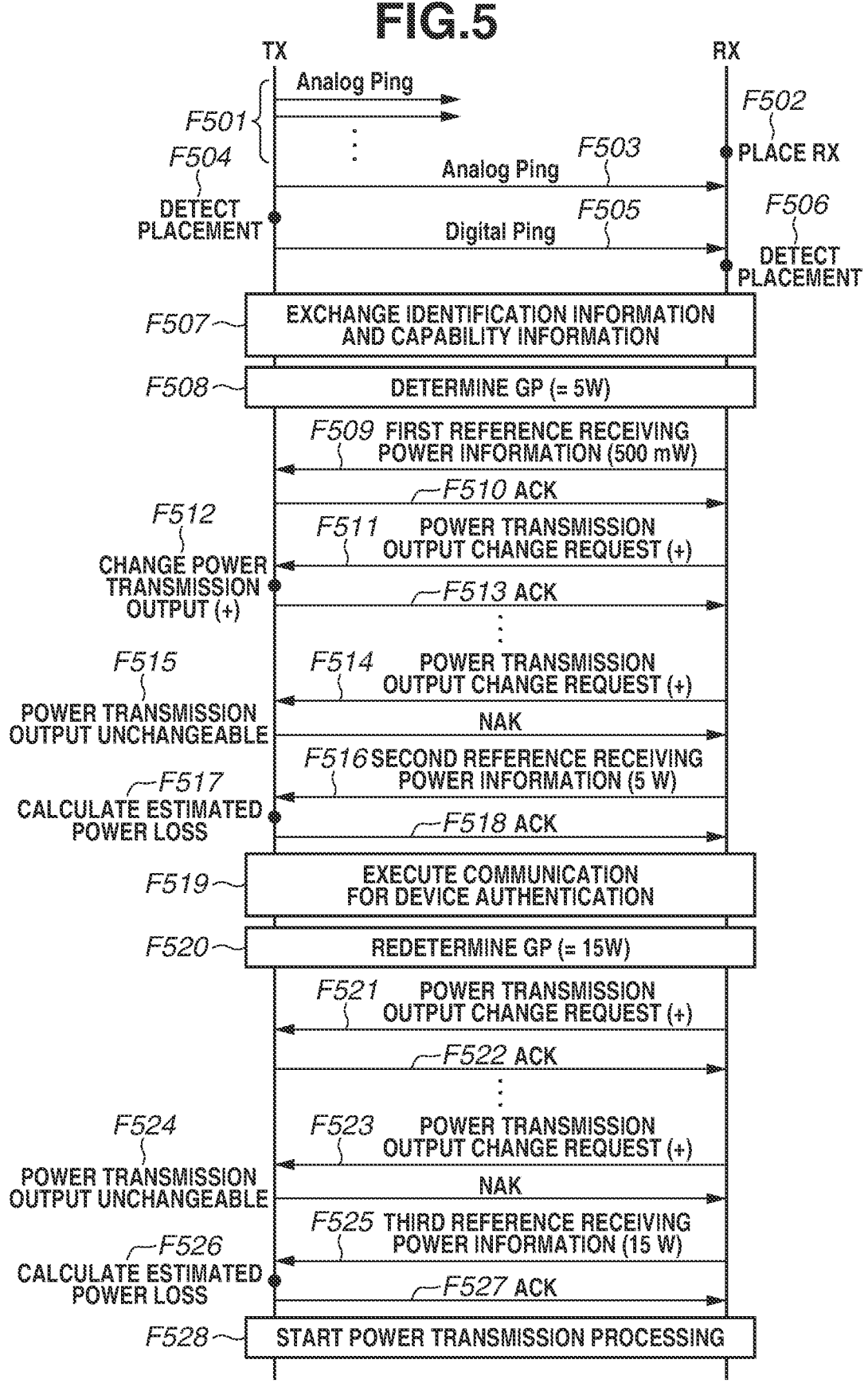
FIG. 5 is a sequence diagram illustrating an example of processing for wireless power transmission.

The WPC standard defines the Selection phase, the Ping phase, the I & C phase, the Negotiation phase, the Calibration phase, and the Power Transfer phase. Descriptions will be given of operations of the TX 402 and the RX 401 in these phases with reference to a sequence diagram illustrated in FIG. 5. FIG. 5 is a sequence diagram for power transfer in conformity with the WPC standard. The description will be given using the TX 402 (the TX 402) and the RX 401 as an example.

In step F501, the TX 402 repeatedly and intermittently transmits an Analog Ping of the WPC standard to detect an object existing within a power transmission executable range. The TX 402 executes processing defined as the Selection phase and the Ping phase of the WPC standard and waits for the RX 401 to be placed. In step F502, the user of the RX 401 brings the RX 401 closer to the TX 402 to charge the RX 401 (for example, smartphone). For example, the user of the RX 401 brings the RX 401 closer to the TX 402 by placing the RX 401 on the TX 402. In steps F503 and F504, in a case where the TX 402 detects that an object exists within the power transmission executable range, the TX 402 transmits a Digital Ping of the WPC standard in step F505. In step F506, in response to receipt of the Digital Ping, the RX 401 recognizes that the TX 402 has detected the RX 401.

In a case where a predetermined response to the Digital Ping is received, the TX 402 determines that the detected object is the RX 401, and the RX 401 has been placed on the charging stand 403.

In step F507, in a case where the TX 402 detects the placement of the RX 401, the TX 402 acquires identification information and capability information from the RX 401 by communication in the I & C phase defined in the WPC standard. In the present exemplary embodiment, the identification information of the RX 401 contains a Manufacturer Code and a Basic Device ID. The capability information on the RX 401 contains the following information. For example, the capability information on the RX 401 includes an information element by which a supported version of the WPC standard is identifiable, a Maximum Power Value by which maximum power that can be supplied to the load by the RX 401 is identifiable, and information indicating whether a Negotiation function of the WPC standard is included. The TX 402 may acquire the identification information and the capability information of the RX 401 using a method other than the communication in the I & C phase of the WPC standard. The identification information may be any different type of identification information, such as a Wireless Power ID by which the individual RX 401 is identifiable. As the capability information, information other than the above-described information may be included.

In step F508, the TX 402 determines a value of GP with the RX 401 by communication in the Negotiation phase defined in the WPC standard. Values of MP and PP are also determined in the Negotiation phase. The communication that is executed in F508 is not limited to the communication in the Negotiation phase of the WPC standard, and another procedure for determination of GP, MP, or PP may be executed. In a case where information indicating that the RX 401 does not support the Negotiation phase has been acquired in F507, for example, the TX 402 may set values of GP, MP, and PP to predetermined values without performing the communication in the Negotiation phase. The predetermined values to be set as GP, MP, and PP in this case may be a relatively small value predefined in the WPC standard, for example. In the present exemplary embodiment, GP=5 watts is set.

After GP is determined, the TX 402 performs Calibration based on the GP. In step F509, in the Calibration processing, first of all, the RX 401 transmits, to the TX 402, information (hereinafter, will be referred to as "first reference receiving power information") including receiving power in a Light Load state (load disconnected state, load state in which transmission power is equal to or smaller than a first threshold value). The first reference receiving power information in the present exemplary embodiment is receiving power information on the RX 401 in a case where transmission power from the TX 402 is 250 milliwatts. While the first reference receiving power information corresponds to a Received Power Packet (mode1) defined in the WPC standard, a different message may be used.

Based on a power transmission state of itself, the TX 402 determines whether to accept the first reference receiving power information. In a case where the TX 402 accepts the first reference receiving power information, the TX 402 transmits a positive response=ACK to the RX 401, and in a case where the TX 402 does not accept the first reference receiving power information, the TX 402 transmits a negative response=NAK to the RX 401.

In a case where the RX 401 receives ACK from the TX 402 in step F510, the RX 401 performs processing for transmitting, to the TX 402, information (hereinafter, will be referred to as "second reference receiving power information") including receiving power in a load connected state (maximum load state, load state in which transmission power is equal to or larger than a second threshold value). In the present exemplary embodiment, since the GP is 5 watts, the second reference receiving power information is receiving power information on the RX 401 in a case where transmission power from the TX 402 is 5 watts. While the second reference receiving power information corresponds to a Received Power Packet (mode2) defined in the WPC standard, a different message may be used. In step F511, the RX 401 transmits a power transmission output change instruction containing a positive value to increase transmission power from the TX 402 to 5 watts.

In steps F512 and F513, the TX 402 receives the above-described power transmission output change instruction, and in a case where transmission power can be increased, the TX 402 transmits a response indicating ACK and increases transmission power. Since the second reference receiving power information is receiving power information about a case when transmission power of the TX 402 is 5 watts, in a case where a power increase request exceeding 5 watts has been received from the RX 401 in step F514, the TX 402 transmits NAK as a response to the power transmission output change instruction. This response in step S515 prevents the transmission of power equal to or larger than predetermined power.

In step F516, the RX 401 that has determined based on NAK from the TX 402 that power has reached the predetermined transmission power transmits information containing receiving power in the load connected state as the second reference receiving power information to the TX 402. Based on the transmission power value of the TX 402 and receiving power values contained in the first reference receiving power information and the second reference receiving power information, the TX 402 is able to calculate amounts of power loss between the TX 402 and the RX 401 in the load disconnected state and the load connected state. In step F517, the TX 402 is able to calculate power loss values between the TX 402 and the RX 401 in an entire range of transmission power that can be transmitted by the TX 402 (in this case, from 250 milliwatts to 5 watts), by interpolating between these power loss amounts. In step F518, the TX 402 transmits ACK in response to the second reference receiving power information from the RX 401 and completes the Calibration processing. In a case where the TX 402 that has determined that charging processing can be started has started power transmission processing to the RX 401, charging of the RX 401 is to be started. In step F519, the TX 402 and the RX 401 perform device authentication processing before the start of power transmission processing, and in a case where the TX 402 and the RX 401 determine that the both apparatuses support larger GP, the GP may be reset to a larger value such as 15 watts, for example, in step F520.

In this case, in steps F521 to F524, to increase transmission power of the TX 402 to 15 watts, the RX 401 and the TX 402 use a power transmission output change instruction, ACK, and NAK to increase power transmission output. Then, the TX 402 and the RX 401 execute the Calibration processing again for GP=15 watts. Specifically, in step F525, the RX 401 transmits information (hereinafter, will be referred to as "third reference receiving power information") containing receiving power in the load connected state of the RX 401 in a case where transmission power of the TX 402 is 15 watts. The TX 402 performs Calibration based on receiving power contained in the first reference receiving power information, the second reference receiving power information, and the third reference receiving power information. In step F526, power loss amounts between the TX 402 and the RX 401 in the entire range of transmission power that can be transmitted by the TX 402 (in this case, from 250 milliwatts to 15 watts) are calculated. In step F527, the TX 402 transmits ACK in response to the third reference receiving power information from the RX 401 and completes the Calibration processing. In step F528, the TX 402 that has determined that charging processing can be started starts power transmission processing to the RX 401 and, in step F528, transitions to the Power Transfer phase.

In the Power Transfer phase, the TX 402 performs power transmission to the RX 401. In addition, foreign object detection using the Power Loss method is performed. In the Power Loss method, first of all, the TX 402 performs by the above-described Calibration to calculate a power loss amount between the TX 402 and the RX 401 in a state in which a foreign object does not exist, based on a difference between transmission power of the TX 402 and receiving power of the RX 401. The calculated value corresponds to a reference power loss amount in a normal state (state in which a foreign object does not exist) during power transmission processing. Then, in a case where a power loss amount between the TX 402 and the RX 401 that has been measured during power transmission after the Calibration deviates from the power loss amount in the normal state by a threshold value or more, the TX 402 determines that "a foreign object exits".

The Power Loss method has been described. The Power Loss method performs foreign object detection based on a measurement result of power loss during power transmission from the TX 402 to the RX 401. While the foreign object detection using the Power Loss method has such a demerit that the accuracy of foreign object detection declines during large power transmission from the TX 402, the foreign object detection has such a merit that power transmission efficiency can be maintained high because the foreign object detection can be performed during power transmission.

As described above, during the Power Transfer phase, the foreign object detection using the Power Loss method can be performed. However, only by the foreign object detection using the Power Loss method, there is a possibility of false detection of a foreign object or a possibility of false determination of determining that a foreign object does not exist, although a foreign object exists. In particular, the Power Transfer phase is a phase in which the TX 402 performs power transmission, and if a foreign object exists in the proximity of the TX 402 and the RX 401 during the power transmission, heat generation from the foreign object increases. Thus, accuracy of the foreign object detection in this phase is required to be improved. In the present exemplary embodiment, the waveform decay method is executed together as a foreign object detection method different from the Power Loss method to improve accuracy of the foreign object detection.

Foreign Object Detection Method Using Waveform Decay Method

Figure 6:
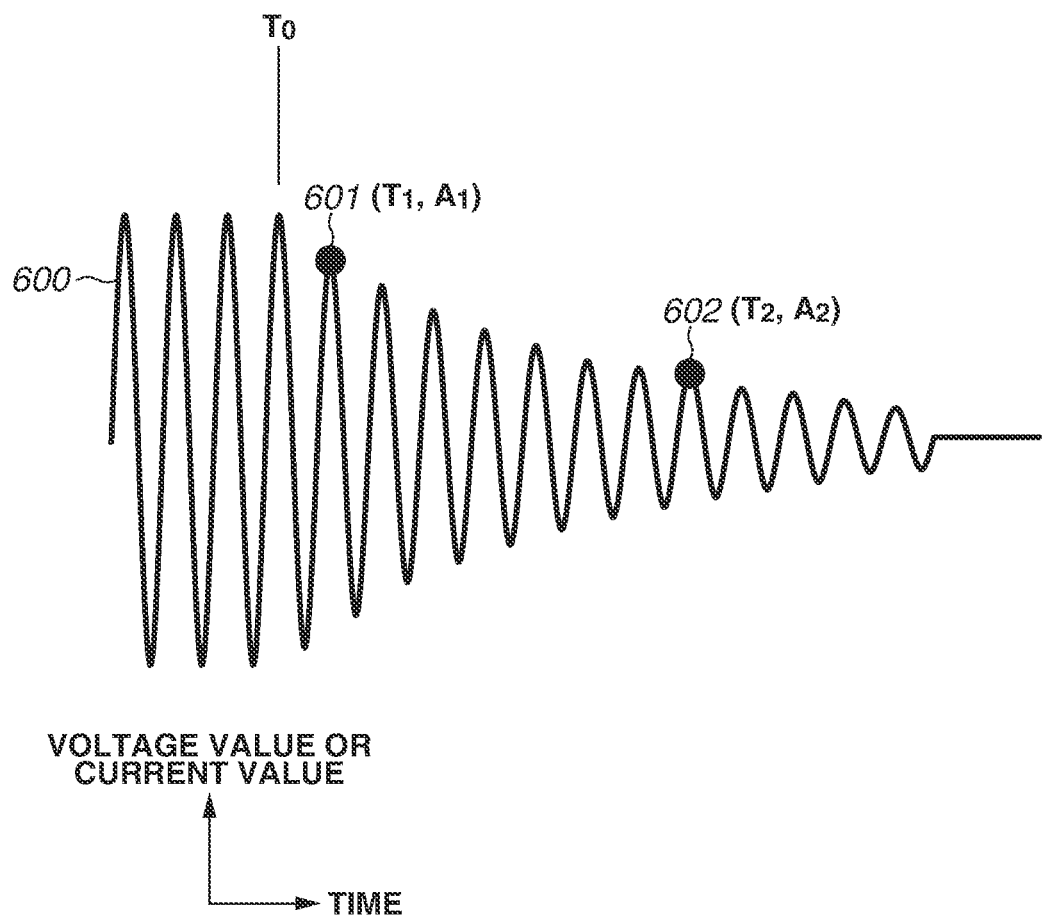
FIG. 6 is a diagram illustrating foreign object detection using a waveform decay method.

A method of performing foreign object detection based on a decay state of a power transmission waveform (hereinafter, will be referred to as "waveform decay method") will be described with reference to FIG. 6. Here, the "power transmission waveform" refers to a waveform of a voltage or a waveform of a current in the power transmission antenna 105 of the TX 402. FIG. 6 is a diagram illustrating the principle of foreign object detection using the waveform decay method. The description will be given using foreign object detection using a power transmission waveform related to power transmission from the TX 402 to the RX 401, as an example.

In FIG. 6, a waveform indicates a temporal change of a voltage value 600 of a high-frequency voltage (hereinafter, will be simply referred to as a "voltage value") that is applied to the power transmission antenna 105 of the TX 402. In FIG. 6, a horizontal axis indicates a time and a vertical axis indicates a voltage value. The TX 402 transmitting power to the RX 401 via the power transmission antenna 105 stops power transmission at a time T0. That is, at the time T0, power supply for power transmission from the power supply unit 102 is stopped. The frequency of a power transmission waveform related to power transmission from the TX 402 is a predetermined frequency and is a fixed frequency from 85 kHz to 205 kHz that is used in the WPC standard, for example.

A point 601 is a point on an envelope curve of a high-frequency voltage and indicates a voltage value at a time $T_1$. In FIG. 6, $(T_1, A_1)$ indicates that a voltage value at the time $T_1$ is $A_1$. Similarly, a point 602 is a point on the envelope curve of the high-frequency voltage and indicates a voltage value at a time $T_2$. In FIG. 6, $(T_2, A_2)$ indicates that a voltage value at the time $T_2$ is $A_2$. The quality coefficient (Q value) of the power transmission antenna (power transmission coil) 105 is obtainable based on a temporal change from the time T0 in a voltage value of the power transmission antenna 105. For example, the Q value is calculated using Formula 1 based on the times at points 601 and 602 on the envelope curve of the voltage value, voltage values, and a frequency f of a high-frequency voltage.

$$Q = \pi f(T_2 - T_1)/\ln(A_1/A_2) \quad (1)$$

In a case where a foreign object exists in the proximity of the TX 402 and the RX 401, the Q value decreases. This is because, in a case where a foreign object exists, energy loss is generated by the foreign object. Thus, when attention is focused on the gradient of decay of a voltage value, because energy loss is more generated by a foreign object when the foreign object exists, as compared with a case where a foreign object does not exist, the gradient of a straight line connecting the points 601 and 602 is steeper, and a decay rate (decay amount) of the amplitude of the waveform becomes higher. In other words, the waveform decay method determines the existence or non-existence of a foreign object based on a decay state of a voltage value between the points 601 and 602. In the determination of the existence or non-existence of a foreign object, a predetermined index of a numerical value indicating this decay state is used to perform the determination.

For example, the determination can be performed using the above-described Q value. A decrease in Q value means that a waveform decay rate (decreasing degree of the amplitude of the waveform per unit time) increases.

Alternatively, the determination may be performed using the gradient of a straight line connecting the points 601 and 602 that is obtained from $(A_1-A_2)/(T_2-T_1)$. Alternatively, in a case where the times ($T_1$ and $T_2$) for observation of the decay state of the voltage values are fixed, the determination can also be performed using a value of $(A_1-A_2)$ indicating a difference between the voltage values or a value of $(A_1/A_2)$ indicating a ratio of the voltage values. Alternatively in a case where the voltage value $A_1$ immediately after power transmission has stopped is fixed, the determination can also be performed using a value of the voltage value $A_2$ obtained after the lapse of a predetermined time. Alternatively, the determination may be performed using a value of a time $(T_2-T_1)$ which is a time until the voltage value $A_1$ reaches the predetermined voltage value $A_2$. In the above-described manner, the TX 402 determines the existence or non-existence of a foreign object by measuring voltages of the power transmission antenna 105 at least two or more time points within a period in which power transmission is restricted, and acquiring values of a decay amount and a decay rate of the voltages, and the Q value based on the measurement result. The TX 402 may be configured to measure voltages at three or more time points.

As described above, the existence or non-existence of a foreign object can be determined based on a decay state of a voltage value during a power transmission stop period, and there are variety of values indicating the decay states. In the present exemplary embodiment, any value indicating the decay state will be referred to as a "waveform decay index". For example, as described above, the Q value that is calculated using Formula 1 is a value indicating a decay state of a voltage value related to power transmission and is included in the "waveform decay index". Any waveform decay index is a value that corresponds to waveform decay rates or waveform decay amounts. In the waveform decay method, a waveform decay rate itself and a decay amount itself may be measured as a "waveform decay index". While the description will be mainly given of a case where a waveform decay rate is used as a waveform decay index, the description in the present exemplary embodiment is similarly applicable to a case where another waveform decay index is used.

Even in a case where the vertical axis in FIG. 6 indicates a value of a current flowing in the power transmission antenna 105, similarly to the case of the voltage value, a decay state of the current value during a power transmission stop period changes depending on the existence or non-existence of a foreign object. In a case where a foreign object exits, a waveform decay rate increases in comparison with a case where a foreign object does not exist. More specifically, even in a case where the above-described method is applied to a temporal change of a current value flowing in the power transmission antenna 105, a foreign object is still detectable. That is, an index indicating a decay state of current, such as a Q value obtained from a current waveform, the gradient of decay of a current value, a difference in current value, a ratio of current values, an absolute value of a current value, and a time until a current value reaches a predetermined current value, is used as a waveform decay index in the determination of the existence or non-existence of a foreign object to detect a foreign object. The foreign object detection may be performed based on both of a decay state of a voltage value and a decay state of a current value by determining the existence or non-existence of a foreign object using an evaluation value calculated from a waveform decay index of a voltage value and a waveform decay index of a current value, for example.

While, in the above-described example, a waveform decay index during a period in which the TX 402 temporarily stops power transmission is measured, the configuration is not limited to this. For example, a waveform decay index during a period in which the TX 402 temporarily lowers power from the power supply unit 102 from a predetermined power level to a power level lower than the predetermined power level may be measured. That is, in the waveform decay method, the foreign object detection is performed based on a decay state of at least either of a voltage and a current of the power transmission antenna 105 during a period in which the TX 402 stops power transmission or restricts power transmission to lower power to a predetermined value.

Figure 7:
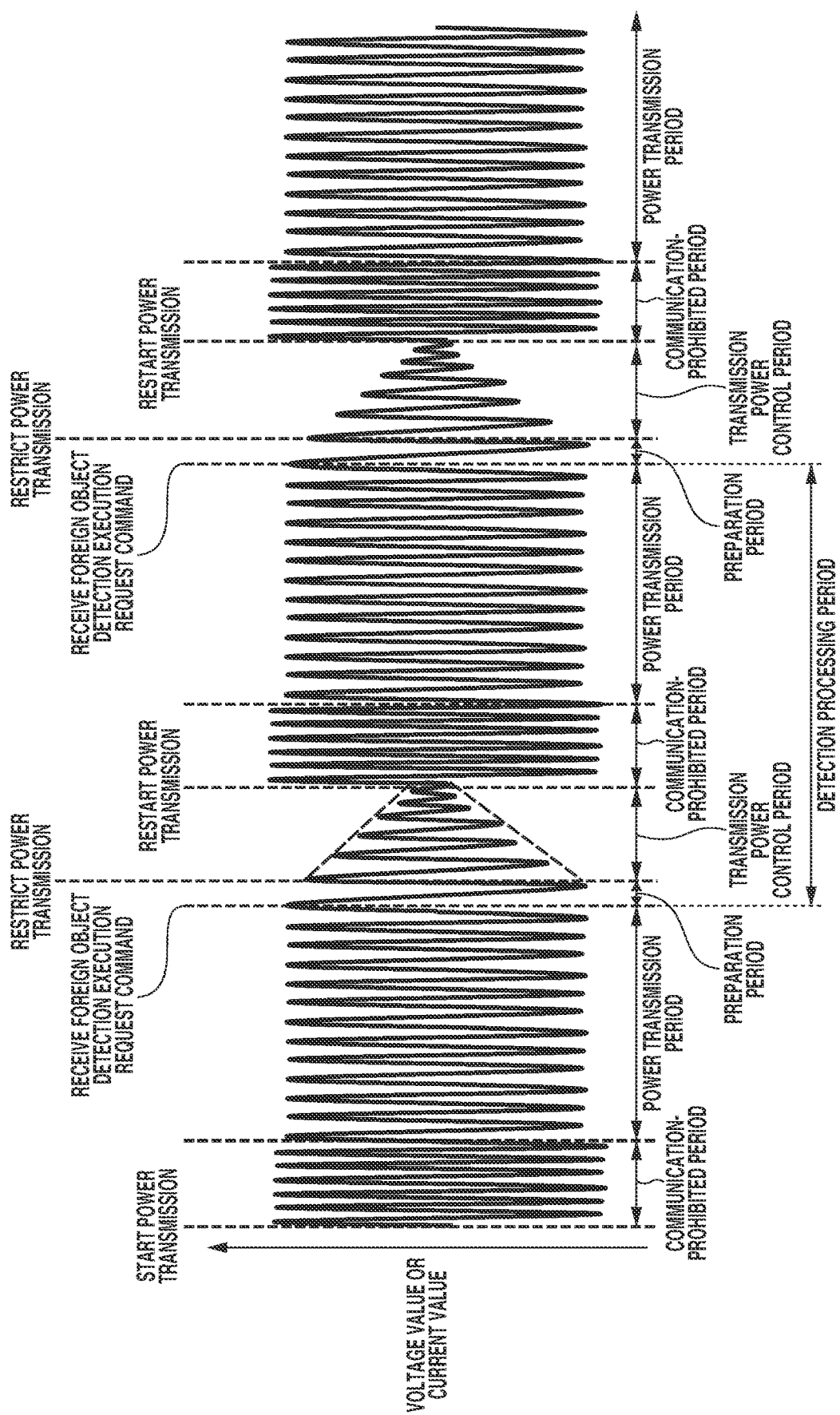
FIG. 7 is a diagram illustrating a method of foreign object detection based on a power transmission waveform during power transmission.

A method of performing foreign object detection using the waveform decay method based on a power transmission waveform during power transmission will be described with reference to FIG. 7. FIG. 7 illustrates a power transmission waveform in a case where the foreign object detection using the waveform decay method is performed, a horizontal axis indicates a time, and a vertical axis indicates a voltage value of the power transmission antenna 105. Similarly to FIG. 6, a vertical axis may indicate current value of a current flowing in the power transmission antenna 105. FIG. 7 illustrates a waveform of a case where the waveform decay method is performed a plurality of times, but description will be given of a case where the waveform decay method is performed once with reference to FIG. 7.

In a case where the TX 402 receives a foreign object detection execution request packet (command) from the RX 401 during a power transmission period, the TX 402 temporarily stops power transmission after the lapse of a predetermined period. Alternatively, the TX 402 restricts power transmission by temporarily lowering transmission power. Such a predetermined period from when a foreign object detection execution request packet (hereinafter, will be referred to as an "execution request packet") has been received until when the restriction of transmission power is started will be hereinafter referred to as a preparation period. In the present exemplary embodiment, a signal serving as the execution request packet is a signal indicating the magnitude of power received by the RX 401 from the TX 402. Examples of the signal indicating the magnitude of received power include a Received Power Packet (mode0), a Received Power Packet (mode1), and a Received Power Packet (mode2), for example. In a case where the TX 402 receives the signals, the TX 402 determines that the execution request packet has been received and executes the waveform decay method. The execution request packet is not limited to these, and a dedicated packet for a request may be used.

In a case where the execution request packet is received, the power transmission control unit 302 of the TX 402 stops power transmission or lowers transmission power. As a result, the amplitude of a power transmission waveform decays. Such a power transmission restriction period in which power transmission is restricted, i.e., from when the TX 402 temporarily stops transmission power or restricts transmission power by temporarily lowering transmission power until when power transmission is restarted will be hereinafter referred to as a transmission power control period. More specifically, a period from when the gradient has become a minus gradient equal to or smaller than a predetermined value until when the gradient of an envelope curve of a power transmission waveform of power transmitted by the TX 402 to the RX 401 becomes zero or a plus gradient equal to or larger than a predetermined value will be referred to as the transmission power control period.

The TX 402 calculates a waveform decay index of the decay waveform, compares the calculated waveform decay index and a predetermined threshold value, and determines the existence or non-existence of a foreign object, or a possibility that a foreign object exists (existence probability). The determination may be executed during the transmission power control period or may be executed during a communication-prohibited period to be described below or the power transmission period.

In a case where a foreign object has not been detected after the lapse of the transmission power control period, the TX 402 restarts power transmission. During a transient response period immediately after the TX 402 has started power transmission, a power transmission waveform is unstable. Thus, during the transient response period in which the power transmission waveform is unstable, the RX 401 performs control to avoid communication (communication by amplitude modulation or load modulation) with the TX 402. In addition, the TX 402 performs control to avoid communication (communication by frequency shift modulation) with the RX 401. Such a communication-restricted period in which communication is restricted will be referred to as a communication-prohibited period.

Specifically, a period from a timing when the gradient of an envelope curve of a power transmission waveform of power transmitted by the TX 402 to the RX 401 becomes equal to or larger than a predetermined plus value after the power transmission restart until a timing when communication becomes executable will be referred to as the communication-restricted period. The timing when communication is executable is a timing when communication between the RX 401 and the TX 402 is executable, or a timing when the TX 402 or the RX 401 transmits a packet. Alternatively, the communication-restricted period may be a period from a timing when the gradient of an envelope curve of a power transmission waveform of power transmitted by the TX 402 to the RX 401 becomes zero after the power transmission restart until a timing when communication becomes executable. Alternatively, the communication-restricted period may be a period from a timing when the TX 402 restarts power transmission, i.e., a timing when the power transmission control unit 302 increases the supply of transmitted power, until a timing when communication becomes executable. Alternatively, the communication-restricted period may be a period from a timing when the TX 402 has received a foreign object detection execution request packet (command) from the RX 401 until a timing when communication becomes executable. Alternatively, the communication-restricted period may be a period from a timing when the RX 401 has transmitted a foreign object detection execution request packet (command) to the TX 402 until a timing when communication becomes executable.

During the communication-prohibited period, power transmission by the TX 402 to the RX 401 is performed. A period in which the TX 402 performs power transmission to the RX 401 after the lapse of the communication-prohibited period will be hereinafter referred to as a power transmission period.

As described above, the TX 402 determines the preparation period, the transmission power control period, the communication-prohibited period, and the power transmission period. Then, the TX 402 calculates a waveform decay index of a decay waveform at a predetermined timing based on the determined periods, compares the calculated waveform decay index and a predetermined threshold value, and determines the existence or non-existence of a foreign object, or a possibility that a foreign object exists (existence probability). The above-described processing is a basic method of the foreign object detection using the waveform decay. In the following description, a series of periods including the communication-prohibited period, the power transmission period, the preparation period, and the transmission power control period will also be referred to as a detection processing period in the waveform decay method.

The detection processing period needs not include all of the communication-prohibited period, the power transmission period, the preparation period, and the transmission power control period. The detection processing period indicates a period including at least the transmission power control period. That is, the detection processing period is a processing period related to measurement processing of measuring voltages or currents at least two or more time points within a period in which transmission power is restricted. The detection processing period is determined by the power transmission control unit 302 of the TX 402.

If elements, such as the power receiving unit 203, the charging unit 206, and the battery 207, are connected to the power receiving antenna 205 and the resonance capacitor 211 of the RX 401 during the transmission power control period, a waveform decay index of a decay waveform receives the influence of a load caused by these elements. That is, the waveform decay index changes depending on the states of the power receiving unit 203, the charging unit 206, and the battery 207. For this reason, for example, even in a case where the waveform decay index is large, it sometimes becomes difficult to determine whether the large waveform decay index is due to the influence exerted by a foreign object, or whether the large waveform decay index is due to a state change of the power receiving unit 203, the charging unit 206, the battery 207, or the like. Thus, in the case of the foreign object detection that is performed by observation of a waveform decay index, the RX 401 may disconnect the first switch unit 209 during the above-described preparation period. This allows to exclude the influence of the battery 207. Alternatively, the RX 401 may perform control to cause the load to be in the above-described Light Load state (Light Load state) to minimize power to be received. Alternatively, the RX 401 may perform control to cause the load to be in the above-described Connected Load state (load connected state), to maximize power to be received or to cause the load to be supplied with power equal to or larger than a predetermined threshold value. In this manner, by causing the state of the load to be in a predetermined state, the influence of the state change of the power receiving unit 203, the charging unit 206, the battery 207, or the like can be excluded.

Alternatively, by establishing a short circuit with the second switch unit 210 being turned ON, a state in which a current flows to a closed loop formed by the power receiving antenna 205, the resonance capacitor 211, and the second switch unit 210 may be obtained. This leads to exclusion of the influence of the power receiving unit 203, the charging unit 206, and the battery 207. More specifically, in a case where the RX 401 transmits an execution request packet (command) to the TX 402, the RX 401 executes the above-described processing and establishes a short circuit (connection) with the first switch unit 209 or the second switch unit 210 being turned ON. Foreign object detection based on a waveform decay index of a waveform observed in this state allows the foreign object detection to be performed with high accuracy.

During the above-described preparation period, the RX 401 may perform control in such a manner that a transition to a low power consumption mode is performed or power is consumed constant, in a state in which a short circuit is established with the first switch unit 209 being turned ON and the second switch unit 210 is disconnected with the second switch unit 210 being turned OFF. In a case where power consumed by the RX 401 is not constant or in a case where large power is consumed, a waveform decay index of a decay waveform receives the influence of the variation in consumed power. Thus, to exclude the influence, an operation of a software application operating on the RX 401 is restricted or stopped, and a hardware functional block included in the RX 401 is brought into the low power consumption mode or an operation stop mode. In this manner, the RX 401 controls power to be consumed by itself. The foreign object detection based on a waveform decay index of a waveform observed in such a state allows the foreign object detection to be performed with high accuracy.

In a case where the TX 402 receives an execution request packet (command) from the RX 401, the TX 402 establishes a short circuit with the switch unit 108 being turned ON during the preparation period. More specifically, the TX 402 may transition to a state in which a current flows to a closed loop formed by the power transmission antenna 105, the resonance capacitor 107, and the switch unit 108. This leads to exclusion of the influence of the power supply unit 102, the power transmission unit 103, and the communication unit 104. Alternatively, a switch (not illustrated) is disposed between the power transmission antenna and the power transmission unit, and the switch is turned OFF during the above-described preparation period, which leads to exclusion of the influence of the power supply unit 102, the power transmission unit 103, and the communication unit 104.

Measurement Method of Index Indicating First Coupled State Between Power Transmission Antenna and Power Receiving Antenna The wireless power transmission performs power transmission by electromagnetically coupling the power transmission antenna 105 and the power receiving antenna 205. More specifically, an alternating current is fed to the power transmission antenna 105, and a magnetic flux penetrating the power receiving antenna 205 is changed, so that a voltage is induced to the power receiving antenna 205 and power transmission is performed. As an index indicating a coupled state between the power transmission antenna 105 and the power receiving antenna 205, a coupling coefficient may be used. For example, in a case where all (100%) of the magnetic flux generated in the power transmission antenna penetrates the power receiving antenna 205, a coupling coefficient k is "k=1". For example, in a case where 70% of the magnetic flux generated in the power transmission antenna 105 penetrates the power receiving antenna 205, a coupling coefficient k is "k=0.7". In this case, the remaining (30%) magnetic flux generated in the power transmission antenna 105 is flux leakage (leakage magnetic flux), and the flux leakage corresponds to a magnetic flux that is a part of the magnetic flux generated in the power transmission antenna 105 and has not penetrated the power receiving antenna 205. In other words, in a case where a coupled state is good and a value of a coupling coefficient is large, transfer efficiency of power that is transmitted from the TX 402 to the RX 401 is higher. On the other hand, in a case where a coupled state is bad and a value of a coupling coefficient is small, transfer efficiency of power to be transmitted from the TX 402 to the RX 401 is lower.

A cause for a bad coupled state is considered to be intrusion of a foreign object between the power transmission antenna 105 and the power receiving antenna 205, or a positional shift between the power transmission antenna 105 and the power receiving antenna 205. If a foreign object intrudes between the power transmission antenna 105 and the power receiving antenna 205, a heat generation might occur in the foreign object. If a positional shift between the power transmission antenna 105 and the power receiving antenna 205 occurs, because flux leakage (leakage magnetic flux) increases as described above, large noise may be generated in the vicinity. Thus, it is demanded to detect a bad coupled state (low coupling coefficient) and perform appropriate control. In the present exemplary embodiment, the TX 402 and the RX 401 may execute the measurement of the above-described coupled state (including a coupling coefficient) between the power transmission antenna 105 and the power receiving antenna 205.

Figure 16:
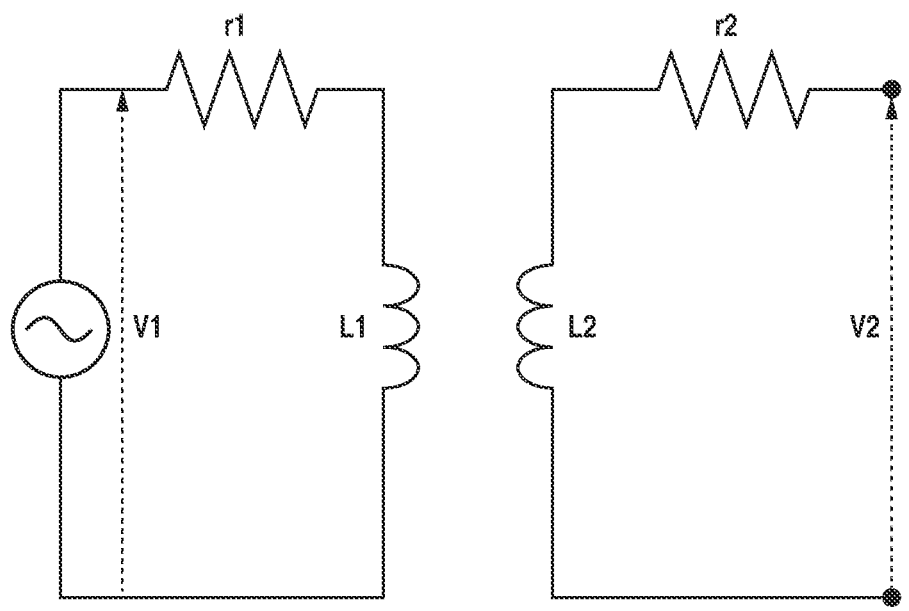
FIG. 16 is a diagram illustrating a measurement method of an index indicating a first coupled state between a power transmission antenna and a power receiving antenna according to the first exemplary embodiment.

FIG. 16 illustrates an equivalent circuit of the power transmission antenna 105 and an equivalent circuit of the power receiving antenna 205. In this case, the coupling coefficient k indicating a coupled state between the power transmission antenna 105 and the power receiving antenna 205 is obtained by the following formula.

[Math. 1]

$$K=(V2/V1)\sqrt{L1/L2} \quad (2)$$

Thus, for example, in a case where the TX 402 calculates a coupling coefficient, the RX 401 notifies the TX 402 of a measured power receiving voltage V2 that is applied to the power receiving antenna 205, and a prestored value of a self-inductance L2 of the power receiving antenna 205. The TX 402 is able to calculate the coupling coefficient k by using a measured power transmission voltage V1 that is applied to the power transmission antenna 105, a prestored value of a self-inductance L1 of the power transmission antenna 105, and the values of the V2 and L2. Alternatively, the RX 401 may notify the TX 402 of a constant calculated using all or any of the V1, the L1, and the L2, and the TX 402 may calculate the k by using the constant and the V2.

On the other hand, for example, in a case where the RX 401 calculates a coupling coefficient, the TX 402 notifies the RX 401 of a measured power transmission voltage V1 that is applied to the power transmission antenna 105, and a prestored value of a self-inductance L1 of the power transmission antenna 105. Then, the RX 401 calculates the k by using a measured power receiving voltage V2 that is applied to the power receiving antenna 205, a prestored value of a self-inductance L2 of the power receiving antenna 205, and the values of the V1 and the L1. Alternatively, the TX 402 may notify the RX 401 of a constant calculated using all or any of the V2, the L1, and the s L2, and the RX 401 calculates the k by using the constant and the V1.

The above-described power transmission voltage V1 that is applied to power transmission antenna 105 may be actually measured by the TX 402, the power transmission voltage may be calculated from a setting value of transmission power that is transmitted by the TX 402, or may be set to a power transmission voltage setting value set in power transmission. The power transmission voltage V1 that is applied to the power transmission antenna 105 may be obtained from a power transmission voltage (denoted by V3) that is applied to a circuit (for example, inverter) included in the power transmission unit 103, and voltages that are applied to both ends of the resonance capacitor 211. The power transmission voltage (denoted by V3) that is applied in this case to the circuit (for example, inverter) included in the power transmission unit 103 may be calculated by the TX 402 from a setting value of transmission power that is transmitted.

When the TX 402 or the RX 401 executes the above-described measurement, the RX 401 may perform control to bring a terminal of the power receiving antenna 205 into an opened state by turning OFF a switch (not illustrated) disposed between the power receiving antenna 205 and the resonance capacitor 211. Thus, both ends of the power receiving antenna are brought into an opened state as illustrated in FIG. 16. With this configuration, the influence of the resonance capacitor 211, the power receiving unit 203, the charging unit 206, and the battery 207 is not exerted when the above-described measurement is executed, whereby measuring a coupled state (coupling coefficient) between the power transmission antenna and the power receiving antenna is performed more accurately.

In a case where the TX 402 or the RX 401 executes the above-described measurement, control may be performed to bring the load of the RX 401 to be in the Light Load state (state with Light Load). Alternatively, control may be performed to bring the load of the RX 401 to be in the load connected state (state with Connected Load). With this configuration, the state of the load of the RX 401 is stabilized, which results in more accurate measurement of a coupled state (coupling coefficient) between the power transmission antenna and the power receiving antenna.

In the above description, a "coupling coefficient" is used as an index indicating a coupled state between the power transmission antenna 105 and the power receiving antenna 205. An index indicating a coupled state between the power transmission antenna 105 and the power receiving antenna 205 is not limited to the "coupling coefficient", and there are variety of values indicating the coupled state. In the present exemplary embodiment, a value indicating the coupled state between the power transmission antenna 105 and the power receiving antenna 205 will be referred to as a "coupled state index". For example, the above-described "coupling coefficient" is included in the "coupled state index". Any coupled state index is a value corresponding to a coupled state between the power transmission antenna 105 and the power receiving antenna 205. The description in the present exemplary embodiment is similarly applicable to a case where a different coupled state index other than the coupling coefficient is used.

For example, a coupled state index indicating a coupled state between the power transmission antenna 105 and the power receiving antenna 205 may be the following index. That is, the coupled state index may be an index calculated using a power transmission voltage (denoted by V3) that is applied to a circuit (for example, inverter) included in the power transmission unit 103, and a power receiving voltage (denoted by V4) that is applied to a circuit (for example, rectifier) included in the power receiving unit 203. Alternatively, the coupled state index may be calculated using an output voltage (denoted by V5) that is output by a circuit (for example, inverter) included in the power receiving unit 203. This output voltage V5 is a voltage that is applied to the load (charging unit, battery). In this case, the TX 402 notifies the RX 401 of the power transmission voltage V3, and the RX 401 calculates a coupled state index between the power transmission antenna 105 and the power receiving antenna 205. Alternatively, the TX 402 may notify the RX 401 of a constant including electrical characteristics (for example, L1) of the power transmission antenna 105, and based on the constant, the RX 401 calculates a coupled state index between the power transmission antenna 105 and the power receiving antenna 205.

Alternatively, the RX 401 notifies the TX 402 of a power receiving voltage V4 or the output voltage V5, and the TX 402 calculates a coupled state index between the power transmission antenna 105 and the power receiving antenna 205. In this case, the RX 401 notifies the TX 402 of a constant including electrical characteristics (for example, L2) of the power receiving antenna 205, and the TX 402 calculates a coupled state index between the power transmission antenna 105 and the power receiving antenna 205 based on the constant.

As described above, the TX 402 and the RX 401 exchange information on the respective voltage values and the self-inductance values, or the constant including electrical characteristics (for example, L1) of the power transmission antenna and the constant including electrical characteristics (for example, L2) of the power receiving antenna. A measurement timing of these voltage values and an exchange timing of each piece of information will be described below.

First of all, as the measurement timing of each voltage value, the measurement may be executed in the Ping phase. In the Ping phase, the TX 402 transmits a digital ping to the RX 401. Then, the TX 402 and the RX 401 measure any value of the above-described values V1 to V5 and store the measured value into the memory 106 or the memory 208. The TX 402 receives a predetermined packet containing information indicating any voltage value of the V2, V4, and V5 that has been notified from the RX 401, and records the information into the memory.

The predetermined packet may contain not only a receiving voltage of the RX 401 but also receiving power. The predetermined packet may contain information regarding the values of the self-inductances L1 and L2, or the constant including electrical characteristics (for example, L1) of the power transmission antenna and the constant including electrical characteristics (for example, L2) of the power receiving antenna. As the predetermined packet, a Signal Strength Packet can be used. Regarding the Signal Strength Packet, the TX 402 may be notified of receiving power of the RX 401 using another Signal Strength Packet. The predetermined packet may be an Identification Packet, an Extended Identification Packet, or a Configuration Packet in the I & C phase. Alternatively, the predetermined packet may be a Received Power Packet (mode1) in the Calibration phase or the Power Transfer phase.

Alternatively, the predetermined packet may be a Received Power Packet (mode2) or a Received Power Packet (mode0).

The description has been given of a case where voltage values that are generated in transmission of a Digital Ping from the TX 402 is used, but any voltage value of the voltage values V1 to V5 that are generated in transmission of an Analog Ping from the TX 402 in the Selection phase may be used. In a case where the TX 402 or the RX 401 executes the above-described measurement, the RX 401 turns ON the second switch unit 210 (short circuit) disposed between the resonance capacitor 211 and the power receiving unit 203. Then, control may be performed to bring a circuit formed by the power receiving antenna 205 and the resonance capacitor 211 to be in a closed circuit. With this configuration, the influence of the power receiving unit 203, the charging unit 206, and the battery 207 is not exerted when the above-described measurement is executed, whereby a coupled state index between the power transmission antenna 105 and the power receiving antenna 205 is measure more accurately.

Measurement Method of Index Indicating Second Coupled State Between Power Transmission Antenna and Power Receiving Antenna A measurement method of another index indicating a coupled state between the power transmission antenna 105 and the power receiving antenna 205 will be described below. In a case of FIG. 17 with the power transmission antenna 105 and the power receiving antenna 205, a coupling coefficient k indicating a coupled state between the power transmission antenna 105 and the power receiving antenna 205 is obtainable using the following formula.

[Math. 2]

$$k = \sqrt{1 - \frac{Lsc}{Lopen}} \quad (3)$$

In the formula, Lsc denotes an inductance value of the power transmission antenna 105 with both ends of the power receiving antenna 205 being short circuited. The Lsc can be measured by measuring an inductance value of the power transmission antenna 105 in a state in which the switch 210 disposed between the resonance capacitor 211 and the power receiving unit 203 has been brought into the ON state (short-circuited), for example. In this case, a switch (not illustrated) may be disposed in series between the resonance capacitor 211 and the power receiving unit 203, and the switch may be brought into the OFF state (opened). With this configuration, the influence of the power receiving unit 203, the charging unit 206, and the battery 207 is not exerted, whereby the Lsc is measured more accurately. The measurement of the inductance value Lsc of the power transmission antenna 105 can be obtained from an input voltage (V6) that is input to the power transmission antenna 105, and a current (I1) flowing in the power transmission antenna 105. Lopen denotes an inductance value of the power transmission antenna 105 with both ends of the power receiving antenna 205 being opened. In this case, for example, a switch (not illustrated) is disposed in series between the resonance capacitor 211 and the power receiving unit 203, and the switch is in the OFF state (opened). Then, the RX 401 measures the Lopen by measuring the inductance value of the power transmission antenna 105 with the switch 210 disposed between the resonance capacitor 211 and the power receiving unit 203 being turned OFF (opened). The measurement of the inductance value Lopen of the power transmission antenna 105 is performed using an input voltage (V7) that is input to the power transmission antenna 105, and a current (I2) flowing in the power transmission antenna 105. In other words, a coupled state index (coupling coefficient) between the power transmission antenna 105 and the power receiving antenna 205 is obtainable using an input voltage that is input to the power transmission antenna 105 and a current flowing in the power transmission antenna 105 in either of a case where both ends of the power receiving antenna 205 are short-circuited and a case where both ends of the power receiving antenna 205 are opened.

The TX 402 may calculate an index indicating a coupled state between the power transmission antenna 105 and the power receiving antenna 205, based on a power transmission voltage that is applied to a circuit (for example, inverter) included in the power transmission unit 103, and a current flowing in the circuit (for example, inverter) included in the power transmission unit 103. In other words, the above-described input voltage V6 or V7 illustrated in FIG. 17 that is to be used in calculation of an index indicating a coupled state between the power transmission antenna 105 and the power receiving antenna 205 may be a power transmission voltage that is applied to a circuit (for example, inverter) included in the power transmission unit 103. The V6 or V7 may be a voltage that is applied to the power transmission antenna 105, or may be a voltage that is applied to both terminals of a serial resonance circuit including the power transmission antenna 105 and the resonance capacitor. Alternatively, a power transmission voltage that is applied to a circuit (for example, inverter) included in the power transmission unit 103, and a voltage that is applied to both ends of the resonance capacitor 211 are measured, and a voltage that is applied to the power transmission antenna may be calculated from the measurement results. In other words, a coupled state index between the power transmission antenna 105 and the power receiving antenna 205 may be obtained from measurement results of a power transmission voltage that is applied to a circuit (for example, inverter) included in the power transmission unit 103, and a voltage that is applied to both ends of the resonance capacitor 211. A power transmission voltage that is applied in this case to the circuit (for example, inverter) included in the power transmission unit 103 may also be calculated from a setting value of transmission power that is transmitted by the TX 402.

A current I1 or I2 illustrated in FIG. 17 that is to be used in calculation of an index indicating a coupled state between the power transmission antenna 105 and the power receiving antenna 205 may be the following current. That is, the current I1 or I2 maybe a current flowing to a circuit (for example, inverter) included in the power transmission unit 103, or may be a current flowing to the power transmission antenna 105. The states of "OPEN" and "SHORT" of the power receiving antenna in FIG. 17 may be realized by the above-described switch that is controlled by the control unit 201, or may be realized by the power receiving unit 203. Alternatively, the state of "SHORT" may be the above-described state with the Light Load (Light Load state).

In this measurement method, the TX 402 measures the input voltage V6 or V7 and the current I1 or I2, whereby the TX 402 calculates an index indicating the coupled state. In other words, a voltage value that is measured by the RX 401, an inductance value of the power receiving antenna 205, and the like are not required, and the RX 401 needs not notify the TX 402 of these pieces of information. Nevertheless, in a case where the TX 402 measures the input voltage V6 and the current I1, the RX 401 needs to bring both terminals of a circuit included in the power receiving antenna 205 into OPEN (opened). In a case where the TX 402 measures the input voltage V7 and the current I2, the RX 401 needs to bring both terminals of a circuit included in the power receiving antenna 205 into SHORT (short-circuited). In other words, in accordance with a timing at which the TX 402 measures an input voltage or a current, the RX 401 appropriately performs control to bring both terminals of a circuit included in the power receiving antenna 205 into OPEN (opened) or SHORT (short-circuited). This timing may be determined by the TX 402 and transmitted to the RX 401, or may be determined by the RX 401 and transmitted to the TX 402. As the notification method, the notification is executed by communication that is in conformity with the WPC standard and is performed between the communication unit 104 included in the TX 402 and the communication unit 204 included in the RX 401. Alternatively, the notification may be executed by communication that is in conformity with a standard different from the WPC standard (for example, wireless local area network (LAN), Bluetooth (registered trademark) Low Energy (Bluetooth LE), Near Field Communication (NFC), etc.).

As a timing at which the TX 402 measures the voltage value V6 or V7 and the current value I1 or I2, the measurement may be executed in the Ping phase. In the Ping phase, the TX 402 transmits a Digital Ping to the RX 401. Thus, the TX 402 measures either voltage value of the voltage values V6 and V7 that is generated when a Digital Ping is transmitted. In addition, the TX 402 measures either current value of the current values I1 and I2 that is generated when a Digital Ping is transmitted. In the Ping phase, the TX 402 measures any values of the above-described values V6, V7, I1, and I2, stores the measured values into the memory 106, and calculates a coupling coefficient.

While a case where the TX 402 uses a voltage value and a current value that are generated in transmission of a Digital Ping has been described, the TX 402 may use a voltage value and a current value of the V6, V7, I1, and I2 that are generated in transmission of an Analog Ping.

In a case where "a measurement method of an index indicating a coupled state between a power transmission antenna and a power receiving antenna" is described, this means that both of the above-described two measurement methods are applicable. That is, in this case, either of "the measurement method of an index indicating a first coupled state between a power transmission antenna and a power receiving antenna" and "the measurement method of an index indicating a second coupled state between a power transmission antenna and a power receiving antenna" are applicable.

Setting Method of Threshold Value of State Abnormality Detection Using Index Indicating Coupled State Between Power Transmission Antenna and Power Receiving Antenna A method of performing state abnormality detection, such as foreign object detection between the power transmission antenna 105 and the power receiving antenna 205, and the detection of a positional shift between the power transmission antenna and the power receiving antenna, has been described. Hereinafter, a setting method of a threshold value to be used in determination of the existence or non-existence of state abnormality based on a "measurement method of an index indicating a coupled state between a power transmission antenna and a power receiving antenna" will be described.

First of all, a first threshold value setting method will be described. As a threshold value to be compared with a coupled state index that is to be used in detection of state abnormality between the power transmission antenna 105 and the power receiving antenna 205, a coupled state index obtained in a state in which there is no state abnormality can be used. For example, a coupled state index between a power transmission antenna and the power receiving antenna 205 that is obtained in a case where the RX 401 is placed on a trial power transmission apparatus and there is no state abnormality between a power transmission antenna of the trial power transmission apparatus and the power receiving antenna 205 can be used as a threshold value. In other words, the RX 401 holds a preliminarily measured index indicating a coupled state in the memory, and by the RX 401 notifying the TX 402 of the coupled state index, the TX 402 can set the coupled state index as the threshold value. The coupled state index to be used as the threshold value may be included in a FOD status packet defined in the WPC standard and transmitted by the RX 401 to the TX 402.

Next, a second threshold value setting method will be described. In this case, a coupled state index measured in a state in which there is no state abnormality is used as a threshold value. That is, in a state in which there is no state abnormality between the power transmission antenna 105 and the power receiving antenna 205, a coupled state index measured by the TX 402 and the RX 401 using the above-described "measurement method of an index indicating a coupled state between a power transmission antenna and a power receiving antenna" is set as the threshold value. Examples of methods of checking the state in which there is no state abnormality include foreign object detection using the above-described Power Loss (Power Loss) method, the Q value measurement method, and the like. In other words, to check the state in which there is no state abnormality, "means for detecting state abnormality between a power transmission antenna and a power receiving antenna" that is other than the "measurement method of an index indicating a coupled state between a power transmission antenna and a power receiving antenna" is executed. Then, in a case where it is determined that "there is no state abnormality", a coupled state index is measured using the "measurement method of an index indicating a coupled state between a power transmission antenna and a power receiving antenna", and the measurement result is set as a threshold value.

For example, in the WPC standard, foreign object detection processing using the Q value measurement method is executed in the Negotiation phase or the Renegotiation phase. In a case where it is determined that "there is no state abnormality" as a result of the foreign object detection processing using the Q value measurement method, in the Negotiation phase or the Renegotiation phase, or a later phase, a coupled state index is measured using the "measurement method of an index indicating a coupled state between a power transmission antenna and a power receiving antenna". Then, the measurement result is set as a threshold value, whereby an appropriate threshold value is set. The foreign object detection processing using the Power Loss (Power Loss) method may be executed in the Power Transfer phase. More specifically, after execution of the Power Loss (Power Loss) method in the Power Transfer phase, a coupled state index may be measured using the "measurement method of an index indicating a coupled state between a power transmission antenna and a power receiving antenna", and the measurement result may be set as a threshold value. Alternatively, foreign object detection processing may be executed in the Selection phase or the Ping phase by using a Q-Factor or the like. In this case, in the phase in which foreign object detection processing is executed, or a later phase, a coupled state index may be measured using "a measurement method of an index indicating a coupled state between a power transmission antenna and a power receiving antenna", and the measurement result may be set as a threshold value.

Figure 18:
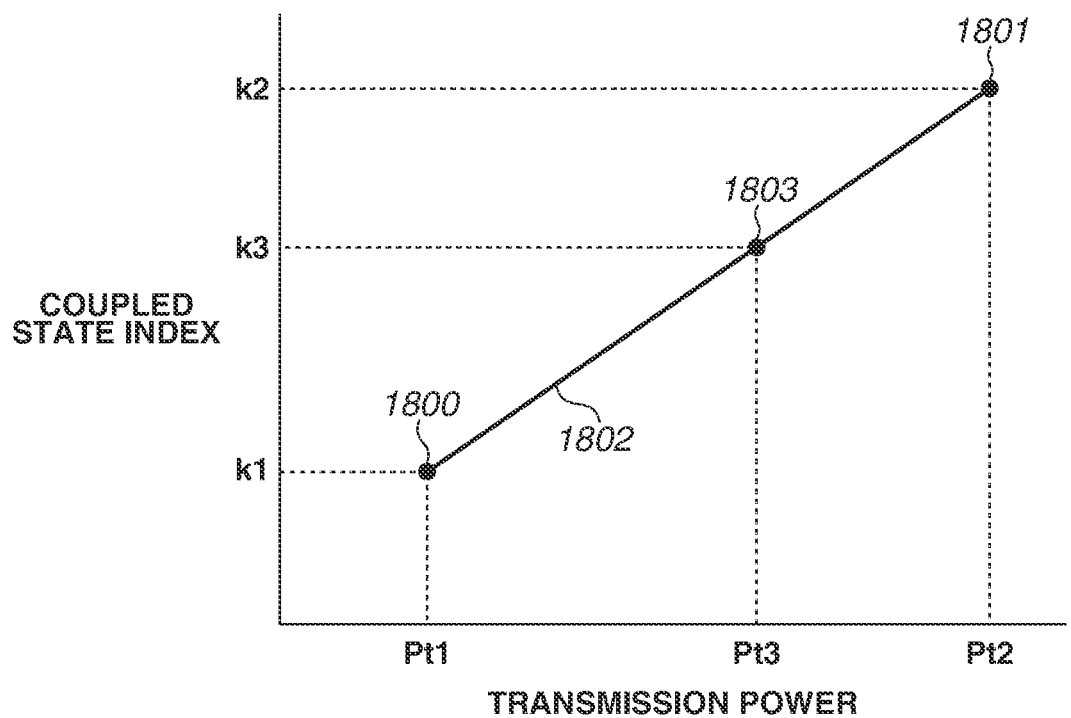
FIG. 18 is a diagram illustrating a setting method of a threshold value of state abnormality detection that uses a coupled state between the power transmission antenna and the power receiving antenna according to the first exemplary embodiment.

Next, a third threshold value setting method will be described. FIG. 18 is a diagram illustrating a setting method of the threshold value. The following example is an example case where a power receiving voltage V4 that is applied to a circuit (for example, rectifier) included in the power receiving unit 203, or an output voltage V5 that is output by the circuit are used in coupled state index calculation using the above-described "measurement method of an index indicating a coupled state between a power transmission antenna and a power receiving antenna". In this case, because the load of the charging unit 206 and the battery 207 is connected to the power receiving unit 203, a coupled state index to be calculated changes in accordance with the state of the load. Thus, a threshold value of a coupled state (including coupling coefficient) between the power transmission antenna 105 and the power receiving antenna 205 that is to be used to determine the existence or non-existence of state abnormality is set based on the state of the load. The method of setting the threshold will be described below. First of all, in a case where power transmission from the TX 402 is executed, the RX 401 performs control to bring the load of the RX 401 into the Light Load state by causing the load to be in a state in which power is not supplied to the load of the RX 401 or only extremely small power is supplied thereto. Transmission power of the TX 402 in this process is denoted by Pt1. Then, the TX 402 and the RX 401 execute the above-described measurement of an input voltage from TX 402 and a power receiving voltage of the RX 401 in this state and perform exchange of information regarding the input voltage and the power receiving voltage, and the TX 402 or the RX 401 calculates a coupled state index. The coupled state index obtained in this process is denoted by k1. In this process, the TX 402 recognizes the transmission power Pt1 being transmitted by the TX 402 and stores a calibration point 1800 associating the transmission power Pt1 and a coupled state index k1 into the memory. Next, the RX 401 performs control to bring the load of the RX 401 into the load connected state by causing the load to be in a state in which the maximum power is supplied or power equal to or larger than a predetermined threshold value is supplied to the load of the RX 401 in a case where power transmission from the TX 402 is executed. Transmission power of the TX 402 in this process is denoted by Pt2. Then, the TX 402 executes the above-described measurement of an input voltage from the TX 402 and a power receiving voltage of the RX 401 in this state, the TX 402 or the RX 401 performs exchange of information regarding the input voltage and the power receiving voltage, and the TX 402 or the RX 401 calculates a coupled state index. In this process, the TX 402 stores a calibration point 1801 associating the transmission power Pt2 and a coupled state index k2, into the memory. Subsequently, the TX 402 linearly-interpolates between the calibration point 1800 and the calibration point 1801 to create a straight line 1802. The straight line 1802 indicates a relationship between transmission power and a coupled state index in a state in which state abnormality does not occur in the vicinity of the TX 402 and the RX 401. Thus, from the straight line 1802, the TX 402 can estimate a coupled state index associated with each transmission power value in a state in which state abnormality does not occur in the vicinity of the TX 402 and the RX 401. For example, in a case where a transmission power value is a value denoted by Pt3, from a point 1803 on the straight line 1802 that corresponds to the transmission power value Pt3, the coupled state index can be estimated to be k3. Then, based on the above-described estimation result, the TX 402 can calculate a threshold value to be used for the determination of the existence or non-existence of state abnormality for each transmission power value. For example, a coupled state index larger by a predetermined value (value corresponding to measurement error) than an estimation result of a coupled state index corresponding to a certain transmission power value that is of a case where there is no state abnormality may be set as a threshold value of the determination of the existence or non-existence of a foreign object. Calibration processing that is performed by the TX 402 and the RX 401 to cause the TX 402 to acquire a combination between a transmission power value and a coupled state index will be hereinafter referred to as "Calibration processing (CAL processing) using a coupled state measurement method". The RX 401 may perform control of causing the load to be in the light load state in which power is not supplied to the load, and control of causing the load to be in the load connected state, after notifying the TX 402 that such control is to be performed. Either of the two types of control may be performed earlier. An operation for calculating a threshold value to be used for the determination of the existence or non-existence of state abnormality for each load (each transmission power value), which has been described in the present exemplary embodiment, may be performed in the Calibration phase. As described above, in the Calibration phase, the TX 402 acquires data to be used in the foreign object detection using the Power Loss method. In the process, the TX 402 acquires data regarding power loss of a case where the load state of the RX 401 is the light load state, and of a case where the load state of the RX 401 is the load connected state.

The measurement of the calibration point 1800 and the calibration point 1801 in FIG. 18 may be performed together with the measurement of power loss when the load is in the LIGHT LOAD state and the load connected state in the Calibration phase. That is, when the TX 402 has received the first reference receiving power information from the RX 401, the TX 402 performs the measurement of the calibration point 1800 in addition to predetermined processing that is performed in the Calibration phase. While the first reference receiving power information is a Received Power Packet (mode1) defined in the WPC standard, another message may be used. Further, when the TX 402 has received the second reference receiving power information from the RX 401, the TX 402 performs the measurement of the calibration point 1801 in addition to predetermined processing that is performed in the Calibration phase.

While the second reference receiving power information is a Received Power Packet (mode2) defined in the WPC standard, another message may be used. Since it becomes unnecessary to additionally provide a period for the measurement of the calibration point 1800 and the calibration point 1801, the measurement of the calibration point 1800 and the calibration point 1801 can be performed in a shorter time. The third threshold value setting method has been described.

A fourth threshold value setting method will be described. The fourth threshold value setting method is a method in which the TX 402 or the RX 401 presets a threshold value for a coupled state index having a value within a predetermined range. For example, in a case where a coupled state index is regarded as a "coupling coefficient", the coupling coefficient k is a value falling within a range from 0 to 1 as described above. Thus, the TX 402 or the RX 401 performs the determination in such a manner that "there is state abnormality when $0 \leq k < 0.3$ is satisfied", "there is a possibility of state abnormality when "$0.3 \leq k < 0.6$ is satisfied", and "there is no state abnormality when $0.6 \leq k \leq 1$ is satisfied", for example. Specifically, the coupling coefficient k and a determination condition thereof are prestored into the memory, and determination is performed based on these. The fourth threshold value setting method has been described.

Also, in "the setting of a state abnormality detection threshold value using a coupled state between a power transmission antenna and a power receiving antenna", a threshold value may be similarly set. In other words, the above-described waveform decay rate larger or smaller by the predetermined value (value corresponding to a measurement error) than a "coupled state index" measured or calculated based on received information may be set as a threshold value of determination of the existence or non-existence of a foreign object. The threshold value may include a plurality of threshold values in a stepwise fashion. The threshold values may be set to perform the determination in such a manner that "there is state abnormality" in a case of a first threshold value, "there is a possibility of state abnormality" in a case of a second threshold value, and "there is no state abnormality" in a case of a third threshold value.

Setting Method of Each Period in Case where Waveform Decay Method is Used as Foreign Object Detection Method An example of a setting method of each period in the waveform decay method according to the present exemplary embodiment and a method of determining an appropriate time length of each period will be described.

A determination method of the preparation period will be described. In the present exemplary embodiment, the TX 402 sets a predefined predetermined value (time length) as the preparation period. The determination method is not limited to this. For example, the TX 402 may determine a predetermined value (time) in accordance with the state of itself and notify the RX 401 of the state. Alternatively, the RX 401 may determine a predetermined value (time) in accordance with the state of the RX 401 and notify the TX 402 of the state. Alternatively, the TX 402 and the RX 401 may communicate with each other, exchange their states, and determine a predetermined value (time). Alternatively, the TX 402 may notify the RX 401 of a maximum time length determined by the TX 402, the RX 401 may notify the TX 402 of a minimum time length determined by the RX 401, and the RX 401 may determine the preparation period based on a value (time length) within a range set by the TX 402 and the RX 401, and notify the TX 402 of the preparation period. This relationship between the TX 402 and the RX 401 may be interchangeable. Setting a time length of the preparation period to an appropriate time length prevents a waveform from getting unstable during the transmission power control period.

Next, a determination method of the transmission power control period will be described. In the present exemplary embodiment, the transmission power control period is determined by a negotiation between the RX 401 and the TX 402. A method of negotiation is the following method, for example. That is, the TX 402 determines a minimum time length settable as the transmission power control period and notifies the RX 401 of the minimum time length. The RX 401 determines a maximum time length as the transmission power control period and notifies the TX 402 of the maximum time length. The TX 402 and the RX 401 determine a time length within a range settable based on the time lengths contained in the notifications and set the determined time length as the transmission power control period. In this case, within the range set by the TX 402 and the RX 401, the TX 402 or the RX 401 determines the minimum time length as the transmission power control period. The method of the negotiation is not limited to this. For example, a configuration in which at least one of the TX 402 and the RX 401 notifies the other one of a range of a time length settable by itself, and the notified one determines a time length may be employed. Alternatively, a configuration in which the TX 402 notifies the RX 401 of the maximum time length and the RX 401 notifies the TX 402 of the minimum time length may be employed. Alternatively, information to be used the determination of the transmission power control period may be included in an execution request packet (for example, Received Power Packet).

Alternatively, a predefined predetermined value (time length) may be set as the transmission power control period. Alternatively, the TX 402 may determine a predetermined value (time length) in accordance with the state of the TX 402 and notify the RX 401 of the predetermined value (time length). Alternatively, the RX 401 may determine a predetermined value (time) in accordance with the state of the RX 401 and notify the TX 402 of the predetermined value (time). Alternatively, the TX 402 or the RX 401 may determine the maximum time within the range set by the TX 402 and the RX 401 as the transmission power control period. With this configuration, a waveform decay state of a power transmission waveform is observed for a long time, whereby highly accurate foreign object detection is performed.

A relationship between transmission power that is transmitted from the TX 402, and the transmission power control period will be described. In addition to the above-described method, the TX 402 or the RX 401 determines the transmission power control period in such a manner that the transmission power control period is shortened with increase in transmission power that is transmitted by the TX 402 in comparison with a case where the transmission power that is transmitted by TX 402 is small. When power transmission is restarted after the lapse of the transmission power control period, ringing is generated in a transmission waveform at a timing of when power transmission is restarted. The larger a difference in height between power output immediately before the power transmission restart and transmission power output at the time of power transmission restart is, the larger ringing is generated. To reduce the ringing, reducing a difference in height between power output immediately before the power transmission restart and transmission power output at the time of power transmission restart is necessary. To realize this, the transmission power control period is shortened. With this configuration, power transmission is restarted in a state in which power transmission waveform decay is small, and thus, a difference in height between power output immediately before the power transmission restart and transmission power output at the time of power transmission restart is reduced, which results in suppression of ringing. Similarly, the larger the transmission power is, the shorter the transmission power control period is set, which results in a reduction in a difference in height between power output immediately before the power transmission restart and transmission power output at the time of power transmission restart, whereby ringing is suppressed.

The above description has been given of a case of shortening the transmission power control period with increase in transmission power, to suppress ringing. On the other hand, in a case of prioritizing the accuracy of measurement of a waveform decay index in the waveform decay method, the transmission power control period may be set to be longer with increase in transmission power. For example, because the risk of a case where a foreign object exists increases with increase in transmission power, highly accurate foreign object detection is demanded. Thus, in a case where transmission power is larger than a predetermined value, a decay state is observed for a long time by setting the transmission power control period to be longer. With this configuration, the accuracy of measurement of the decay state improves, which results in improvement in the accuracy of the decay index. In this manner, as the case of prioritizing the accuracy of measurement of a waveform decay index, in a case where transmission power is larger than a predetermined value, the transmission power control period is set longer than that of when transmission power is small. A configuration of setting the transmission power control period to be longer with increase in transmission power may be employed. Alternatively, a configuration in which determination of whether the transmission power control period is set to be longer or shorter is performed in accordance with the magnitude of transmission power based on the designation made by the user may be employed. As described above, the TX 402 and the RX 401 can determine the length of the transmission power control period based on the magnitude of transmission power.

The above description has been given of a case where the TX 402 determines the length of the transmission power control period based on the magnitude of transmission power that is transmitted by the TX 402 to the RX 401. The configuration is not limited to this, and the above-described transmission power that is transmitted by the TX 402 may be replaced with GP, MP, or PP. That is, the length of the transmission power control period may be determined based on the magnitude of a setting value of transmission power that is determined by a negotiation between the TX 402 and the RX 401. Alternatively, the length of the transmission power control period may be determined based on information contained in a Received Power Packet (mode0) that is transmitted by the RX 401 to the TX 402. Alternatively, the length of the transmission power control period may be determined based on information contained in a Received Power Packet (mode1) or a Received Power Packet (mode2). These Received Power Packets contain receiving power value information indicating the magnitude of receiving power received by the RX 401 from the TX 402. Transmission power that is transmitted by the TX 402 may be replaced with the receiving power value information.

Next, a relationship between a coupled state between the power transmission antenna 105 of the TX 402 and the power receiving antenna 205 of the RX 401, and the transmission power control period will be described. A coupled state index between the power transmission antenna 105 of the TX 402 and the power receiving antenna 205 of the RX 401 can be measured using "a measurement method of an index indicating a coupled state between a power transmission antenna and a power receiving antenna", for example. The coupled state index may be measured using another measurement method of a coupled state between a power transmission antenna and a power receiving antenna.

In addition to the above-described method, the TX 402 or the RX 401 determines the transmission power control period in such a manner that the transmission power control period of when a coupled state between the power transmission antenna 105 and the power receiving antenna 205 is bad is set to be longer than the transmission power control period of when the coupled state is good. Here, "the time when the coupled state is good" corresponds to a case where it is determined that "there is no state abnormality" by comparison between a measured coupling coefficient and a predetermined threshold value, as described above, for example. In addition, "the time when the coupled state is bad" corresponds to a case where it is determined that "there is a possibility of state abnormality" or "there is state abnormality" by comparison between a measured coupling coefficient and a predetermined threshold value, as described above, for example.

A possibility that a foreign object is present between the power transmission antenna 105 and the power receiving antenna 205 is increased with worsening of the coupled state, and consequently, highly accurate foreign object detection is demanded. Thus, in a case where the coupled state is worse than a predetermined value, a decay state is observed for a long time by setting the transmission power control period to be longer. With this configuration, the accuracy of measurement of the decay state improves, which results in improvement in the accuracy of the decay index. In this manner, as the case of prioritizing the accuracy of measurement of a waveform decay index, in a case where the coupled state is worse than a predetermined value, the transmission power control period is set longer than the transmission power control period of when the coupled state is good. Alternatively, a configuration of setting the transmission power control period to be longer with worsening of the coupled state may be employed.

The above description has been given of a configuration of setting the transmission power control period to be longer with worsening of the coupled state, to improve the accuracy of measurement of a waveform decay index. On the other hand, in the case of prioritizing power transmission efficiency, the transmission power control period may be shortened with worsening of the coupled state. The power transmission efficiency degrades with worsening of the coupled state. Thus, in a case where the coupled state is bad, a power transmission executable period is set to be longer by setting the transmission power control period to be further shorter. This results in improvement in the power transmission efficiency. In this manner, as the case of prioritizing power transmission efficiency, in a case where the coupled state is worse than a predetermined value, the transmission power control period is set be shorter than the transmission power control period of when the coupled state is good. Alternatively, a configuration of shortening the transmission power control period with worsening of the coupled state may be employed. The above-described coupled state between the power transmission antenna 105 of the TX 402 and the power receiving antenna 205 of the RX 401 may be measured before the TX 402 starts power transmission or may be measured a plurality of times at predetermined timings after start of power transmission by the TX 402. In a case where measurement is executed a plurality of times at predetermined timings after start of power transmission by the TX 402, the transmission power control period may be changed based on each measurement result. For example, in a case where measurement is executed three times at predetermined timings after start of power transmission by the TX 402, and in a case where values of the measured coupled states are all different, the transmission power control period is changed three times.

Alternatively, a configuration in which determination of whether the transmission power control period is set to be longer or shorter is performed in accordance with the state of the coupled state based on the designation made by the user may be employed. As described above, the TX 402 and the RX 401 can determine the length of the transmission power control period based on the coupled state.

Next, a relationship between the frequency of electromagnetic waves radiated for power transmission from the power transmission antenna 105 of the TX 402 to the power receiving antenna 205 of the RX 401 and the transmission power control period will be described. In addition to the above-described method, the TX 402 or the RX 401 determines the transmission power control period in such a manner that the transmission power control period of when the frequency of electromagnetic waves radiated for power transmission from the power transmission antenna 105 to the power receiving antenna 205 of the RX 401 is low is set to be longer than the transmission power control period of when the frequency is high. The frequency of electromagnetic waves radiated for power transmission is the frequency of electromagnetic waves radiated for power transmission from the power transmission antenna 105 to the power receiving antenna 205 of the RX 401 during the power transmission period.

Generally, loss increases with heightening of the frequency of electromagnetic waves. For this reason, with heightening of the frequency of electromagnetic waves radiated for power transmission from the power transmission antenna 105, a decay rate of electromagnetic waves during the transmission power control period increases, which leads to steep decay in electromagnetic waves. On the other hand, with lowering of the frequency of electromagnetic waves, a decay rate of electromagnetic waves during the transmission power control period decreases, which leads to gentle decay in electromagnetic waves. In addition, with heightening of the frequency of electromagnetic waves radiated for power transmission from the power transmission antenna 105, the wavelength of electromagnetic waves during the transmission power control period shortens, and consequently, a decay rate is calculated within a shorter period. On the other hand, with lowering of the frequency of electromagnetic waves, the wavelength of electromagnetic waves during the transmission power control period increases, and consequently, a longer period is required to calculate a decay rate. Thus, with lowering of the frequency of electromagnetic waves radiated for power transmission from the power transmission antenna 105, the transmission power control period is set to be longer to observe a decay state for a longer time. With this configuration, the accuracy of measurement of the decay state improves, which results in improvement in the accuracy of the decay index. In this manner, to improve the accuracy of the measurement of a waveform decay index, in a case where the frequency of electromagnetic waves radiated for power transmission from the power transmission antenna 105 is lower than a predetermined value, the transmission power control period is set to be longer than the transmission power control period of when the frequency is high. Alternatively, a configuration in which the transmission power control period is set to be longer with lowering of the frequency of electromagnetic waves radiated for power transmission from the power transmission antenna 105 may be employed.

The above description has been given of a case where the transmission power control period is set to be longer with lowering of the frequency of electromagnetic waves radiated for power transmission from the power transmission antenna 105, to improve the accuracy of the measurement of a waveform decay index. On the other hand, in the case of prioritizing power transmission efficiency, a configuration in which the transmission power control period is set to be shortened with lowering of the frequency of electromagnetic waves radiated for power transmission from the power transmission antenna 105 may be employed. The lower the frequency of electromagnetic waves radiated for power transmission from the power transmission antenna 105 is, the more a waveform of electromagnetic waves stabilizes. On the other hand, the higher the frequency of electromagnetic waves is, the more the influence of an object in the vicinity of the power transmission antenna 105 is exerted on electromagnetic waves, which leads to an unstable waveform of electromagnetic waves. Thus, in a case where the frequency of electromagnetic waves radiated for power transmission from the power transmission antenna 105 is high, the transmission power control period is set to be longer to observe a decay state for a long time. With this configuration, the accuracy of measurement of the decay state improves, which results in an improvement in the accuracy of the decay index. In this manner, to improve the accuracy of the measurement of a waveform decay index, in a case where the frequency of electromagnetic waves radiated for power transmission from the power transmission antenna 105 is higher than a predetermined value, the transmission power control period is set to be longer than the transmission power control period of when the frequency is high. Alternatively, a configuration in which the transmission power control period is set to be longer with heightening of the frequency of electromagnetic waves radiated for power transmission from the power transmission antenna 105 may also employed.

As described above, for example, the frequency of electromagnetic waves that is used for power transmission in conformity with the WPC standard is a frequency from 85 kHz to 205 kHz. In a case where the above-described frequency of electromagnetic waves radiated for power transmission from the power transmission antenna 105 changes from 85 kHz to 205 kHz, the transmission power control period may be controlled in accordance with the frequency. Alternatively, in a case where the frequency of electromagnetic waves radiated for power transmission from the power transmission antenna 105 falls within a first predetermined frequency band, such as from 85 kHz to 205 kHz, for example, the transmission power control period is set to a first transmission power control period. In a case where the frequency falls within a second predetermined frequency band different from the first predetermined frequency band, the transmission power control period may be set to a second transmission power control period different from the first transmission power control period.

Further, a configuration in which determination of whether the transmission power control period is set to be longer or shorter in accordance with the frequency of electromagnetic waves radiated for power transmission from the power transmission antenna 105 is performed based on a designation made by the user may be employed. As described above, the TX 402 and the RX 401 can determine the length of the transmission power control period in accordance with the frequency of electromagnetic waves radiated for power transmission from the power transmission antenna 105.

Next, a determination method of the communication-prohibited period will be described. The purpose of providing the communication-prohibited period is to realize stable communication by prohibiting communication in a ringing generated state because ringing in a power transmission waveform is generated after restart of power transmission. In the present exemplary embodiment, the communication-prohibited period is determined by the RX 401, and the TX 402 is notified of the communication-prohibited period. However, the configuration is not limited to this. For example, the TX 402 may determine a predetermined value (time) in accordance with the state of the TX 402, and the RX 401 may be notified of the predetermined value (time). Alternatively, the RX 401 may determine a predetermined value (time) in accordance with the state of the RX 401, and the TX 402 may be notified of the predetermined value (time). Alternatively, the TX 402 and the RX 401 may communicate with each other, exchange their states, and determine a predetermined value (time length).

Alternatively, the TX 402 may notify the RX 401 of a maximum time length determined by the TX 402, the RX 401 may notify the TX 402 of a minimum time length determined by the RX 401, and the RX 401 may determine the communication-prohibited period based on a value (time length) within a range set by the TX 402 and the RX 401 and notify the TX 402 of the communication-prohibited period. This relationship between the TX 402 and the RX 401 may be interchangeable. In this case, the TX 402 or the RX 401 may determine the minimum time within the range set by the TX 402 and the RX 401 as the communication-prohibited period. Alternatively, the TX 402 or the RX 401 may determine the maximum time within the range set by the TX 402 and the RX 401 as the communication-prohibited period. Information to be used for the determination of the communication-prohibited period may be contained in an execution request packet (for example, Received Power Packet).

A relationship between transmission power to be transmitted from the TX 402 and the communication-prohibited period will be described. In addition to the above-described method, the TX 402 or the RX 401 determines the communication-prohibited period in such a manner that the communication-prohibited period of when transmission power to be transmitted by the TX 402 is large is set to be longer than the communication-prohibited period of when transmission power is small. When power transmission is restarted after a lapse of the transmission power control period, ringing is generated in a power transmission waveform at a restart timing of power transmission. The larger the difference in height of transmission power output at the restart of power transmission is, the larger ringing is generated. In other words, the larger the transmission power is, the larger ringing is generated. Thus, the communication-prohibited period is set to be longer with increase in transmission power, whereby communication can be performed after ringing converges or becomes sufficiently small, which results in stable communication between the TX 402 and the RX 401. In a case where a period related to communication is desired to be set as short as possible, for example, the communication-prohibited period may be set to be shorter. As described above, the TX 402 and the RX 401 can determine the length of the communication-prohibited period based on the magnitude of transmission power.

The above description has been given of a case of determining the length of the communication-prohibited period based on the magnitude of transmission power to be transmitted by the TX 402 to the RX 401. However, the configuration is not limited to this, and the above-described transmission power to be transmitted by the TX 402 may be replaced with GP, MP, or PP. That is, the length of the communication-prohibited period may be determined based on the magnitude of a setting value related to transmission power determined by negotiation between the TX 402 and the RX 401. Alternatively, the length of the communication-prohibited period may be determined based on information contained in a Received Power Packet (mode0) that is transmitted by the RX 401 to the TX 402. Alternatively, the length of the communication-prohibited period may be determined based on information contained in a Received Power Packet (mode1) and a Received Power Packet (mode2). These Received Power Packets contain receiving power value information indicating the magnitude of receiving power received by the RX 401 from the TX 402. The transmission power to be transmitted by the TX 402 may be replaced with the receiving power value information.

A relationship between a coupled state between the power transmission antenna 105 of the TX 402 and the power receiving antenna 205 of the RX 401 and the communication-prohibited period will be described. In addition to the above-described method, the TX 402 or the RX 401 determines the communication-prohibited period in such a manner that the communication-prohibited period of when a coupled state between a power transmission antenna and a power receiving antenna is bad is set to be longer than the communication-prohibited period of when the coupled state is good. The worse the coupled state is, the higher a possibility that a foreign object is present between a power transmission antenna and a power receiving antenna is. Because presence of a foreign object might have adverse influence on communication between the TX 402 and the RX 401, such as distortion generated in a waveform, for example, a possibility of error occurrence in communication between the TX 402 and the RX 401 also increases. Thus, in a case where the coupled state is worse than a predetermined value, the communication-prohibited period is set to be longer. With this configuration, communication can be performed after ringing in a power transmission waveform at the restart of power transmission converges or becomes sufficiently small, which results in lowering of a possibility of communication error. In this manner, in a case where the coupled state is worse than a predetermined value, the communication-prohibited period is set to be longer than the communication-prohibited period of when the coupled state is good. Alternatively, a configuration in which the communication-prohibited period is set to be longer with worsening of the coupled state may be employed.

The above description has been given of a configuration in which the communication-prohibited period is set to be longer with worsening of the coupled state, to improve the quality of communication. On the other hand, the communication-prohibited period may be shortened with worsening of the coupled state, to improve the quality of communication. The worse the coupled state is, the higher a possibility of error occurrence in communication between the TX 402 and the RX 401 is. Thus, in a case where the coupled state is bad, a communication executable period is set to be long by shortening the communication-prohibited period. Then, in comparison with a case where the coupled state is good, lower speed communication is performed as communication between the TX 402 and the RX 401. Alternatively, communication with a larger modulation degree (Modulation depth) is performed as communication between the TX 402 and the RX 401. More specifically, in a case where the coupled state is bad, the TX 402 transmits communication data using lower-speed frequency shift modulation. Alternatively, the TX 402 transmits communication data by using frequency shift modulation with a larger modulation degree (Modulation depth). Alternatively, in a case where the coupled state is bad, the RX 401 transmits communication data by using lower-speed amplitude modulation or load modulation. Alternatively, the RX 401 transmits communication data by using amplitude modulation or load modulation with a larger modulation degree (Modulation depth).

With this configuration, an occurrence probability of a communication error can be reduced, which results in improvement in communication quality. In this manner, in a case where the coupled state is worse than a predetermined value, the communication-prohibited period is set to be shorter than the communication-prohibited period of when the coupled state is good. Then, lower-speed communication or communication that uses a larger modulation degree in comparison with a case when the coupled state is good is performed as communication between the TX 402 and the RX 401. Alternatively, a configuration in which, with worsening of the coupled state, the communication-prohibited period is shortened to perform, as communication between the TX 402 and the RX 401, lower-speed communication or communication that uses a larger modulation degree may be employed.

The above description has been given of the case where, in a case where the coupled state is bad, the communication-prohibited period is shortened to set a longer communication executable period, and lower-speed communication or communication that uses a larger modulation degree is performed as communication between the TX 402 and the RX 401. However, in a case where the coupled state is bad, in comparison with a case where the coupled state is good, lower-speed communication or communication that uses a larger modulation degree may only be performed as communication between the TX 402 and the RX 401. In other words, in a case where the coupled state is bad, the TX 402 transmits communication data by using lower-speed frequency shift modulation. Alternatively, the TX 402 transmits communication data by using frequency shift modulation with a larger modulation degree (Modulation depth). In addition, in a case where the coupled state is bad, the RX 401 transmits communication data by using lower-speed amplitude modulation or load modulation. Alternatively, the RX 401 transmits communication data by using amplitude modulation or load modulation with a larger modulation degree (Modulation depth). With this configuration, an occurrence probability of a communication error is reduced, which results in improvement in communication quality.

The above-described coupled state between the power transmission antenna 105 of the TX 402 and the power receiving antenna 205 of the RX 401 may be measured before the TX 402 starts power transmission or may be measured a plurality of times at predetermined timings after the TX 402 has started power transmission. In a case where measurement is executed a plurality of times at predetermined timings after the TX 402 has started power transmission, the communication-prohibited period, a communication speed, or a modulation degree of communication may be changed based on each measurement result. For example, in a case where measurement is executed three times at predetermined timings after the TX 402 has started power transmission, and values of the measured coupled states are all different, the communication-prohibited period, a communication speed, or a modulation degree of communication is changed three times. Alternatively, a configuration in which determination of whether the communication-prohibited period is set to be longer or shorter in accordance with the state of the coupled state is performed based on the designation made by the user may be employed. As described above, the TX 402 and the RX 401 can determine the length of the communication-prohibited period based on the coupled state.

A relationship between the frequency of electromagnetic waves radiated for power transmission from the power transmission antenna 105 of the TX 402 to the power receiving antenna 205 of the RX 401, and the communication-prohibited period will be described. In addition to the above-described method, the TX 402 or the RX 401 determines the communication-prohibited period in such a manner that the communication-prohibited period of when the frequency of electromagnetic waves radiated for power transmission from the power transmission antenna 105 to the power receiving antenna 205 of the RX 401 is low is set to be shorter than the communication-prohibited period of when the frequency is high. Here, "the frequency of electromagnetic waves radiated for power transmission" is the frequency of electromagnetic waves radiated for power transmission from the power transmission antenna 105 to the power receiving antenna 205 of the RX 401 during the power transmission period. When power transmission is restarted after a lapse of the transmission power control period, ringing is generated in a power transmission waveform of electromagnetic waves radiated for power transmission from the power transmission antenna 105 at the restart of power transmission. The higher the frequency of the power transmission waveform is, the larger the generation of ringing is. In other words, with heightening of the frequency of electromagnetic waves radiated for power transmission from the power transmission antenna 105, generation of ringing gets larger. Thus, by setting the communication-prohibited period to be longer with heightening of the frequency of electromagnetic waves radiated for power transmission from the power transmission antenna 105, communication can be performed after ringing converges or becomes sufficiently small. Accordingly, stable communication can be performed between the TX 402 and the RX 401. In this manner, to improve communication stability between the TX 402 and the RX 401, in a case where the frequency of electromagnetic waves radiated for power transmission from the power transmission antenna 105 is higher than a predetermined value, the communication-prohibited period is set to be longer than the communication-prohibited period of when the frequency is low. A configuration in which the communication-prohibited period is set to be longer with heightening of the frequency of electromagnetic waves radiated for power transmission from the power transmission antenna 105 may be employed.

The above description has been given of a configuration in which the communication-prohibited period is set to be longer with heightening of the frequency of electromagnetic waves radiated for power transmission from the power transmission antenna 105, to improve communication stability between the TX 402 and the RX 401. On the other hand, the transmission power control period may be set to be longer with lowering of the frequency of electromagnetic waves radiated for power transmission from the power transmission antenna 105. When power transmission is restarted after a lapse of the transmission power control period, ringing is generated in a power transmission waveform of electromagnetic waves radiated for power transmission from the power transmission antenna 105 at the restart of power transmission. The lower the frequency of the power transmission waveform is, the longer the period of generation of ringing is. In other words, with lowering of the frequency of electromagnetic waves radiated for power transmission from the power transmission antenna 105, ringing is generated for a longer period. Thus, by setting the communication-prohibited period to be longer with lowering of the frequency of electromagnetic waves radiated for power transmission from the power transmission antenna 105, communication can be performed after ringing converges or becomes sufficiently small. With this configuration, stable communication can be performed between the TX 402 and the RX 401. In the above-described manner, to improve communication stability between the TX 402 and the RX 401, in a case where the frequency of electromagnetic waves radiated for power transmission from the power transmission antenna 105 is lower than a predetermined value, the communication-prohibited period is set to be longer than the communication-prohibited period of when the frequency is high. A configuration in which the communication-prohibited period is set to be longer with lowering of the frequency of electromagnetic waves radiated for power transmission from the power transmission antenna 105 may be employed.

As described above, for example, the frequency of electromagnetic waves that is used for power transmission in conformity with the WPC standard is a frequency from 85 kHz to 205 kHz. In a case where the above-described frequency of electromagnetic waves radiated for power transmission from the power transmission antenna 105 changes from 85 kHz to 205 kHz, the communication-prohibited period may be controlled in accordance with the change. Alternatively, in a case where the frequency of electromagnetic waves radiated for power transmission from the power transmission antenna 105 falls within the first predetermined frequency band, such as the from 85 kHz to 205 kHz, for example, the communication-prohibited period is set to a first communication-prohibited period. Then, in a case where the frequency falls within the second predetermined frequency band different from the first predetermined frequency band, the communication-prohibited period may be set to a second communication-prohibited period different from the first communication-prohibited period.

Alternatively, a configuration in which determination of whether the communication-prohibited period is set to be longer or shorter in accordance with the frequency of electromagnetic waves radiated for power transmission from the power transmission antenna 105 is performed based on designation made by the user may be employed. As described above, the TX 402 and the RX 401 can determine the length of the communication-prohibited period based on the frequency of electromagnetic waves radiated for power transmission from the power transmission antenna 105.

A relationship between the transmission power control period and the communication-prohibited period will be described. In addition to the above-described method, the TX 402 or the RX 401 determines the communication-prohibited period in such a manner that the communication-prohibited period is set to be longer with prolonging of the transmission power control period. As described above, the larger a difference in height between power output immediately before the power transmission restart and transmission power output at the restart of power transmission, the larger the generation of ringing is. Decay of a power transmission waveform is larger with prolonging of the transmission power control period, which leads to a large difference in height between power output immediately before the power transmission restart and transmission power output at the restart of power transmission, and consequently, larger ringing is generated. Thus, by setting the communication-prohibited period to be longer with prolonging of the transmission power control period, communication can be performed after ringing converges or becomes sufficiently small, which results in stable communication between the TX 402 and the RX 401. As described above, the TX 402 and the RX 401 can determine the length of the communication-prohibited period based on the length of the transmission power control period.

Next, a determination method of the power transmission period will be described. In the present exemplary embodiment, the length of the power transmission period is determined by the RX 401, and the TX 402 is notified of the length. However, the configuration is not limited to this, and a predetermined value (time length) predefined by the TX 402 may be set as the power transmission period. Alternatively, for example, the TX 402 may determine a predetermined value (time) in accordance with the state of the TX 402 and notify the RX 401 of the predetermined value (time). Alternatively, the RX 401 may determine a predetermined value (time) in accordance with the state of the RX 401 and notify the TX 402 of the predetermined value (time). Alternatively, the TX 402 and the RX 401 may communicate with each other, exchange their states, and determine a predetermined value (time length). Alternatively, the TX 402 determines a maximum time length settable as the power transmission period and notifies the RX 401 of the maximum time length, and the RX 401 determines a minimum time length settable as the power transmission period and notifies the TX 402 of the minimum time length. Based on the notification, the RX 401 may determine the transmission power control period using a value (time) within the range set by the TX 402 and the RX 401 and notify the TX 402 of the value. This relationship between the TX 402 and the RX 401 may be interchangeable.

A relationship between transmission power to be transmitted from the TX 402 and the power transmission period will be described. In addition to the above-described method, the TX 402 or the RX 401 determines the power transmission period in such a manner that the power transmission period of when transmission power to be transmitted by the TX 402 is large is set to be shorter than the power transmission period of when transmission power is small. The larger the transmitted power is, the more the high foreign object detection accuracy is demanded. Thus, by setting the power transmission period to be short with increase in the transmission power, the number of times of the transmission power control period is increased within a predetermined time, and the number of observation times of a decay state of a power transmission waveform is increased, which results in increase in the chance of foreign object detection, whereby highly accurate foreign object detection is executable. Alternatively, the power transmission period may be set to be longer with increase in transmission power. By setting the power transmission period to be longer, power transmission is performed without decreasing power transfer efficiency from the TX 402 to the RX 401. The above description has been given of the case where the length of the power transmission period is determined based on the magnitude of transmission power to be transmitted by the TX 402 to the RX 401. However, the configuration is not limited to this, and transmission power to be transmitted by the TX 402 may be replaced with GP, MP, or PP. That is, the length of the power transmission period may be determined based on the magnitude of a setting value related to transmission power determined by negotiation between the TX 402 and the RX 401.

A relationship between a coupled state between the power transmission antenna 105 of the TX 402 and the power receiving antenna 205 of the RX 401 and the power transmission period will be described. In addition to the above-described method, the TX 402 or the RX 401 determines the power transmission period in such a manner that the power transmission period of when a coupled state between the power transmission antenna 105 of the TX 402 and the power receiving antenna 205 of the RX 401 is bad is set to be shorter than the power transmission period of when the coupled state is good. Since a possibility that a foreign object is present between the power transmission antenna and the power receiving antenna is increased with worsening of the coupled state, high foreign object detection accuracy is demanded.

Thus, by setting the power transmission period to be short with worsening of the coupled state, the number of times of the transmission power control period within a predetermined time is increased, and the number of observation times of a decay state of a power transmission waveform is increased, which results in increase in the chance of foreign object detection, whereby highly accurate foreign object detection is executed. Alternatively, the power transmission period may be set to be longer with worsening of as the coupled state. While the worse the coupled state is, the lower the power transfer efficiency is, by setting the power transmission period to be longer, power transmission can be performed without decreasing power transfer efficiency from the TX 402 to the RX 401.

In a case where the TX 402 has not received an execution request packet during the power transmission period, the power transmission period serving as the detection processing period is not set, and power transmission is continued.

The setting methods of the respective periods have been described. Each period needs not be individually set. For example, a configuration in which the length of the entire detection processing period including at least the transmission power control period is determined may be employed. In this case, the TX 402 and the RX 401 may determine the length of the entire detection processing period, based on the magnitude of transmission power. Alternatively, a configuration in which the length of the entire detection processing period is determined based on the magnitude of a setting value related to transmission power determined by negotiation between the TX 402 and the RX 401 may be employed. Alternatively, a configuration in which the length of the entire detection processing period is determined based on a coupled state between the power transmission antenna 105 of the TX 402 and the power receiving antenna 205 of the RX 401 may be employed.

Setting Method of Foreign Object Detection Threshold Value in Waveform Decay Method A setting method of a threshold value for determination of the existence or non-existence of a foreign object, or a possibility of foreign object existence (existence probability), when the foreign object detection using the waveform decay method is performed will be described. As described above, in the waveform decay method, the foreign object detection is performed based on a waveform decay index. In the foreign object detection processing according to the present exemplary embodiment, a measured waveform decay index and a predetermined threshold value are compared, and based on a result of the comparison, the existence or non-existence of a foreign object, or a possibility of foreign object existence is determined. As a setting method of the threshold value, there is the following method.

In a first method of setting the threshold value, the TX 402 holds a predefined predetermined value as a common value independent of the RX 401 to which power is to be transmitted. The value may be the same value in any cases or may be a value determined by the TX 402 in accordance with the situation. As described above, with existence of a foreign object, a waveform decay rate of a power transmission waveform during the transmission power control period is higher than a case where a foreign object does not exist. Thus, a waveform decay index obtainable in a state where it is considered that "a foreign object does not exist" is prestored as a predetermined value, and this value is compared with a result of a measured waveform decay index as a threshold value. In a case where the measured waveform decay index derives a result indicating that the waveform decay rate is larger than the threshold value, it is determined that "a foreign object exists" or "there is a high possibility that a foreign object exists". For example, in a case where a Q value is used as a waveform decay index, a Q value measured by the TX 402 and a predetermined Q value (threshold value) obtainable in a state where it is considered that a foreign object does not exist are compare. In a case where the measured Q value is smaller than the Q value serving as the threshold value, it is determined that "a foreign object exists" or "there is a high possibility that a foreign object exists". In a case where the measured Q value is larger than or approximately equal to the Q value serving as the threshold value, it is determined that "a foreign object does not exist" or "there is a low possibility that a foreign object exists". With the above-described configuration, the foreign object detection using the waveform decay method can be executed by using the first method.

In a second method, the TX 402 adjusts and determines a threshold value, based on information transmitted from the RX 401. As described above, with existence of a foreign object, a waveform decay rate of a power transmission waveform during the transmission power control period is higher than a case where a foreign object does not exist. Thus, a waveform decay index obtainable in a state where it is considered that "a foreign object does not exist" is prestored as a predetermined value, and this value is used as a threshold value to compare with a result of a measured "waveform decay index". In a case where the measured waveform decay index derives a result indicating that the waveform decay rate is larger than the threshold value, it is determined that "a foreign object exists" or "there is a high possibility that a foreign object exists". A value of a waveform decay index might vary in accordance with the RX 401 to be placed on the TX 402, to which power is to be transmitted. This is because electrical characteristics of the RX 401 to be coupled via the power transmission antenna (power transmission coil) of the TX 402 exert influence on the value of the waveform decay index.

For example, in a case where a Q value is used as a waveform decay index, a Q value to be measured by the TX 402 when a foreign object does not exist might vary in accordance with the RX 401 to be placed on the TX 402. Thus, the RX 401 stores Q value information, for each TX 402, obtained in a state where the RX 401 is placed on the TX 402 without existence of a foreign object, and notifies the TX 402 of the Q value. Then, the TX 402 adjusts and determines a threshold value, based on the Q value information received from the RX 401. More specifically, in the Negotiation phase, the TX 402 receives a FOD status Packet containing information regarding a Reference Quality Factor Value, adjusts a threshold value in the Q value measurement method, and determines the threshold value. This Reference Quality Factor Value corresponds to "Q value information obtained in a state where the RX 401 is placed without existence of a foreign object within a power transmission executable range of the TX 402".

Thus, the TX 402 also adjusts a threshold value in the foreign object detection using the waveform decay method, based on this Reference Quality Factor Value, and determines the threshold value. A Reference Quality Factor Value that is transmitted from the RX 401 to the TX 402 in the Negotiation phase is information to be used for the foreign object detection using the Q value measurement method, which originally measures a Q value in a frequency domain. While, in a case where a Q value is used as a "waveform decay index", the Q value derivation method is different, even in a case where the waveform decay method that measures a Q value in a time domain is used, a Q value is obtainable by using Formula 1 from the waveform illustrated in FIG. 6, for example.

Because of the above-described reason, a threshold value of a Q value in the waveform decay method is settable based on the Reference Quality Factor Value. In this manner, the TX 402 sets a threshold value of a Q value in the waveform decay method, based on information already transmitted from the RX 401 to the TX 402 in the Negotiation phase, new processing, such as measurement for threshold value setting, becomes unnecessary. This results in shortening of setting time of a threshold value.

A Q value measured by the TX 402 and the threshold value determined using the above-described method are compared, and in a case where the measured Q value is smaller than the Q value serving as the threshold value, it is determined that "a foreign object exists" or "there is a high possibility that a foreign object exists". In a case where the measured Q value is larger than or approximately equal to the Q value serving as the threshold value, it is determined that "a foreign object does not exist" or "there is a low possibility that a foreign object exists". With the above-described configuration, the foreign object detection using the waveform decay method can be executed using the second method.

In a third method, the TX 402 measures a waveform decay index in a state without existence of a foreign object, and the TX 402 adjusts a threshold value based on information regarding a result of the measurement and determines the threshold value. A value of a waveform decay index may vary in accordance with transmission power of the TX 402. This is because an amount of heat generation and various characteristics of an electric circuit of the TX 402 change in accordance with the magnitude of transmission power of the TX 402, and these changes exert influence on the value of the waveform decay index. Thus, the TX 402 measures a waveform decay index at each transmission power, adjusting a threshold value based on a result of the measurement result, and determines the threshold value, whereby more accurate foreign object detection is executable.

Figure 11:
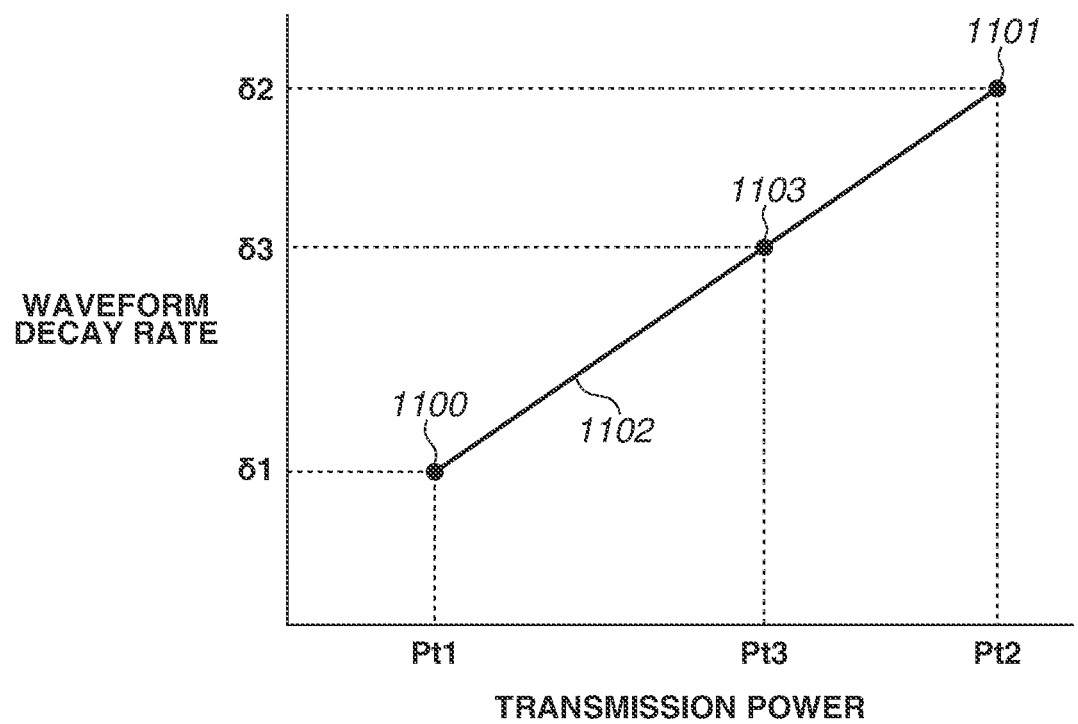
FIG. 11 is a diagram illustrating a setting method of a threshold value in foreign object detection that is executed by the waveform decay method.

FIG. 11 is a diagram illustrating a setting method of a foreign object detection threshold value at each transmission power of the TX 402 in the waveform decay method. First of all, in a case where power transmission is executed from the TX 402, the RX 401 performs control in such a manner that the load of the RX 401 is brought into the Light Load state, by causing the load to be in a state in which power is not supplied to the load of the RX 401 or only extremely small power is supplied thereto. Transmission power of the TX 402 transmitted at the time is denoted by Pt1. The TX 402 stops power transmission in this state and measures a waveform decay index. The waveform decay index measured at the time is denoted by δ1. In this process, the TX 402 recognizes the transmission power Pt1 being transmitted by the TX 402 and stores a calibration point 1100 associating the transmission power Pt1 and the waveform decay index δ1 into the memory.

Next, the RX 401 performs control in such a manner that the load of the RX 401 is brought into the load connected state, by causing the load to be in a state in which the maximum power is supplied or power equal to or larger than a predetermined threshold value is supplied to the load of the RX 401 in a case where power transmission is executed from the TX 402. Transmission power of the TX 402 transmitted at the time is denoted by Pt2. Then, the TX 402 restricts power transmission for a predetermined period in this state and measures a waveform decay index. In this process, the TX 402 stores a calibration point 1101 associating the transmission power Pt2 and a waveform decay index δ2 into the memory.

Then, the TX 402 linearly-interpolates between the calibration point 1100 and the calibration point 1101 and creates a straight line 1102. The straight line 1102 indicates a relationship between transmission power and a waveform decay index of a power transmission waveform in a state without existence of a foreign object in the vicinity of the TX 402 and the RX 401. Thus, the TX 402 can estimate, from the straight line 1102, a waveform decay index of a power transmission waveform that is associated with each transmission power value in a state without existence of a foreign object. For example, in a case of a transmission power value denoted by Pt3, from a point 1103 that is on the straight line 1102 and corresponds to the transmission power value Pt3, the waveform decay index can be estimated to be δ3. Then, based on a result of the above-described estimation, the TX 402 can calculate a threshold value to be used for the determination of the existence or non-existence of a foreign object for each transmission power value. For example, a waveform decay index larger by a predetermined value (value corresponding to measurement error) than an estimation result of a waveform decay index that corresponds to a certain transmission power value and is measured without existence of a foreign object may be set as a threshold value of the determination of the existence or non-existence of a foreign object. Calibration processing that is performed by the TX 402 and the RX 401 to cause the TX 402 to acquire a combination between a transmission power value and a waveform decay index will be hereinafter referred to as "Calibration processing (CAL processing) of a waveform decay index". While, in the above-described example, measurement is performed at two points corresponding to the transmission power Pt1 and the transmission power Pt2 of the TX 402, measurement may be executed at a plurality of points being three or more points, and a waveform decay index at each transmitted power may be calculated, to further enhance accuracy.

The RX 401 may perform control of causing the load to be in the state with the Light Load in which power is not supplied to the load and control of causing the load to be in the load connected state, after notifying the TX 402 that such control is to be performed. In addition, whichever of the two types of control may be performed earlier.

An operation to calculate a threshold value to be used for the determination of the existence or non-existence of a foreign object for each load (each transmitted power value), which has been described in the present exemplary embodiment, may be performed in the Calibration phase. As described above, in the Calibration phase, the TX 402 acquires data to be used when the foreign object detection using the Power Loss method is performed. In this process, the TX 402 acquires data regarding Power Loss in a case where the load state of the RX 401 is the Light Load state, and in a case where the load state of the RX 401 is the load connected state. Thus, the measurement of the calibration point 1100 and the calibration point 1101 in FIG. 11 may be performed in the above-described Calibration phase when the RX 401 enters the Light Load state and when the RX 401 enters the load connected state. That is, in a case where the TX 402 has received the first reference receiving power information from the RX 401, the TX 402 performs the measurement of the calibration point 1100 in addition to predetermined processing that is performed in the Calibration phase. In addition, in a case where the TX 402 has received the second reference receiving power information from the RX 401, the TX 402 performs the measurement of the calibration point 1101 in addition to predetermined processing to be performed in the Calibration phase. Since it becomes unnecessary to additionally provide a period for performing the measurement of the calibration point 1100 and the calibration point 1101, the measurement of the calibration point 1100 and the calibration point 1101 can be performed in a shorter time.

In the above-described manner, the TX 402 adjusts a threshold value of a waveform decay index in the waveform decay method at each transmitted power, based on information regarding a waveform decay index measured by the TX 402 at each transmitted power, and sets the threshold value. For example, in a case where a Q value is used as a waveform decay index, the TX 402 compares a Q value measured by the TX 402 and the threshold value determined using the above-described method, and in a case where the measured Q value is smaller than the Q value serving as the threshold value, it is determined that "a foreign object exists" or "there is a high possibility that a foreign object exists". In a case where the measured Q value is larger than or approximately equal to the Q value serving as the threshold value, the TX 402 determines that "a foreign object does not exist" or "there is a low possibility that a foreign object exists". With the above-described configuration, a threshold value can be set for each transmission power of the TX 402, whereby more accurate foreign object detection is executable.

While, in the above-described method, a waveform decay index to be used as a threshold value is a predetermined value, but the waveform decay index is not limited to this. For example, a waveform decay index to be used as a threshold value may be a value with a predetermined width (range). This width may be set based on a measurement error expected in the measurement of a decay rate, for example. In a case where such a threshold value is set, the TX 402 may be configured to determine that "a foreign object does not exist" or "there is a low possibility that a foreign object exists", in a case where a waveform decay index obtained by measurement is a value within the range set as the threshold value.

Processing that is Performed by Power Receiving Apparatus 401 and Power Transmission Apparatus 402

Figure 8:
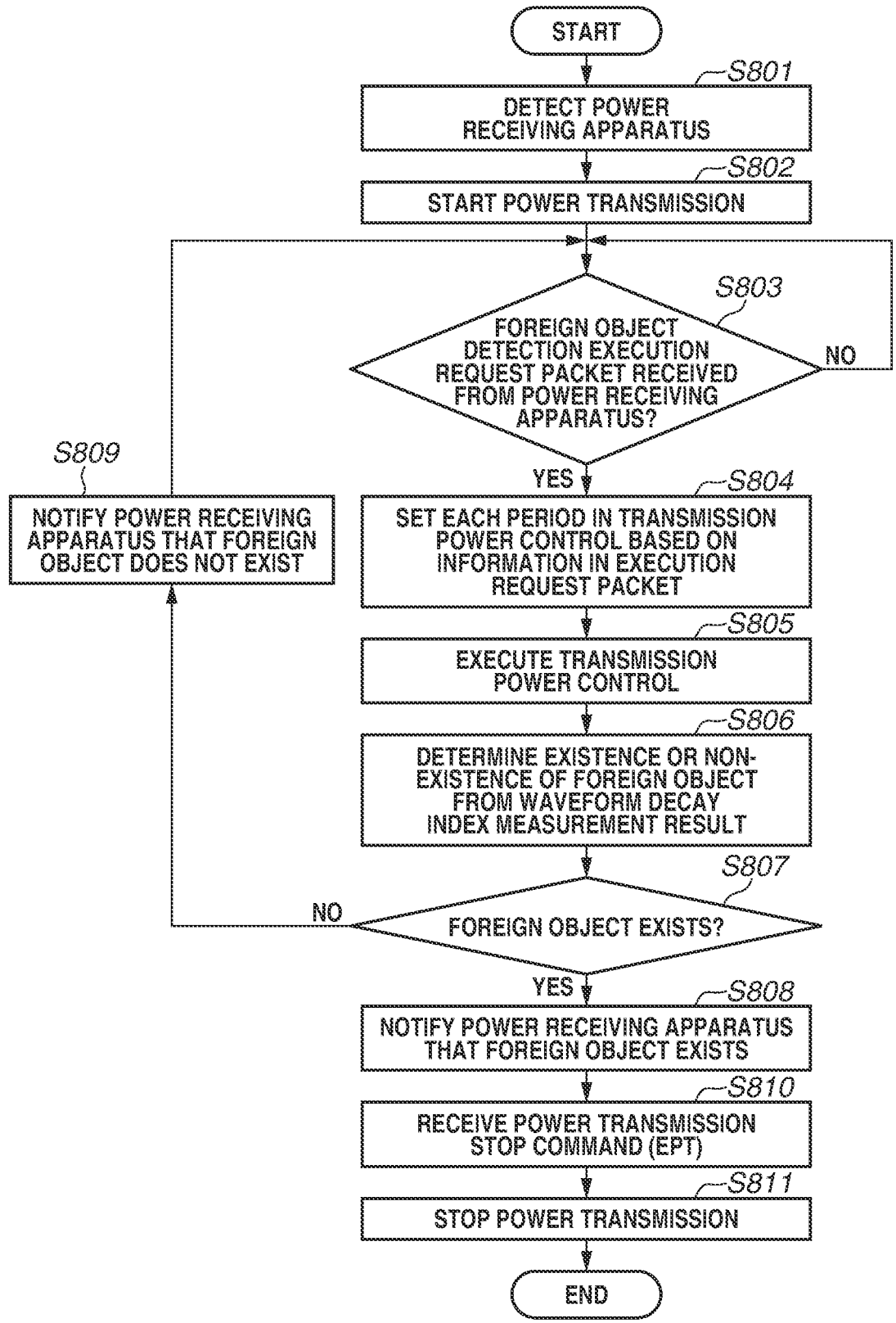
FIG. 8 is a flowchart diagram illustrating an operation that is performed by a power transmission apparatus according to a first exemplary embodiment.
Figure 9:
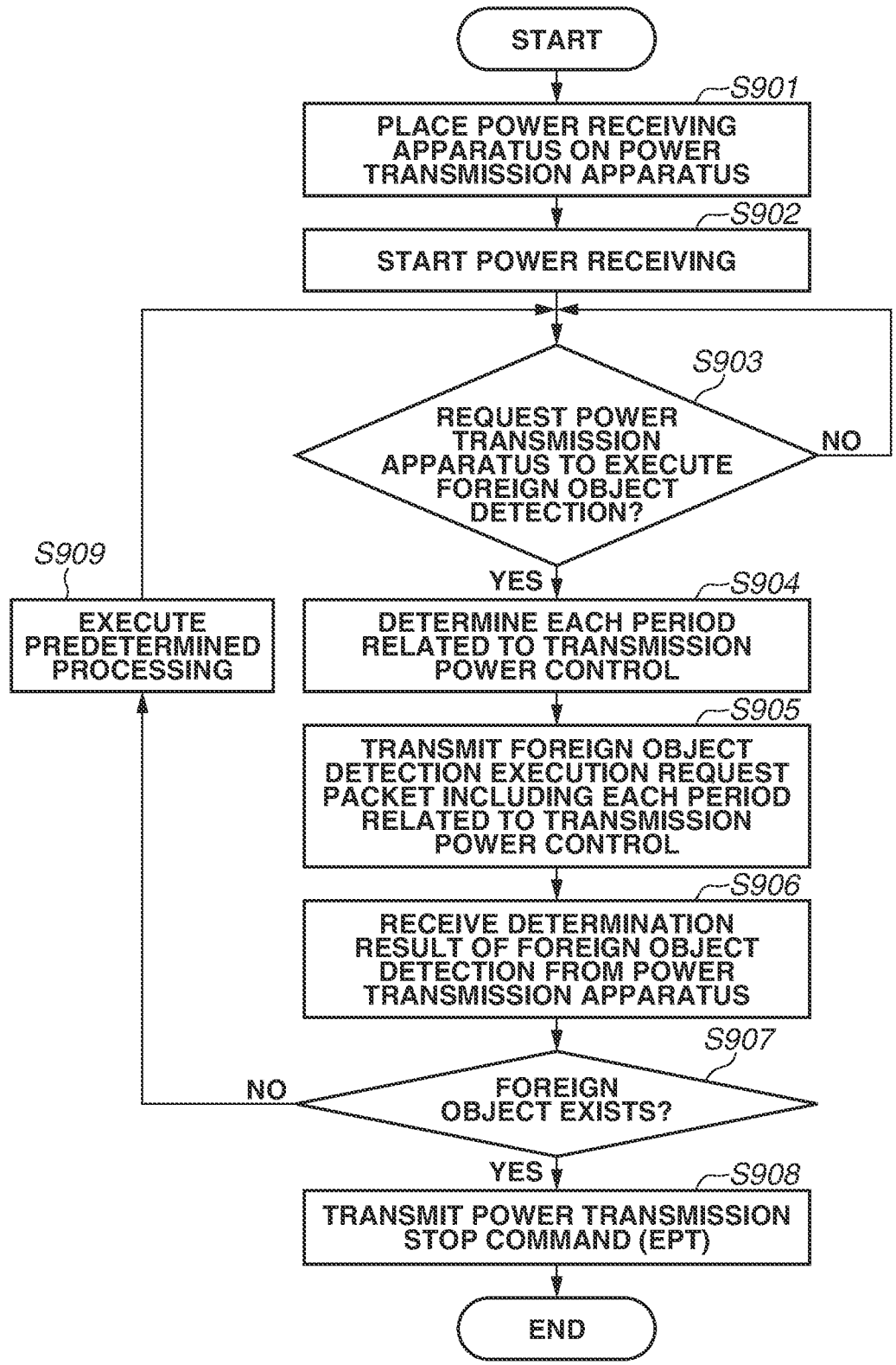
FIG. 9 is a flowchart diagram illustrating an operation of a power receiving apparatus according to the first exemplary embodiment.

A procedure of processing that is performed by the RX 401 and the TX 402 to implement the above-described configuration will be described with reference to FIGS. 8 and 9. FIG. 8 is a flowchart diagram illustrating processing that is performed by the TX 402, and FIG. 9 is a flowchart diagram illustrating processing that is performed by the RX 401. The processing illustrated in FIGS. 8 and 9 is implemented by control units included in the TX 402 and the RX 401 executing programs stored in the memories.

After the power of the TX 402 is turned ON, in step S801, the TX 402 detects the RX 401 through the above-described Selection phase and the Ping phase. In step S802, the TX 402 starts power transmission to the detected RX 401. The power transmission performed in this step is power transmission that is performed in the I & C phase, the Negotiation phase, the Calibration phase, the Power Transfer phase, and the like.

After the RX 401 is placed on the TX 402 in step S901, the RX 401 is detected by the TX 402 through the Selection phase and the Ping phase. In step S902, the RX 401 starts receiving of power transmitted from the TX 402. The power received in this step is power transmitted from the TX 402 in the I & C phase, the Negotiation phase, the Calibration phase, the Power Transfer phase, and the like.

In a case where a predetermined condition is satisfied, the RX 401 determines to request the TX 402 to execute foreign object detection (YES in step S903). On the other hand, in a case where the predetermined condition is not satisfied, the RX 401 determines not to request the TX 402 to execute foreign object detection (NO in step S903), and the RX 401 continues power receiving.

The predetermined condition includes the following condition, for example. More specifically, the predetermined condition includes a condition that an error occurs in communication between the TX 402 and the RX 401, a condition that a decline in transmission power from the TX 402 to the RX 401 is observed, a condition that acquired calibration data contains an abnormal value, a condition that a temperature rise is observed in the TX 402 or the RX 401, and the like. These conditions indicate a case where a foreign object is suspected to exist. Alternatively, the predetermined condition indicates the case of increasing transmission power to be transmitted from the TX 402 to the RX 401. Alternatively, the predetermined condition indicates the case of executing calibration (Calibration processing using the Power Loss method), which is measurement to set a threshold value to be used for foreign object detection. Alternatively, the predetermined condition indicates a case where the RX 401 notifies the TX 402 of the state of the RX 401 (for example, receiving power received by the RX 401, etc.). The RX 401 presets the above-described predetermined conditions, and in a case where at least any of the set predetermined conditions is satisfied, the RX 401 determines to perform foreign object detection. A condition other than the above-described conditions may be set as the predetermined condition. Any condition of the above-described conditions may be set as the predetermined condition.

In a case where the RX 401 determines to request the TX 402 to execute foreign object detection (YES in step S903), in step S904, the RX 401 determines the detection processing period related to foreign object detection processing. The detection processing period is a period including the preparation period, the transmission power control period, the communication-prohibited period, and the power transmission period. Then, in step S905, the RX 401 transmits an execution request packet containing information to be used in determination of each period related to transmission power control to the TX 402. In the present exemplary embodiment, as information contained in the execution request packet, for example, information to be used in determination of the length of the transmission power control period and the length of the communication-prohibited period is included. The execution request packet may be, for example, a Received Power Packet (mode0), a Received Power Packet (mode1), or a Received Power Packet (mode2). An individual packet may be used as the execution request packet.

In a case where the TX 402 has received the foreign object detection request packet from the RX 401 (YES in step S803), in step S804, the TX 402 sets each period related to transmission power control, based on information contained in the execution request packet. Then, in step S805, the TX 402 executes transmission power control, based on the set periods. Then, in step S806, the TX 402 determines the existence or non-existence of a foreign object, or a possibility of foreign object existence (existence probability) by measuring a waveform decay index and comparing a result of the measurement and the above-described threshold value. Then, in a case where it is determined that "a foreign object exists" or "there is a high possibility that a foreign object exists" (YES in step S807), in step S808, the TX 402 notifies the RX 401 of a result of the determination by using a predetermined packet. This can be implemented in such a manner that the TX 402 transmits NAK serving as a negative response to the RX 401, for example. In a case where it is determined that "a foreign object does not exist" or "there is a low possibility that a foreign object exists" (NO in step S807), in step S809, the TX 402 notifies the RX 401 of a result of the determination by using a predetermined packet. This can be implemented in such a manner that the TX 402 transmits ACK serving as a positive response to the RX 401, for example. Then, the TX 402 continues power transmission.

The TX 402 may notify the RX 401 of "a possibility that a foreign object exists" that is obtained by a result of determination, by using an index corresponding to the level of the possibility (existence probability). For example, the TX 402 may identify a probability of existence of a foreign object exists that is determined based on a difference between a measured waveform decay index and a set threshold value, and notify the RX 401 of the probability. Thus, in a case where the TX 402 has performed foreign object detection, the TX 402 transmits, to the RX 401, a predetermined packet containing at least any of a determination result indicating that a foreign object exists, a determination result indicating that a foreign object does not exist, a determination result indicating that there is a possibility that a foreign object exists, and a determination result indicating a probability that a foreign object exists.

In step S906, the RX 401 receives a packet containing the determination result of foreign object detection from the TX 402. In a case where the determination result received by the RX 401 indicate that "a foreign object exists" or "there is a high possibility that a foreign object exists" (YES in step S907), in step S908, the RX 401 transmits a power transmission stop command requesting the stop of power transmission to the TX 402. This power transmission stop command can be an End Power Transfer (EPT) command (packet). In this process, the RX 401 includes information indicating a request for transmission of an End Power Transfer (EPT) command (packet) in a packet containing a result of the determination of the foreign object detection and transmits the packet containing the foreign object detection determination result to the TX 402. In a case where the determination result obtained in step S907 indicates "a foreign object does not exist" or "there is a low possibility that a foreign object exists" (NO in step S907), in step S909, the RX 401 executes predetermined processing. The predetermined processing includes the following processing, for example. More specifically, the predetermined processing includes processing of increasing transmission power to be transmitted from the TX 402 to the RX 401, measurement processing to set a threshold value to be used in foreign object detection, processing of notifying the TX 402 of the state of the RX 401 (receiving power received by the RX 401, etc.), and the like.

In a case where the TX 402 has received the End Power Transfer (EPT) command (packet) serving as a power transmission stop command from the RX 401 in step S810, in step S811, the TX 402 stops power transmission to the RX 401. Alternatively, in step S811, the TX 402 may decrease transmission power to be transmitted to the RX 401. In this process, the TX 402 may include information requesting the RX 401 to execute a predetermined operation in a packet containing a result of the determination of the foreign object detection and transmits the packet containing the foreign object detection determination result to the RX 401. The procedure of processing that is performed by the RX 401 and the TX 402 has been described.

Second Exemplary Embodiment

In the first exemplary embodiment, the description has been given of the method of applying the foreign object detection using the waveform decay method to the WPC standard, the setting method of each period of a power transmission waveform in a case where the waveform decay method is used, and the setting method of a foreign object detection threshold value in the waveform decay method. However, in a case of performing the foreign object detection, there is a possibility that the foreign object detection fails to be accurately executed if the foreign object detection is performed only once. For example, in the case of performing transmission power control once and determining the existence or non-existence of a foreign object, or a possibility of foreign object existence (existence probability) from a waveform decay index, obtainment of an appropriate waveform decay index may fail due to the following causes. For example, due to causes including mixture of different noises into the transmission power control period and a positional shift of the RX 401 placed on the TX 402, a power transmission waveform may get unstable during the transmission power control period. In such a situation, obtainment of an appropriate waveform decay index may fail.

Then, the failure of obtainment of an appropriate waveform decay index may lead to false determination in foreign object detection.

To prevent false determination, the TX 402 according to the present exemplary embodiment performs transmission power control a plurality of times, measures a waveform decay index from power transmission waveforms obtained during a plurality of transmission power control periods, and performs foreign object detection based on a result of the measurement. In such a case, measuring a plurality of waveform decay indices and performing foreign object detection based on the measurement result results in more reliable foreign object detection. In the present exemplary embodiment, the description will be given of a case of performing foreign object detection using the waveform decay method a plurality of times while using the method described in the first exemplary embodiment, to perform more reliable foreign object detection. A determination method of foreign object detection that is to be used at the process will also be described.

A power transmission waveform according to the present exemplary embodiment that is obtained in a case where foreign object detection is performed by measuring a plurality of waveform decay indices will be described with reference to FIG. 7. As illustrated in FIG. 7, in a case of executing the waveform decay method a plurality of times, the communication-prohibited period, the power transmission period, the preparation period, and the transmission power control period are repeated a plurality of times. In the present exemplary embodiment, each period to be repeated in the process is set to have the same length. In other words, as for the communication-prohibited period, lengths of a first communication-prohibited period, a second communication-prohibited period, a third communication-prohibited period, . . . and an N-th communication-prohibited period are all set to the same length. As for the power transmission period, lengths of a first power transmission period, a second power transmission period, a third the power transmission period, . . . and an N-th power transmission period are all set to the same length. As for the preparation period, lengths of a first preparation period, a second preparation period, a third preparation period, . . . and an N-th preparation period are all set to the same length. As for the transmission power control period, lengths of a first transmission power control period, a second transmission power control period, a third transmission power control period, . . . and an N-th transmission power control period are all set to the same length. The setting method of each period is as described in the first exemplary embodiment, and based on the method described in the first exemplary embodiment, the TX 402 and the RX 401 determine a time most appropriate for each period. As described above, setting each period to a most appropriate time and repeating the periods a plurality of times allows a waveform decay index to be measured a plurality of times. In addition, setting each period to a most appropriate time and executing each period set to the same length in the waveform decay method that is performed a plurality of times results in prevention of instability of a power transmission waveform, suppressing of ringing, and highly accurate foreign object detection is performed during the stable communication.

In the above-described example, control is performed in such a manner that the lengths of the communication-prohibited period, the power transmission period, the preparation period, and the transmission power control period in a detection processing period are set to the same lengths as those in another detection processing period. However, control is not limited to this. The TX 402 may be configured to perform control in such a manner that the length of the entire detection processing period including at least the transmission power control period, for example, is set to the same length as the length of another detection processing period. Alternatively, for example, the TX 402 may be configured to perform control in such a manner that the length of at least any of the communication-prohibited period, the power transmission period, the preparation period, and the transmission power control period is set to the same length as the length of a corresponding period in another detection processing period.

Next, a description will be given of a determination method indicating how the existence or non-existence of a foreign object, or a possibility that a foreign object exists (existence probability) is determined, in a case where the TX 402 measures a plurality of waveform decay indices (e.g., Q values), as described above, from results of the plurality of measurement. The TX 402 performs transmission power control during a plurality of predetermined number of transmission power control periods and obtains a plurality of waveform decay indices from results of the measurement of decay states of power transmission waveforms. The TX 402 performs determination that is based on a predefined threshold value, on the plurality of waveform decay indices. For example, in a case of using a Q value as a waveform decay index, in a case where the number of Q values smaller than a Q value being a threshold value among a plurality of Q values obtained in a plurality of waveform decay methods is larger than a predetermined number, the TX 402 determines that "a foreign object exits". Alternatively, for example, in a case of using a waveform decay amount or a waveform decay rate as a waveform decay index, the number of indices larger than a threshold value among a plurality of indices (decay amounts or decay rates) obtained in a plurality of waveform decay methods is larger than a predetermined number, the TX 402 determines that "a foreign object exits".

A threshold value that is used in this process may be set as a predetermined range having an upper limit threshold value and a lower limit threshold value. Also in this case, the determination of the existence or non-existence of a foreign object is performed in accordance with the number of indices included in the predetermined range represented by threshold values among a plurality of indices obtained in a plurality of waveform decay methods or the number of indices not included in the predetermined range. The above-described "predetermined number" is set to a number obtained by multiplying the number of execution times of transmission power control by a predetermined percentage. For example, in a case where the waveform decay method is executed five times, the TX 402 sets 40% of five (=2) as the predetermined number. In a case where a plurality of Q values is acquired by a plurality of waveform decay methods, and in a case where the number of Q values smaller than a Q value being a threshold value is larger than two, the TX 402 determines that a foreign object exists. The same applies to the case where an index other than the Q value is used. Any number can be set as a percentage for determination of the predetermined number. A determination method of the predetermined number is not limited to this, and any number can be set.

The TX 402 may perform comparison with the predetermined threshold value, obtain a possibility that a foreign object exists (existence probability), and indicate the possibility using a predetermined index. An index indicating a possibility that a foreign object exists (existence probability) will be hereinafter referred to as a "foreign object existence probability index". For example, the TX 402 sets a "foreign object existence probability index" in accordance with the number of waveform decay indices falling within a range that is for a predefined predetermined range having an upper limit threshold value and a lower limit threshold value, and notifies the RX 401 of the index. In other words, the TX 402 determines in such a manner that the larger the number of waveform decay indices falling within the predetermined range is, the lower the foreign object existence probability is, and the smaller the number of waveform decay indices falling within the predetermined range is, the higher foreign object existence probability is. The TX 402 sets an index in accordance with the level of a foreign object existence probability identified by this method and notifies the RX 401 of the index. A determination criterion can be arbitrarily changed in accordance with the type of a waveform decay index. Alternatively, a foreign object existence probability itself may be used as a foreign object existence probability index.

Alternatively, the TX 402 compares each of the plurality of waveform decay indices with the predetermined threshold value, obtains a possibility that a foreign object exists (existence probability), and indicates the possibility using a predetermined index. With this configuration, the TX 402 acquires a plurality of "foreign object existence probability indices" each indicating a possibility that a foreign object exists (existence probability).

Then, the TX 402 performs final determination of existence or non-existence of a foreign object, or a possibility that a foreign object exists (existence probability), from a plurality of indices indicating possibilities that a foreign object exists (existence probabilities). The TX 402 determines the existence or non-existence of a foreign object, based on the existence probability, and transmits a signal (for example, ACK or NAK) based on a result of the determination to the RX 401. Alternatively, the TX 402 may notify the RX 401 of a foreign object existence probability itself by using a predetermined packet.

Alternatively, the RX 401 may receive information regarding a plurality of waveform decay indices or a plurality of foreign object existence probability indices from the TX 402, and the RX 401 may perform the above-described determination. In the above-described exemplary embodiment, a waveform decay index is calculated by the TX 402 based on a measurement result. However, because a power transmission antenna and a power receiving antenna are electromagnetically coupled, a decay state of a power transmission waveform can be observed by the RX 401. Thus, a waveform decay index may be calculated by the RX 401 based on a measurement result. Alternatively, the RX 401 may perform the above-described determination based on the waveform decay index calculated by the RX 401.

As described above, TX 402 executes transmission power control a plurality of times, calculates a plurality of waveform decay indices from the waveform decay states, and performs the determination of foreign object detection using these, whereby more accurate foreign object detection is executable. Alternatively, the TX 402 or the RX 401 may have a configuration of determining whether the waveform decay method is to be executed a plurality of times. For example, in a case where a determination result obtained using the first waveform decay method indicates that "no foreign object exists", the TX 402 may avoid performing second and subsequent waveform decay methods, and in a case where a determination result obtained using the first waveform decay method indicates that "a foreign object exists", the TX 402 may execute the second waveform decay method. Alternatively, for example, the TX 402 may identify a foreign object existence probability, and in a case where the existence probability falls within the range of a predetermined value, the TX 402 may execute the second waveform decay method. In this case, the RX 401 may be configured to acquire the value of the existence probability identified by the TX 402 and transmit an execution request packet in accordance with the value.

Figure 12:
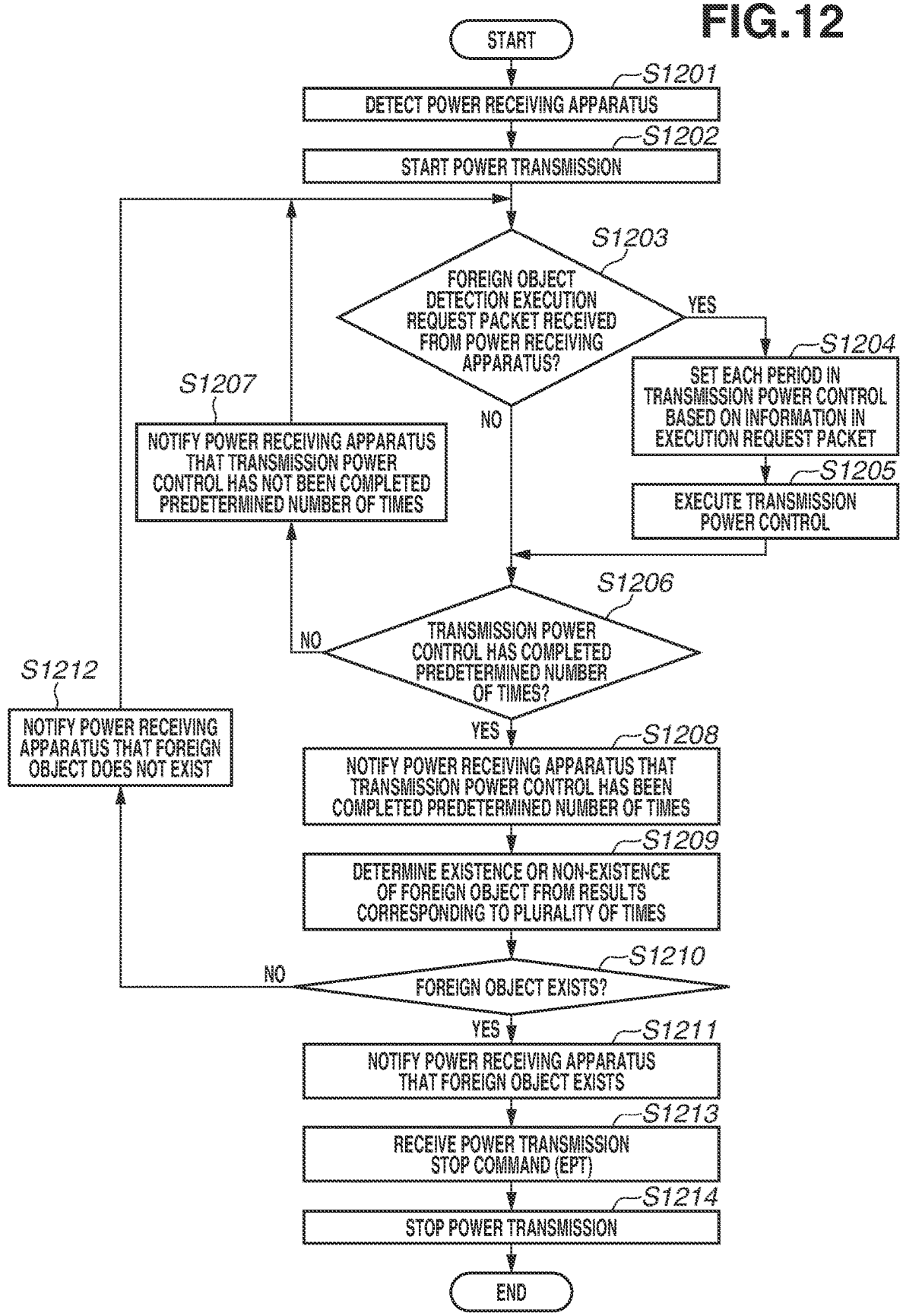
FIG. 12 is a flowchart diagram illustrating an operation that is performed by a power transmission apparatus according to a second exemplary embodiment.
Figure 13:
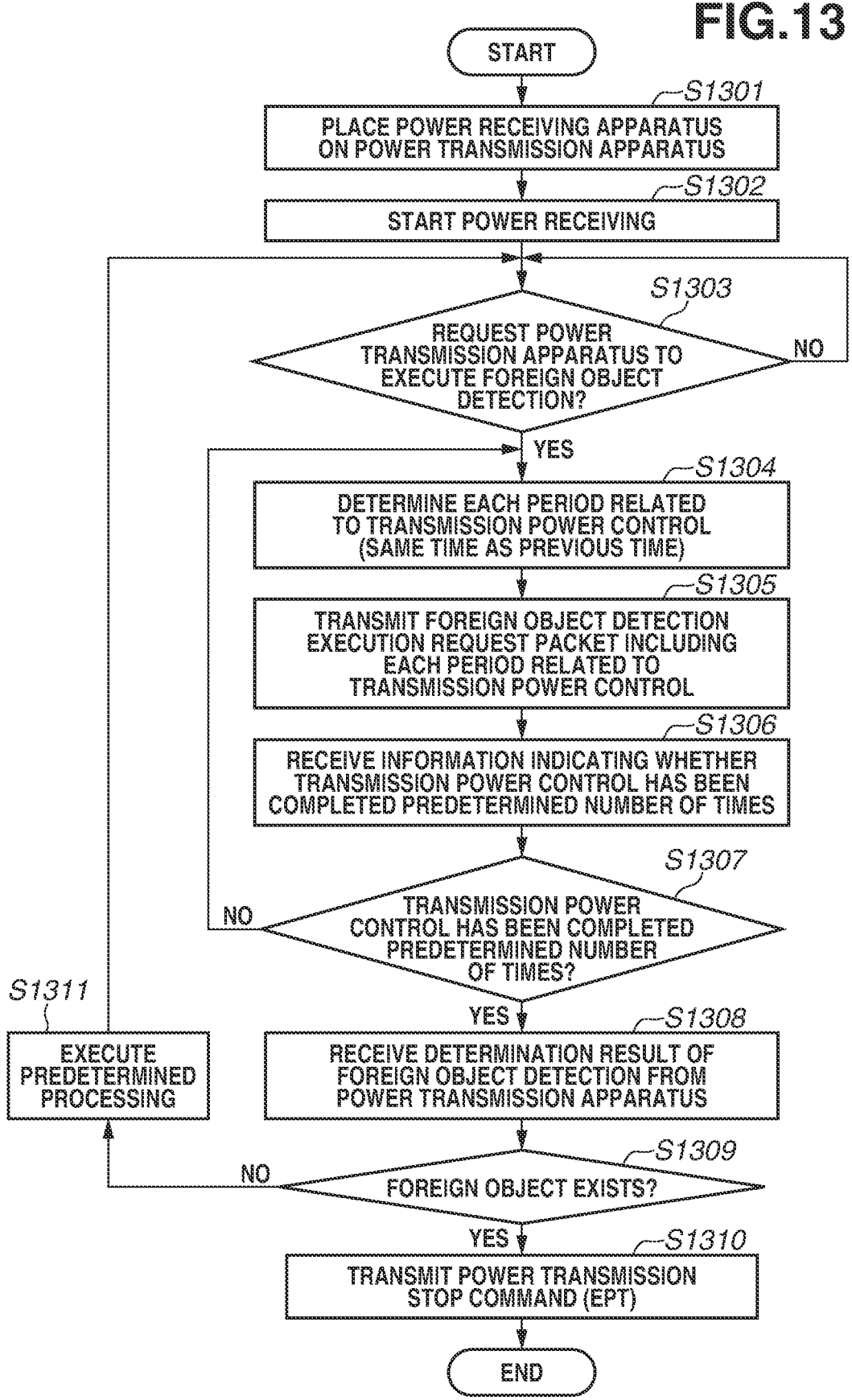
FIG. 13 is a flowchart diagram illustrating an operation of a power receiving apparatus according to the second exemplary embodiment.

A procedure of processing that is performed by the RX 401 and the TX 402 to implement the foregoing will be described with reference to FIGS. 12 and 13. FIG. 12 is a flowchart diagram illustrating processing that is performed by the TX 402, and FIG. 13 is a flowchart diagram illustrating processing that is performed by the RX 401.

In a case where the power of the TX 402 is turned ON, in step in step S1201, the TX 402 detects the RX 401 through the above-described Selection phase and the Ping phase. In step S1202, the TX 402 starts power transmission to the detected RX 401. The power transmission in this step is power transmission that is performed in the I & C phase, the Negotiation phase, the Calibration phase, the Power Transfer phase, and the like.

In a case where the RX 401 is placed on the TX 402 in step S1301, the RX 401 is detected by the TX 402 through the Selection phase and the Ping phase. In step S1302, the RX 401 starts receiving of power transmitted from the TX 402. The power received in this step is power transmitted from the TX 402 in the I & C phase, the Negotiation phase, the Calibration phase, the Power Transfer phase, and the like.

In a case where a predetermined condition is satisfied, the RX 401 determines to request the TX 402 to execute foreign object detection (YES in step S1303). In a case where the predetermined condition is not satisfied, the RX 401 determines not to request the TX 402 to execute foreign object detection (NO in step S1303), and the RX 401 continues power receiving. The predetermined condition includes the following condition, for example. More specifically, the predetermined condition includes a condition that an error occurs in communication between the TX 402 and the RX 401, a condition that a decline in transmission power from the TX 402 to the RX 401 is observed, a condition that acquired calibration data includes an abnormal value, a condition that a temperature rise is observed in the TX 402 or the RX 401, and the like. In addition, for example, the predetermined condition includes a case of increasing transmission power to be transmitted from the TX 402 to the RX 401. In addition, for example, the predetermined condition includes a case of executing calibration (Calibration processing using the Power Loss method), which is measurement for setting a threshold value to be used for foreign object detection. In addition, for example, the predetermined condition includes a case where the RX 401 notifies the TX 402 of the state of the RX 401 (for example, receiving power being received by the RX 401, etc.). In a case where at least any of the above-described conditions is satisfied, the RX 401 determines to perform foreign object detection.

In a case where the RX 401 determines to request the TX 402 to execute foreign object detection (YES in step S1303), in in step S1304, the RX 401 determines the detection processing period related to transmission power control by using the method described in the first exemplary embodiment. The detection processing period is a period including the preparation period, the transmission power control period, communication period, and the power transmission period. In step S1305, the RX 401 transmits an execution request packet containing information for determination of the length of the detection processing period to the TX 402.

As the execution request packet, a Received Power Packet (mode0), a Received Power Packet (mode1), a Received Power Packet (mode2), or the like is used. In a case where the TX 402 has received a foreign object detection request packet from the RX 401 (YES in step S1203), in step S1204, the TX 402 sets each period related to transmission power control, based on information contained in the execution request packet. The TX 402 may preliminarily notify the RX 401 of information that is to be used by the RX 401 to set information in the execution request packet. That is, the RX 401 receives information related to the TX 402 that is to be used for setting of each period related to transmission power control, from the TX 402. The RX 401 may transmit an execution request packet containing information to be used for setting of each period related to transmission power control that has been determined based on the information, to the TX 402.

In step S1205, the TX 402 executes transmission power control based on the set periods. In step S1206, the TX 402 determines whether transmission power control has been completed a predefined predetermined number of times. The number of execution times of transmission power control may be preliminarily determined by the TX 402 or may be preliminarily determined by the RX 401 and the TX 402 may be notified of the number. In a case where the TX 402 preliminarily determines the number of times, the TX 402 may notify the RX 401 of the number.

Next, in a case where the TX 402 has determined that transmission power control has not been completed a predetermined number of times (NO in step S1206), in step S1207, the TX 402 transmits a predetermined signal to the RX 401. The predetermined signal can be a Not-Defined (ND) packet, for example.

By transmitting the predetermined signal, the TX 402 can notify the RX 401 that transmission power control has not been completed a predetermined number of times, and the RX 401 is requested to transmit an additional execution request packet.

In step S1306, the RX 401 receives the predetermined signal indicating whether transmission power control has been completed a predetermined number of times, based on the received packet. In a case where the RX 401 has acquired information indicating that transmission power control has not been completed a predetermined number of times (NO in step S1307), the processing returns to step S1304, and transmission power control is performed again. In this process, in step S1304, the RX 401 sets the same length as the length of each period related to transmission power control that has been set in the previous transmission power control execution, as the length of each period related to transmission power control to be performed this time. In other words, the TX 402 sets the length of each period related to the second transmission power control, for example, to the same length as the length of each period related to the first transmission power control. Then, in step S1305, the RX 401 transmits an execution request packet containing each period related to transmission power control to the TX 402 again. The execution request packet can be, for example, a Received Power Packet (mode0), a Received Power Packet (mode1), or a Received Power Packet (mode2).

In a case where the TX 402 has received a second foreign object detection request packet from the RX 401 (YES in step S1203), in step S1204 the TX 402 sets the length of each period related to transmission power control again based on information contained in the execution request packet. In step S1205, the TX 402 executes transmission power control based on the lengths of the set periods. Then, in step S1206, the TX 402 determines whether transmission power control has been completed a predefined predetermined number of times. In a case where the TX 402 determines that transmission power control has not been completed a predetermined number of times yet (NO in step S1206), the TX 402 repeats the processing in step S1203 and subsequent steps again.

In a case where transmission power control of the TX 402 has been completed a predetermined number of times (YES in step S1206), the TX 402 advances the processing to step S1208. Then, in step S1208, the TX 402 transmits a packet containing information indicating that transmission power control has been completed a predetermined number of times, to the RX 401. In step S1306, the RX 401 receives the above-described packet, and based on the information included in the packet, the RX 401 determines that transmission power control has ended a predetermined number of times (YES in step S1307), and the processing proceeds to step S1308. Controlling the TX 402 and the RX 401 as described above causes, during transmission power control that is executed at least a predefined number of times, lengths of periods related to transmission power control to be set to the same.

Next, in step S1209, the TX 402 determines the existence or non-existence of a foreign object, or a possibility that a foreign object exists (existence probability) from the results of the plurality of execution times, such as waveform decay indices. The details of the determination method are as described above. In a case where it is determined that "a foreign object exists" or "there is a high possibility that a foreign object exists" (YES in step S1210), in step S1211, the TX 402 notifies the RX 401 of the determination result using a predetermined packet.

This can be implemented by the TX 402 transmitting NAK serving as a negative response to the RX 401. In a case where it is determined that "a foreign object does not exist" or "there is a low possibility that a foreign object exists" (NO in step S1210), in step S1212, the TX 402 notifies the RX 401 of the determination result using a predetermined packet. This can be implemented by the TX 402 transmitting ACK serving as a positive response to the RX 401, for example. Then, the TX 402 continues power transmission. The TX 402 may represent "a possibility that a foreign object exists" that is obtained as a result of determination, as a predetermined index corresponding to the level of the possibility (existence probability), and notify the RX 401 of the index by transmitting a predetermined packet containing the index to the RX 401. In step S1308, the RX 401 receives a packet containing a determination result of foreign object detection from the TX 402. In a case where the determination result received by the RX 401 indicates that "a foreign object exists" or "there is a high possibility that a foreign object exists" (YES in step S1309), in step S1310, the RX 401 transmits an EPT command (packet) to the TX 402.

In a case where a determination result obtained in step S1309 indicates that "a foreign object does not exist" or "there is a low possibility that a foreign object exists" (NO in step S1309), in step S1311, the RX 401 executes predetermined processing. The predetermined processing includes the following processing, for example. More specifically, the predetermined processing includes processing of increasing transmission power to be transmitted from the TX 402 to the RX 401, and processing of executing calibration that is measurement for setting of a threshold value to be used in foreign object detection. Alternatively, the predetermined processing is processing in which the RX 401 notifies the TX 402 of the state of the RX 401 (for example, receiving power being received by the RX 401, etc.). In a case where the TX 402 has received an End Power Transfer (EPT) command (packet) serving as a power transmission stop command from the RX 401 in step S1213, in step S1214, the TX 402 stops power transmission to the RX 401. Alternatively, in step S1214, the TX 402 may decrease transmission power to be transmitted to the RX 401.

In the above-described exemplary embodiment, when performing transmission power control a plurality of times, the TX 402 receives a notification indicating information for determination of the detection processing period, each time from the RX 401, and performs setting. The notification is not limited to this. Instead of receiving a notification each time from the RX 401, the TX 402 may be configured to receive a notification only once before the first transmission power control is performed. For example, the RX 401 may transmit information for determination of the length of the detection processing period to the TX 402 only once, and the TX 402 may set the length of a predetermined number of detection processing periods determined by the TX 402 in accordance with the information. When performing transmission power control a plurality of times, the TX 402 receives an execution request packet each time from the RX 401 notification and performs setting. Instead of receiving a notification each time from the RX 401, the TX 402 may be configured to receive a notification only once before the first transmission power control is performed. For example, the RX 401 may transmit an execution request packet to the TX 402 only once and the TX 402 may execute transmission power control a predetermined number of times determined by the TX 402 in accordance with the execution request packet.

The TX 402 determines the length of the detection processing period, based on information acquired from the RX 401, but the configuration is not limited to this. For example, the TX 402 may perform transmission power control in such a manner that the transmission power control is performed at least any period of periods included in the detection processing period with a predetermined length of the detection processing period. In this case, in a case where the TX 402 is configured to perform transmission power control each time an execution request packet is received from the RX 401, the length of the detection processing period might vary in accordance with a timing at which an execution request packet is received. For example, if a timing at which the TX 402 receives an execution request packet during the power transmission period varies every time, the power transmission period might vary. Thus, in the case of this configuration, the RX 401 performs control to transmit an execution request packet in such a manner that the detection processing periods of detection processing to be performed plurality of times have the same length. For example, in a case where detection processing is performed a plurality of times, the RX 401 transmits execution request packets at regular intervals.

The interval used in this configuration is an interval with the same length as the length of the detection processing period for detection processing to be performed by the TX 402. In this manner, also in a case where the detection processing period might vary, a timing at which the RX 401 transmits an execution request packet is controlled, whereby the length of the detection processing period is kept constant.

An execution request packet needs not contain all pieces of information for determination of respective periods of the communication-prohibited period, the power transmission period, the preparation period, and the transmission power control period. For example, an execution request packet may contain information for determination of the transmission power control period, and values predetermined for the TX 402 may be used for the other periods. In addition, for example, an execution request packet may contain information for determination of the communication-prohibited period, and values predetermined for the TX 402 may be used for the other periods. In this manner, an execution request packet can contain information for determination of the length of a certain period of the periods. Alternatively, a configuration in which an execution request packet contains information for determination of the length of the entire detection processing period may be employed.

Third Exemplary Embodiment

In the second exemplary embodiment, the description has been given of the case where periods related to transmission power control are each set to the same time, and foreign object detection using the waveform decay method is performed a plurality of times. In the present exemplary embodiment, the description will be given of a case where periods related to transmission power control are each set to a different value (time), and foreign object detection using the waveform decay method is performed a plurality of times.

As described in the second exemplary embodiment, in a case where foreign object detection using the waveform decay method is performed, execution of accurate foreign object detection may fail if foreign object detection is executed only once. For this reason, processing for foreign object detection is executed a plurality of times, and determination of a foreign object is performed from a plurality of results, which results in more reliable foreign object detection. In the second exemplary embodiment, periods related to transmission power control are each set to a most appropriate value (time length), and transmission power control is repeated a plurality of times, which realizes highly accurate foreign object detection.

However, in the case of the method described in the second exemplary embodiment, since a power transmission waveform during transmission power control that is performed a plurality of times becomes periodic, there arises an issue that noise might be generated in a specific frequency band. Because the periodic waveform is separated into a fundamental and a harmonic, electromagnetic waves with large power are observe in a plurality of specific frequency bands. In other words, if the lengths of a plurality of detection processing periods are set to the same length in transmission power control that is performed a plurality of times, and the transmission power control is repeated a plurality of times, electromagnetic waves with relatively-large power can be generated in a specific frequency band other than a frequency from 85 kHz to 205 kHz, which is a frequency band to be used for power transmission. In a case where power to be transmitted from the TX 402 to the RX 401 is lower than a predetermined value, for example, electromagnetic waves in a specific frequency band do not become so large, and the issue does not arise in some cases. That is, in a case where transmission power is lower than a predetermined value, as described in the second exemplary embodiment, setting the lengths of a plurality of detection processing periods to the same most appropriate time length leads to highly accurate foreign object detection. However, for example, in a case where transmission power is higher than a predetermined value, generated electromagnetic waves might become noise that may cause an erroneous operation of other devices, for example. In addition, in terms of a regulation value set for power in each frequency band in radio law of each country, there may be a possibility that electromagnetic waves generated in a frequency band other than the frequency from 85 kHz to 205 kHz become equal to or larger than the above-described regulation value depending on the power transmission state.

To cover the shortcomings of the above-described method in the second exemplary embodiment, in the present exemplary embodiment, control is performed in such a manner that each period related to transmission power control has various lengths. Hereinafter, the details will be described. A power transmission waveform according to the present exemplary embodiment that is to be obtained in a case where foreign object detection is performed by measuring a plurality of waveform decay indices will be described with reference to FIG. 7. As illustrated in FIG. 7, in a case of measuring a waveform decay index a plurality of times, the communication-prohibited period, the power transmission period, the preparation period, and the transmission power control period are repeated a plurality of times. In the present exemplary embodiment, each period to be repeated in this process is set to have various length. More specifically, as for the communication-prohibited period, lengths of a first communication-prohibited period, a second communication-prohibited period, a third communication-prohibited period, . . . and an N-th communication-prohibited period are all set to be different from each other. Alternatively, a length of at least one communication-prohibited period may be set to be different from lengths of other communication-prohibited periods. As for the power transmission period, lengths of a first power transmission period, a second power transmission period, a third power transmission period, . . . and an N-th power transmission period are all set to be different from each other. Alternatively, a length of at least one power transmission period may be set to be different from lengths of other power transmission periods. As for the preparation period, lengths of a first preparation period, a second preparation period, a third preparation period, . . . and an N-th preparation period are all set to be different from each other. Alternatively, a length of at least one preparation period may be set to be different from lengths of other preparation periods. As for the transmission power control period, lengths of a first transmission power control period, a second transmission power control period, a third transmission power control period, . . . and an N-th transmission power control period are all set to be different from each other. Alternatively, a length of at least one transmission power control period may be set to be different from lengths of other transmission power control periods.

In the above-described example, each period is set to have various lengths, but the control is not limited to this. For example, control may be performed in such a manner that a length of at least one period included in a detection processing period is set to be different from a length of the at least one period in another detection processing period. In addition, a length of the entire detection processing period may be set to be different from a length of another detection processing period.

The method described in the first and second exemplary embodiments can be applied to the setting method of each period. For example, based on the method described in the first exemplary embodiment, the TX 402 and the RX 401 determine the most appropriate length of each period. In a case of varying the length of the detection processing period, the length needs not be always set to the most appropriate period. For example, in a case where the first foreign object detection is performed, the length of the detection processing period may be determined using the method described in the first exemplary embodiment, and for the second foreign object detection and subsequent foreign object detection, the detection processing period adjusted to have a length different from that of the first detection processing period may be determined. Any method may be used as a period length adjustment method in this process.

Alternatively, for example, the TX 402 determines the detection processing period based on information contained in an execution request packet received from the RX 401. In this case, even though the RX 401 transmits an execution request packet containing information for determination of the length of the detection processing period to the TX 402, the length of the detection processing period that is indicated by the information is varied for each piece of detection processing.

As described above, each period is set to have various values (time lengths), and the processing is repeated a plurality of times, which results in suppression of noise in a specific frequency band, whereby highly accurate foreign object detection is executed.

Figure 14:
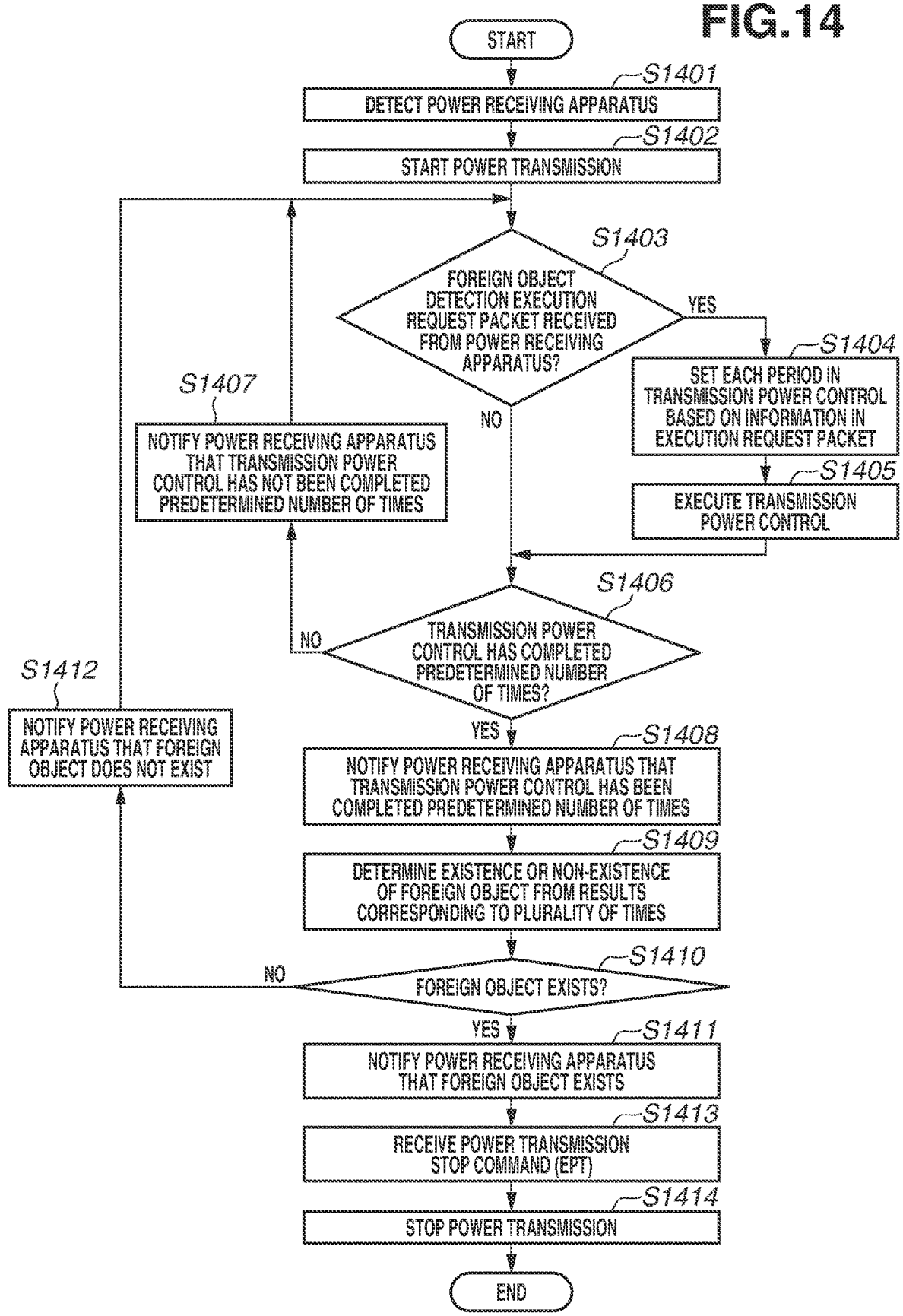
FIG. 14 is a flowchart diagram illustrating an operation that is performed by a power transmission apparatus according to a third exemplary embodiment.
Figure 15:
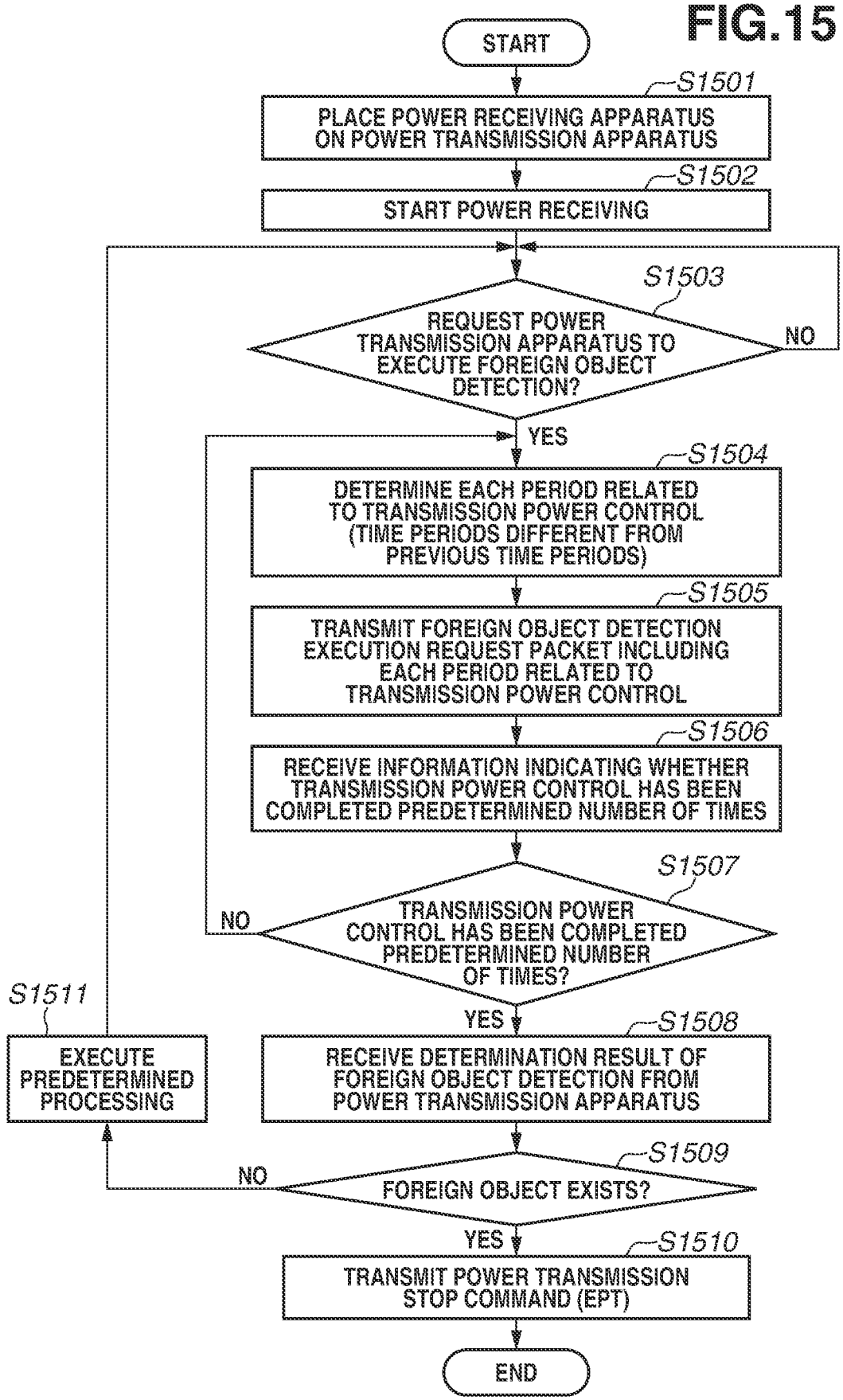
FIG. 15 is a flowchart diagram illustrating an operation of a power receiving apparatus according to the third exemplary embodiment.

A procedure of processing that is performed by the RX 401 and the TX 402 to implement the foregoing will be described with reference to FIGS. 14 and 15. FIG. 14 is a flowchart diagram illustrating processing that is performed by the TX 402, and FIG. 15 is a flowchart diagram illustrating processing that is performed by the RX 401.

Because the most part is similar to the flowchart diagram of the power transmission apparatus in FIG. 12 and the flowchart diagram of the power receiving apparatus in FIG. 13, which have been described in the second exemplary embodiment, the description of the same part will be omitted, and only a different part will be described. A difference from the second exemplary embodiment is in step S1504 in the flowchart diagram of the RX 401 in FIG. 15. In a case where each period related to transmission power control is determined, a time length is set to be different from a time length related to transmission power control in the previous execution. For example, in a case where second transmission power control is executed, a time length is set to be different from a time length related to transmission power control that has been set in first transmission power control.

For example, a maximum value (maximum time) and a minimum value (minimum time) of each time related to transmission power control are determined by exchanging information through communication between the TX 402 and the RX 401. Within the determined range of the maximum value (maximum time) and the minimum value (minimum time) of each period related to transmission power control, the RX 401 sets a time length to be different from the time length related to transmission power control that has been set in the previous execution. With this configuration, as described in the first exemplary embodiment, a power transmission waveform is prevented from being unstable, ringing is suppressed, and stable communication is performed, which results in highly accurate foreign object detection and also results in suppression of large noise that is generated in a specific frequency band.

In step S1505, the RX 401 transmits an execution request packet containing each period related to transmission power control to the TX 402. Meanwhile, the TX 402 receives the above-described execution request packet transmitted from the RX 401 (YES in step S1403) and sets each period related to transmission power control based on information contained in the execution request packet. As each period related to transmission power control that is to be set in this process, a time length is set to be different from the time length related to transmission power control that has been set in the previous execution. By controlling the TX 402 and the RX 401 as described above, during transmission power control repeated at least a predefined predetermined number of times, the length of each period related to transmission power control is set to be different from the length of the period related to transmission power control that has been set in the previous execution.

With the above-described configuration, in transmission power control that is executed a plurality of times, a power transmission waveform does not become periodic, whereby foreign object detection is executed without large noise in a specific frequency band. In addition, as the determination method indicating how the existence or non-existence of a foreign object, or a possibility that a foreign object exists (existence probability) is determined from waveform decay indices obtained by foreign object detection performed a plurality of times using the above-described method, the determination method described in the second exemplary embodiment can also be applied to the present exemplary embodiment. The present exemplary embodiment differs from the second exemplary embodiment in that lengths of a plurality of detection processing periods are different from each other. Accordingly, the configuration of the second exemplary embodiment can be applied to the configuration except for a point different from the second exemplary embodiment.

In the above-described flowchart, foreign object detection is executed each time the RX 401 transmits an execution request packet. The configuration is not limited to this, and alternatively, for example, a configuration in which an execution request packet is transmitted only once at the initial execution may be employed. In this case, for example, the execution request packet may contain information to be used for identifying lengths of detection processing periods in foreign object detection to be executed a plurality of times.

While the TX 402 determines the length of the detection processing period based on information acquired from the RX 401, the configuration is not limited to this. For example, the TX 402 may perform transmission power control with at least any period of periods included in the detection processing period being set to be a predetermined length of the detection processing period. In a case where the TX 402 is configured to perform transmission power control each time an execution request packet is received from the RX 401, the length of the detection processing period may vary in accordance with a timing at which an execution request packet is received. For example, if a timing at which the TX 402 receives an execution request packet during the power transmission period varies every time, the power transmission period may vary. Thus, in the case of this configuration, the RX 401 performs control to transmit an execution request packet in such a manner that detection processing periods of detection processing to be performed plurality of times have lengths different from each other. For example, in a case where detection processing is performed a plurality of times, the RX 401 transmits execution request packets at random intervals in such a manner that detection processing periods have lengths different from each other. In this manner, by controlling a timing at which the RX 401 transmits an execution request packet, detection processing periods of detection processing to be performed plurality of times can be set to have lengths different from each other.

Fourth Exemplary Embodiment

In the second exemplary embodiment, the description has been given of the case where each period related to transmission power control is set to have the same length, and foreign object detection using the waveform decay method is performed a plurality of times. In the third exemplary embodiment, the description has been given of the case where each period related to transmission power control is set to have various values (times), and foreign object detection using the waveform decay method is performed a plurality of times. In the present exemplary embodiment, the description will be given of a method of switching, in a case where a predetermined condition is satisfied, a method between the method described in the second exemplary embodiment and the method described in the third exemplary embodiment.

In a case where each period related to transmission power control is set to have the same length, and foreign object detection using the waveform decay method is performed a plurality of times, as described in the second exemplary embodiment, the TX 402 sets each period related to transmission power control to the most appropriate value and performs transmission power control a plurality of times. For this reason, as compared with the third exemplary embodiment, the second exemplary embodiment has such effects that more accurate foreign object detection can be performed, foreign object detection can be performed in a shorter time, more stable communication can be performed, and higher-speed communication can be performed. On the other hand, in a case where each period related to transmission power control is set to have various values (times), and foreign object detection using the waveform decay method is performed a plurality of times, as described in the third exemplary embodiment, there is such an effect that noise in a specific frequency band can be suppressed, as compared with the case of the second exemplary embodiment.

Here, for example, in a case where power to be transmitted from the TX 402 to the RX 401 is lower than a predetermined value, even if the method of the second exemplary embodiment is used, noise in a specific frequency band does not become so large, and the issue does not arise in some cases. Thus, in a case where power to be transmitted from the TX 402 to the RX 401 is lower than a predetermined value, the method of the second exemplary embodiment may be used, and in a case where power to be transmitted from the TX 402 to the RX 401 is higher than a predetermined value, the method of the third exemplary embodiment may be used.

Alternatively, for example, in a case where the above-described coupled state between the power transmission antenna of the TX 402 and the power receiving antenna of the RX 401 is stronger than a certain level, and it is determined that an amount of power leaking from between the antennas is smaller than a reference value, the method of the second exemplary embodiment may be used. This is because noise in a specific frequency band does not cause a problem in some cases. Thus, in a case where the strength of the coupled state between the power transmission antenna of the TX 402 and the power receiving antenna of the RX 401 meets a standard, and leakage power is smaller than the reference value, the TX 402 uses the method of the second exemplary embodiment. On the other hand, in a case where the strength of the coupled state between the power transmission antenna of the TX 402 and the power receiving antenna of the RX 401 does not meet a standard, and leakage power is larger than the reference value, the TX 402 uses the method of the third exemplary embodiment.

The strength of the coupled state between the power transmission antenna of the TX 402 and the power receiving antenna of the RX 401 can vary in the following two patterns. The first pattern is due to a factor related to the original performance of the power transmission antenna of the TX 402 and the power receiving antenna of the RX 401. For example, there is a possibility that the larger a difference between a size (antenna diameter) of the power transmission antenna of the TX 402 and a size (antenna diameter) of the power receiving antenna of the RX 401 is, the weaker the coupling is to be. Because there are variety of types of power transmission antennas of the TX 402 and a plurality of types of the power receiving antennas of the RX 401, the period of detection processing to be executed by the TX 402 may be switched between the method of the second exemplary embodiment and the method of the third exemplary embodiment in accordance with the RX 401 placed on the TX 402.

The second pattern is due to a factor related to a positional shift of the RX 401 placed on the TX 402. For example, in a case where the position of the RX 401 shifts from a default position for some reason, relative positions of the power transmission antenna and the power receiving antenna change, and the coupling between the antennas may be weakened in comparison with the coupling before a positional shift. Thus, in a case where a change in relative positions of the TX 402 and the RX 401 is detected, the TX 402 or the RX 401 may switch the time setting related to transmission power control to be executed by the TX 402, between the method of the second exemplary embodiment and the method of the third exemplary embodiment. As a method of detecting a change in relative positions of the TX 402 and the RX 401, there is a method of using a measurement result obtained using a sensor mounted on the TX 402 or the RX 401, such as a photoelectric sensor, an eddy current displacement sensor, a contact displacement sensor, an ultrasonic sensor, an image determination sensor, and a weight sensor. Alternatively, a change in a Q value of the antenna of the TX 402 or the antenna of the RX 401 that has been measured in a time domain or a Q value of the antenna of the TX 402 or the antenna of the RX 401 that has been measured in a frequency domain may be observed. Alternatively, a change in the coupled state between the power transmission antenna 105 of the TX 402 and the power receiving antenna 205 of the RX 401 (for example, coupling coefficient) may be observed.

As a method of measuring a Q value to be used in the detection of a positional shift, for example, there is the following method. More specifically, there is a method of transmitting a signal (for example, sinusoidal wave, rectangular wave, etc.) with a resonance frequency and measuring a Q value at the resonance frequency. Alternatively, signals with a plurality of frequencies in proximity to the resonance frequency are transmitted a plurality of times, and Q values at the frequencies are measured. Alternatively, Q values at a plurality of frequencies are measured by transmitting once a signal (for example, pulse wave) including all frequency components or a part of frequency components of a plurality of frequencies of which electrical characteristics are desired to be measured, and performing calculation processing (for example, Fourier transformation) on the measurement result. Alternatively, measurement results of a resonance frequency of the power transmission antenna, the sharpness of a resonant curve, or an inductor value of the power transmission antenna, a coupling coefficient between the power transmission antenna and an object placed on the power transmission apparatus, and the electrical characteristics of the power transmission unit including the power transmission antenna of the power transmission apparatus may be used. The determination may be performed based on the measurement result of electrical characteristics at one frequency or based on the measurement result of electrical characteristics at a plurality of frequencies. A method for measuring electrical characteristics at a plurality of frequencies can be implemented by transmitting a signal (for example, sinusoidal wave, rectangular wave, etc.) at each frequency of which electrical characteristics are desired to be measured, a plurality of times, and measuring electrical characteristics in the signal at each frequency. This method has such an effect that measurement can be performed by relatively reduced calculation processing in the power transmission apparatus. Alternatively, electrical characteristics at a plurality of frequencies can be calculated by transmitting once a signal (for example, pulse wave) including all frequency components of a plurality of frequencies of which electrical characteristics are desired to be measured, and performing calculation processing (for example, Fourier transformation) on the measurement result. Alternatively, electrical characteristics at a plurality of frequencies can be calculated by transmitting a signal including a part of frequency components of a plurality of frequencies of which electrical characteristics are desired to be measured, a plurality of times, and performing calculation processing (for example, Fourier transformation) on the measurement result. This method hast such an effect that measurement can be performed in a relatively shorter time because the number of times of signal transmission for measurement can be reduced. Alternatively, a change in the value of power being received by the RX 401 from the TX 402 may be observed, and a change in relative position between the TX 402 and the RX 401 may be detected.

The TX 402 and the RX 401 sometimes perform wireless communication complying with a standard different from the WPC standard (for example, Bluetooth (registered trademark) Low Energy (Bluetooth LE), Near Field Communication (NFC), etc.). In this case, if the method of the first exemplary embodiment is used, noise generated in transmission power control of the TX 402 might have adverse influence on communication. Thus, in a case where the TX 402 and the RX 401 do not perform communication, the method of the first exemplary embodiment may be used, and in a case where the TX 402 and the RX 401 perform communication, the method of the second exemplary embodiment may be used. Alternatively, in a case where the TX 402 and the RX 401 perform wireless communication not complying with a standard different from the WPC standard, the method of the second exemplary embodiment may be used, and in a case where the TX 402 and the RX 401 perform wireless communication complying with a standard different from the WPC standard, the method of the third exemplary embodiment may be used.

In the above-described case, a method to be used is switched among the method of the first exemplary embodiment, the method of the second exemplary embodiment, and the method of the third exemplary embodiment. The determination of a method to be used in the case may be performed by whichever of the TX 402 and the RX 401.

Other Exemplary Embodiments

The configurations of the above-described first to fourth exemplary embodiments may be arbitrarily combined in execution of the above-described first to fourth exemplary embodiments. In the above-described exemplary embodiments, the TX 402 performs transmission power control, and performs foreign object detection based on a waveform decay index obtained by the control. As another method of measuring a Q value serving as one of waveform decay indices, there is the following method. More specifically, a Q value is measured by transmitting a signal (for example, pulse wave) including a plurality of frequencies components, measuring an amplitude or a decay state of a waveform of the signal, and performing calculation processing (for example, Fourier transformation) on a result of the measurement. This method can also be applied to the above-described exemplary embodiments.

The processing in the above-described exemplary embodiments may be performed by an apparatus different from the RX 401 and the TX 402. For example, at least either of the measurement of a voltage or a current during a period in which the TX 402 restricts power transmission, and the determination of the existence or non-existence of a foreign object that is based on a measurement result may be performed by another apparatus. The determination of the time length of the detection processing period may be performed by another apparatus. In addition, another apparatus may control the RX 401 and the TX 402 to execute the processing described in the above-described exemplary embodiments.

The present disclosure can also be implemented by processing of supplying a program for implementing one or more functions of the above-described exemplary embodiments, to a system or an apparatus via a network or a storage medium, and one or more processors in a computer of the system or the apparatus reading out and executing the program. In addition, the present disclosure can also be implemented by a circuit (for example, ASIC, etc.) implementing one or more functions. In addition, the program may be provided with being recorded onto a computer-readable recording medium.

In addition, at least part of flowcharts illustrated in FIGS. 8, 9, and 12 to 15 may be implemented by hardware. In a case where at least part of the flowcharts is implemented by hardware, for example, it is sufficient that a dedicated circuit is automatically generated on an FPGA from a program for implementing each step, by using a predetermined compiler. The FPGA stands for a Field Programmable Gate Array. In addition, a Gate Array circuit may be formed similarly to the FPGA, and implemented as hardware.

A power transmission apparatus and a power receiving apparatus may be image input devices, such an imaging apparatus (camera, video camera, etc.) and a scanner, or image output devices, such as a printer, a copying machine, or a projector, for example. In addition, a power transmission apparatus and a power receiving apparatus may be storage devices, such as a hard disc device or a memory device, or may be information processing apparatuses, such as a personal computer (PC) and a smartphone.

The power receiving apparatus of the present disclosure may be an information terminal device. For example, the information terminal device includes a display unit (display) which displays information to the user and to which power received from a power receiving antenna is supplied. Power received from a power receiving antenna is stored into a capacitor unit (battery), and power is supplied from the battery to the display unit. In this case, the power receiving apparatus may include a communication unit for communicating with another apparatus different from the power transmission apparatus. The communication unit may comply with a communication standard such as NFC communication and the 5th Generation Mobile Communication System (5G).

The power receiving apparatus of the present disclosure may be a vehicle, such as an automobile. For example, the automobile serving as the power receiving apparatus may be an apparatus that receives power from a charger (power transmission apparatus) via a power transmission antenna installed in a parking area. The automobile serving as the power receiving apparatus may be an apparatus that receives power from a charger (power transmission apparatus) via a power transmission antenna buried in a road. Power received by such an automobile is supplied to a battery. Power in the battery may be supplied to a mover unit (motor, electroactuation unit) that drives wheels, or may be used for the driving of a sensor to be used for driving assistance or the driving of a communication unit that performs communication with an external apparatus. In other words, in this case, the power receiving apparatus may include a battery, and a motor and a sensor that are to be driven using received power, and further include a communication unit that performs communication with an apparatus other than the power transmission apparatus, in addition to wheels. Furthermore, the power receiving apparatus may include an accommodation unit that accommodates a person. Examples of the sensor include a sensor that is used for measuring an inter-vehicular distance or a distance to another obstacle. The communication unit may support the Global Positioning System or Global Positioning Satellite (GPS), for example. The communication unit may comply with a communication standard such as the 5th Generation Mobile Communication System (5G). In addition, the vehicle may be a bicycle or a motorbike.

The power receiving apparatus of the present disclosure may be an electrical tool, a home electric appliance, or the like. These devices serving as power receiving apparatuses may each include, in addition to a battery, a motor to be driven by received power stored in the battery. These devices may each include notification means for notifying the user of a remaining amount of the battery. In addition, these devices may each include a communication unit that communicates with another apparatus other than the power transmission apparatus. The communication unit may comply with a communication standard such as the NFC and the 5th Generation Mobile Communication System (5G).

The power transmission apparatus of the present disclosure may be an in-vehicle charger that performs power transmission in a vehicle interior of an automobile to a mobile information terminal information, such as a smartphone and a tablet, that supports wireless power transmission. Such an in-vehicle charger may be provided in anywhere in the automobile. For example, the in-vehicle charger may be installed in a console of the automobile or on an instrument panel (instrument panel, dashboard), at a position between seats of occupants, a ceiling, or a door. It is better to avoid installing the in-vehicle charger at a location at which the in-vehicle charger disturbs driving. While an example in which the power transmission apparatus is an in-vehicle charger has been described, such a charger is not limited to a charger arranged in a vehicle, and may be installed in a transportation, such as an electrical train, an airplane, or a ship. A charger in this case may also be installed at a position between seats of occupants, a ceiling, or a door.

A vehicle, such as au automobile, including an in-vehicle charger may serve as a power transmission apparatus. In this case, the power transmission apparatus includes wheels and a battery and supplies power to a power receiving apparatus via a power transmission circuit unit and a power transmission antenna using power of the battery.

Others

The disclosure of the above-described exemplary embodiments includes the following configurations, method, and program.

Configuration 1

A power transmission apparatus comprising:
a power transmission unit configured to wirelessly transmit power to a power receiving apparatus via an antenna;
a measurement unit configured to perform measurement processing of measuring at least either of a voltage and a current in the antenna at least two or more time points of a power transmission-restricted period in which power to be transmitted by the power transmission unit to the power receiving apparatus is restricted; and
a control unit configured to perform, in a case where first measurement processing and second measurement processing are performed by the measurement unit, control in such a manner that a processing period related to the first measurement processing and a processing period related to the second measurement processing have lengths different from each other.

Configuration 2

The power transmission apparatus according to Configuration 1, further comprising a communication unit configured to perform communication with the power receiving apparatus,
wherein the measurement unit performs the measurement processing in response to the communication unit receiving a predetermined signal from the power receiving apparatus.

Configuration 3

The power transmission apparatus according to Configuration 2, wherein the measurement unit performs the measurement processing each time that the communication unit receives the predetermined signal.

Configuration 4

The power transmission apparatus according to Configuration 2 or 3, wherein, in response to the communication unit receiving the predetermined signal, the measurement unit performs the measurement processing, including the first measurement processing and the second measurement processing, plurality of times.

Configuration 5

The power transmission apparatus according to any one of Configurations 2 to 4, wherein the predetermined signal contains information to be used for determination of the power transmission-restricted period.

Configuration 6

The power transmission apparatus according to any one of Configurations 2 to 5, wherein the predetermined signal contains information to be used for determination of a communication-restricted period in which communication by the communication unit is restricted.

Configuration 7

The power transmission apparatus according to any one of Configurations 2 to 6, wherein the predetermined signal is a signal indicating magnitude of power received by the power receiving apparatus from the power transmission apparatus.

Configuration 8

The power transmission apparatus according to any one of Configurations 2 to 7, wherein the control unit determines a length of the processing period based on the predetermined signal.

Configuration 9

The power transmission apparatus according to any one of Configurations 2 to 8,
wherein the processing period includes a communication-restricted period in which communication by the communication unit is restricted, and
wherein the control unit performs controls in such a manner that a communication-restricted period related to the first measurement processing and a communication-restricted period related to the second measurement processing have lengths different from each other.

Configuration 10

The power transmission apparatus according to any one of Configurations 2 to 9,
wherein the processing period includes a predetermined period from when the communication unit receives the predetermined signal until when restriction of power to be transmitted by the power transmission unit is started, and
wherein the control unit performs control in such a manner that the predetermined period related to the first measurement processing and the predetermined period related to the second measurement processing have lengths different from each other.

Configuration 11

The power transmission apparatus according to any one of Configurations 1 to 10,
wherein the processing period includes the power transmission-restricted period, and
wherein the control unit performs control in such a manner that a power transmission-restricted period related to the first measurement processing and a power transmission-restricted period related to the second measurement processing have lengths different from each other.

Configuration 12

The power transmission apparatus according to any one of Configurations 1 to 11, further comprising a detection unit configured to detect an object different from the power receiving apparatus, based on a result of the measurement processing, including the first measurement processing and the second measurement processing, performed plurality of times.

Configuration 13

The power transmission apparatus according to Configuration 12, wherein the detection unit detects an object different from the power receiving apparatus in accordance with a result that, among a plurality of measurement results obtained by the measurement processing, including the first measurement processing and the second measurement processing, performed plurality of times, the number of measurement results satisfying a predetermined condition is larger than a predetermined number.

Configuration 14

The power transmission apparatus according to Configuration 13, wherein the predetermined condition is that at least either of a decay amount and a decay rate of a voltage acquired based on the measurement results is larger than a threshold value.

Configuration 15

The power transmission apparatus according to Configuration 13 or 14, wherein the predetermined condition is that at least either of a decay amount and a decay rate of a current acquired based on the measurement results is larger than a threshold value.

Configuration 16

The power transmission apparatus according to according to any one of Configurations 13 to 15, wherein the predetermined condition is that a quality coefficient acquired based on the measurement results is smaller than a threshold value.

Configuration 17

The power transmission apparatus according to any one of Configurations 12 to 16, further comprising an output unit configured to output, in accordance with a result of detection processing performed by the detection unit, at least any of a result indicating that an object different from the power receiving apparatus exists, a result indicating that there is a possibility that an object different from the power receiving apparatus exists, and a result indicating a probability that an object different from the power receiving apparatus exists.

Configuration 18

A power receiving apparatus comprising:
  a power receiving unit configured to wirelessly receive power from a power transmission apparatus via an antenna;
  a communication unit configured to communicate with the power transmission apparatus;
  a determination unit configured to determine a length of a processing period related to predetermined processing that is performed by the power transmission apparatus to detect an object different from the power receiving apparatus; and
  a control unit configured to perform control in such a manner that a predetermined signal for notifying the power transmission apparatus of the length of the processing period determined by the determination unit is transmitted by the communication unit to the power transmission apparatus,
  wherein, in a case where first predetermined processing and second predetermined processing are performed by the power transmission apparatus, the determination unit determines a length of the processing period in such a manner that a processing period related to the first predetermined processing and the processing period related to the second predetermined processing have lengths different from each other.

Configuration 19

The power receiving apparatus according to Configuration 18,
  wherein the processing period includes a power transmission-restricted period in which power to be transmitted by the power transmission apparatus is restricted in the predetermined processing, and
  wherein the determination unit determines a length of the processing period in such a manner that a power transmission-restricted period related to the first predetermined processing and a power transmission-restricted period related to the second predetermined processing have lengths different from each other.

Configuration 20

The power receiving apparatus according to Configuration 18 or 19, wherein the processing period includes a communication-restricted period in
  which communication by the communication unit is restricted in the predetermined processing, and
  wherein the determination unit determines a length of the processing period in such a manner that a communication-restricted period related to the first predetermined processing and a communication-restricted period related to the second predetermined processing have lengths different from each other.

Method 21

A control method of a power transmission apparatus, the control method comprising:
  a measurement step of performing measurement processing of measuring at least either of a voltage and a current in an antenna at least two or more time points of a power transmission-restricted period in which power to be transmitted from the power transmission apparatus to the power receiving apparatus via the antenna is restricted; and
  a control step of performing, in a case where first measurement processing and second measurement processing are performed in the measurement step, control in such a manner that a processing period related to the first measurement processing and a processing period related to the second measurement processing have lengths different from each other.

Method 22

A control method of a power receiving apparatus, the control method comprising:
  a determination step of determining a length of a processing period related to the predetermined processing for detecting an object different from the power receiving apparatus that wirelessly receives power from a power transmission apparatus via an antenna; and
  a control step of performing control in such a manner that a predetermined signal for notifying the power transmission apparatus of the length of a processing period that is determined in the determination step is transmitted to the power transmission apparatus,
  wherein, in a case where first predetermined processing and second predetermined processing are performed by the power transmission apparatus, the determination step determines a length of the processing period in such a manner that a processing period related to the first predetermined processing and the processing period related to the second predetermined processing have lengths different from each other.

Program

A program for causing a computer to function as the power transmission apparatus according to any one of Configurations 1 to 17 or the power receiving apparatus according to any one of Configurations 18 to 20.

The present disclosure is not limited to the above-described embodiments, and various modifications and variations can be made without departing from the spirit and scope of the present disclosure. Accordingly, the following claims are appended to disclose the scope of the present disclosure.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, appropriate control is able to be performed in a case where processing of measuring a voltage or a current is performed a plurality of times during a period in which a power transmission apparatus restricts power transmission.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A power transmission apparatus comprising:
   a power transmission unit configured to wirelessly transmit power to a power receiving apparatus via an antenna;
   a measurement unit configured to perform measurement processing of measuring at least either of a voltage and a current in the antenna at least at two or more time points of a power transmission-restricted period in which power to be transmitted by the power transmission unit to the power receiving apparatus is restricted;
   a control unit configured to perform, in a case where first measurement processing and second measurement processing are performed by the measurement unit, control in such a manner that a processing period related to the first measurement processing and a processing period related to the second measurement processing have lengths different from each other; and
   a detection unit configured to detect an object different from the power receiving apparatus, based on a result of the measurement processing, including the first measurement processing and the second measurement processing, performed a plurality of times,
   wherein the detection unit detects the object different from the power receiving apparatus in accordance with a fact that, among a plurality of measurement results obtained by the measurement processing, including the first measurement processing and the second measurement processing, performed a plurality of times, the number of measurement results satisfying a predetermined condition is larger than a predetermined number.

2. The power transmission apparatus according to claim 1, further comprising a communication unit configured to perform communication with the power receiving apparatus,
   wherein the measurement unit performs the measurement processing in response to the communication unit receiving a predetermined signal from the power receiving apparatus.

3. The power transmission apparatus according to claim 2, wherein the measurement unit performs the measurement processing each time that the communication unit receives the predetermined signal.

4. The power transmission apparatus according to claim 2, wherein, in response to the communication unit receiving the predetermined signal, the measurement unit performs the measurement processing, including the first measurement processing and the second measurement processing, the plurality of times.

5. The power transmission apparatus according to claim 2, wherein the predetermined signal contains information to be used for determination of the power transmission-restricted period.

6. The power transmission apparatus according to claim 2, wherein the predetermined signal contains information to be used for determination of a communication-restricted period in which communication by the communication unit is restricted.

7. The power transmission apparatus according to claim 2, wherein the predetermined signal is a signal indicating magnitude of power received by the power receiving apparatus from the power transmission apparatus.

8. The power transmission apparatus according to claim 2, wherein the control unit determines a length of the processing period based on the predetermined signal.

9. The power transmission apparatus according to claim 2,
   wherein the processing period includes a communication-restricted period in which communication by the communication unit is restricted, and
   wherein the control unit performs controls in such a manner that a communication-restricted period related to the first measurement processing and a communication-restricted period related to the second measurement processing have lengths different from each other.

10. The power transmission apparatus according to claim 2,
    wherein the processing period includes a predetermined period from when the communication unit receives the predetermined signal until when restriction of power to be transmitted by the power transmission unit is started, and
    wherein the control unit performs control in such a manner that the predetermined period related to the first measurement processing and the predetermined period related to the second measurement processing have lengths different from each other.

11. The power transmission apparatus according to claim 1,
    wherein the processing period includes the power transmission-restricted period, and
    wherein the control unit performs control in such a manner that a power transmission-restricted period related to the first measurement processing and a power transmission-restricted period related to the second measurement processing have lengths different from each other.

12. The power transmission apparatus according to claim 1, wherein the predetermined condition is that at least either of a decay amount and a decay rate of a voltage acquired based on the measurement results is larger than a threshold value.

13. The power transmission apparatus according to claim 1, wherein the predetermined condition is that at least either of a decay amount and a decay rate of a current acquired based on the measurement results is larger than a threshold value.

14. The power transmission apparatus according to claim 1, wherein the predetermined condition is that a quality coefficient acquired based on the measurement results is smaller than a threshold value.

15. The power transmission apparatus according to claim 1, further comprising an output unit configured to output, in accordance with a result of detection processing performed by the detection unit, at least any of a result indicating that an object different from the power receiving apparatus exists, a result indicating that there is a possibility that an object different from the power receiving apparatus exists, and a result indicating a probability that an object different from the power receiving apparatus exists.

16. A power receiving apparatus comprising:
a power receiving unit configured to wirelessly receive power from a power transmission apparatus via an antenna;
a communication unit configured to communicate with the power transmission apparatus;
a determination unit configured to determine a length of a processing period related to predetermined processing that is performed by the power transmission apparatus to detect an object different from the power receiving apparatus; and
a control unit configured to perform control in such a manner that a predetermined signal for notifying the power transmission apparatus of the length of the processing period determined by the determination unit is transmitted by the communication unit to the power transmission apparatus,
wherein, in a case where first predetermined processing and second predetermined processing are performed by the power transmission apparatus, the determination unit determines a length of the processing period in such a manner that a processing period related to the first predetermined processing and the processing period related to the second predetermined processing have lengths different from each other.

17. The power receiving apparatus according to claim 16, wherein the processing period includes a power transmission-restricted period in which power to be transmitted by the power transmission apparatus is restricted in the predetermined processing, and
wherein the determination unit determines a length of the processing period in such a manner that a power transmission-restricted period related to the first predetermined processing and a power transmission-restricted period related to the second predetermined processing have lengths different from each other.

18. The power receiving apparatus according to claim 16, wherein the processing period includes a communication-restricted period in which communication by the communication unit is restricted in the predetermined processing, and
wherein the determination unit determines a length of the processing period in such a manner that a communication-restricted period related to the first predetermined processing and a communication-restricted period related to the second predetermined processing have lengths different from each other.

19. A control method of a power transmission apparatus, the control method comprising:
performing measurement processing of measuring at least either of a voltage and a current in an antenna at least at two or more time points of a power transmission-restricted period in which power to be transmitted from the power transmission apparatus to the power receiving apparatus via the antenna is restricted;
performing, in a case where first measurement processing and second measurement processing are performed in the measurement processing, control in such a manner that a processing period related to the first measurement processing and a processing period related to the second measurement processing have lengths different from each other; and
detecting an object different from the power receiving apparatus, based on a result of the measurement processing, including the first measurement processing and the second measurement processing, performed a plurality of times, wherein an object different from the power receiving apparatus is detected in accordance with a fact that, among a plurality of measurement results obtained by the measurement processing, including the first measurement processing and the second measurement processing, performed the plurality of times, the number of measurement results satisfying a predetermined condition is larger than a predetermined number.

20. A control method of a power receiving apparatus, the control method comprising:
determining a length of a processing period related to predetermined processing for detecting an object different from the power receiving apparatus that wirelessly receives power from a power transmission apparatus via an antenna; and
performing control in such a manner that a predetermined signal for notifying the power transmission apparatus of the length of a processing period that is determined in the determining is transmitted to the power transmission apparatus,
wherein, in a case where first predetermined processing and second predetermined processing are performed by the power transmission apparatus, the determining determines a length of the processing period in such a manner that a processing period related to the first predetermined processing and the processing period related to the second predetermined processing have lengths different from each other.

* * * * *